US006850236B2

(12) United States Patent
Deering

(10) Patent No.: US 6,850,236 B2
(45) Date of Patent: Feb. 1, 2005

(54) DYNAMICALLY ADJUSTING A SAMPLE-TO-PIXEL FILTER IN RESPONSE TO USER INPUT AND/OR SENSOR INPUT

(75) Inventor: Michael F. Deering, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 400 days.

(21) Appl. No.: 09/751,665

(22) Filed: Dec. 29, 2000

(65) Prior Publication Data

US 2002/0003543 A1 Jan. 10, 2002

Related U.S. Application Data

(63) Continuation-in-part of application No. 09/251,840, filed on Feb. 17, 1999, now Pat. No. 6,717,578.

(60) Provisional application No. 60/175,384, filed on Jan. 11, 2000, and provisional application No. 60/074,836, filed on Feb. 17, 1998.

(51) Int. Cl.[7] .................................... G06T 15/00

(52) U.S. Cl. .................................... 345/428

(58) Field of Search .................................... 345/418, 419, 345/426, 428, 619

(56) References Cited

U.S. PATENT DOCUMENTS 5,557,339 A * 9/1996 Dadourian .................. 348/586
5,757,375 A 5/1998 Kawase .................. 345/429
6,687,407 B2 * 2/2004 Peters .................. 382/232

FOREIGN PATENT DOCUMENTS

WO 00/49574 8/2000
WO 00/49577 8/2000

* cited by examiner

*Primary Examiner*—Phu K. Nguyen
(74) *Attorney, Agent, or Firm*—Meyertons Hood Kivlin Kowert & Goetzel, P.C.; Jeffrey C. Hood; Mark K. Brightwell

(57) ABSTRACT

A graphics system capable of super-sampling and performing real-time convolution. The graphics system may comprise a graphics processor, a sample buffer, and a sample-to-pixel calculation unit. The graphics processor receives graphics data and generates a plurality of samples for each of a plurality of frames. The sample buffer stores the samples. The sample-to-pixel calculation unit is operable to generate output pixels by filtering the rendered samples using a filter. A display device then receives and displays the output pixels. A user may observe the displayed image and adjust properties of the filter according to the user's personal visual preferences. A display-monitoring device may be configured to capture the displayed image. The graphics system may then analyze the captured image and, in response to the captured image, perform filter adjustments.

52 Claims, 35 Drawing Sheets

Fig. 23A Truncated Sinc Filter
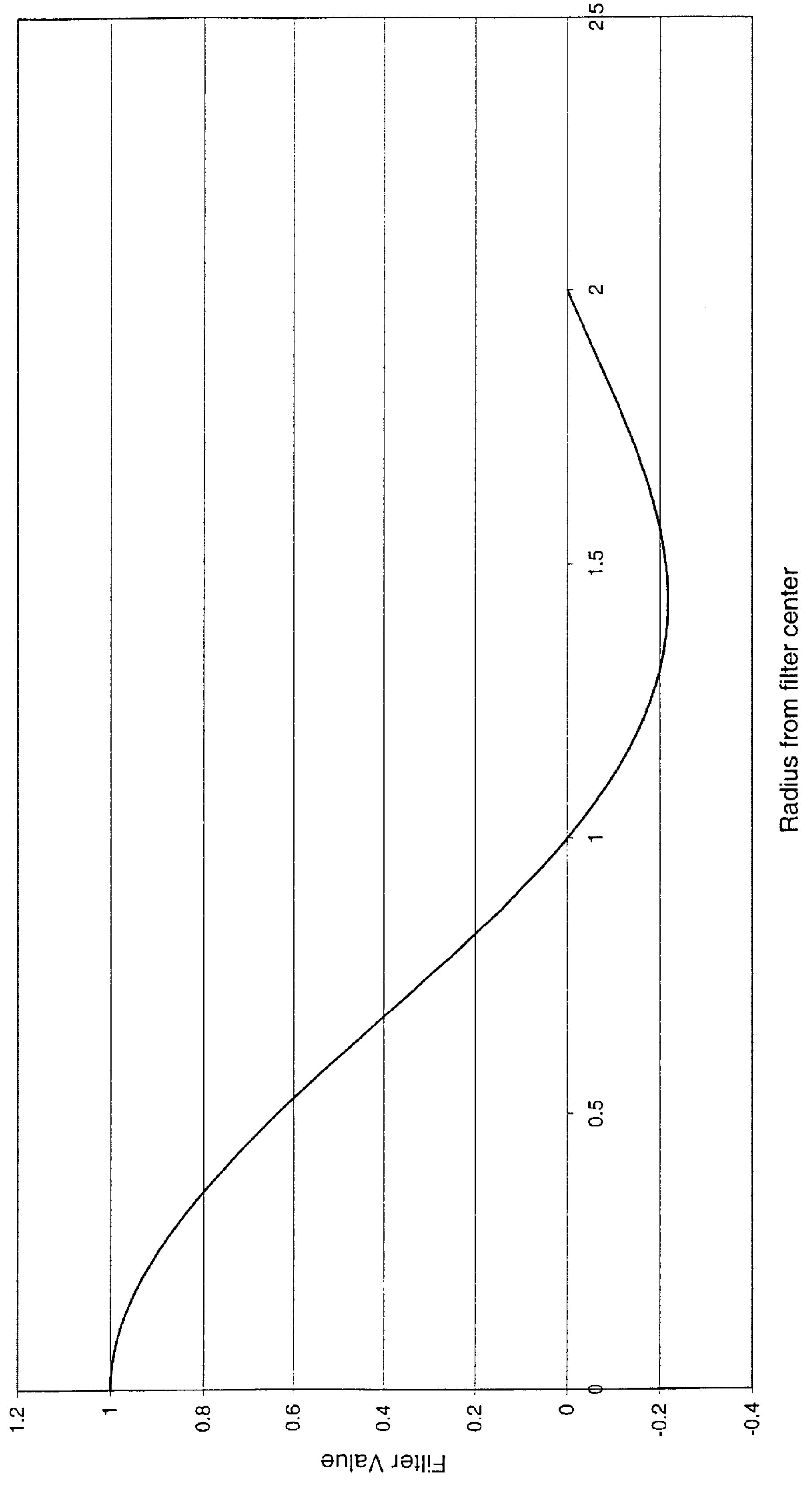

Fig. 23B Catmull-Rom Filter
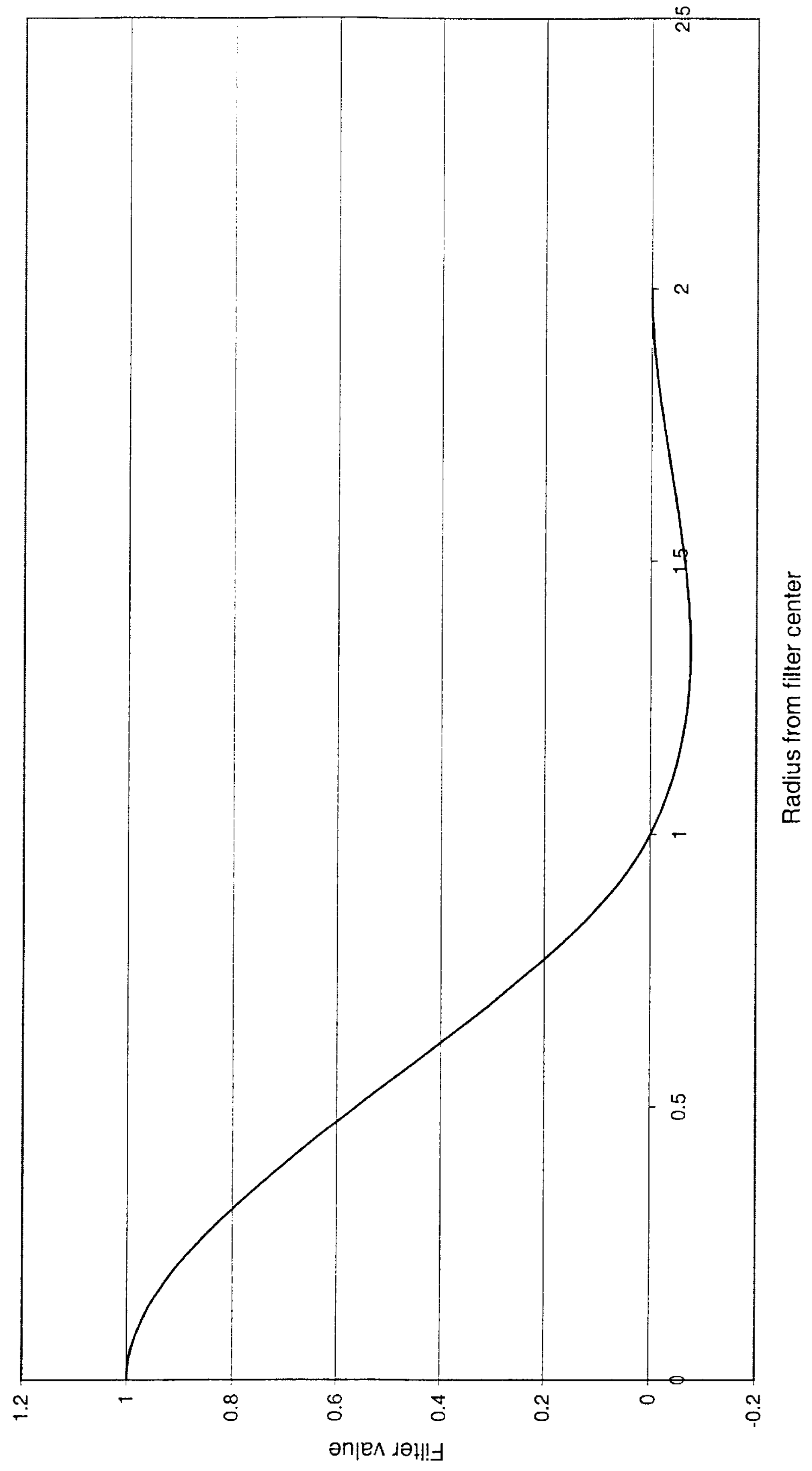

Fig. 23C Cubic B-Spline
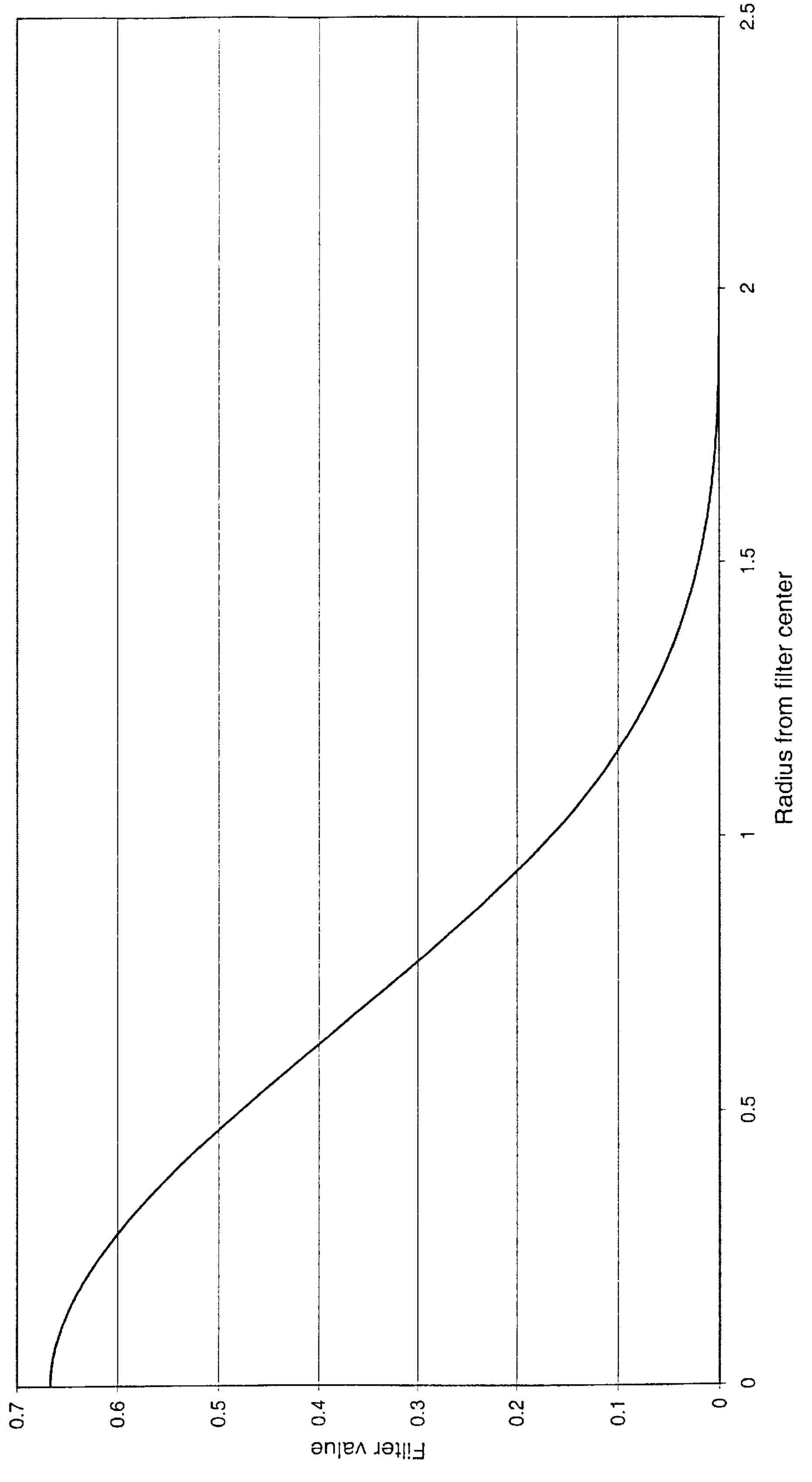

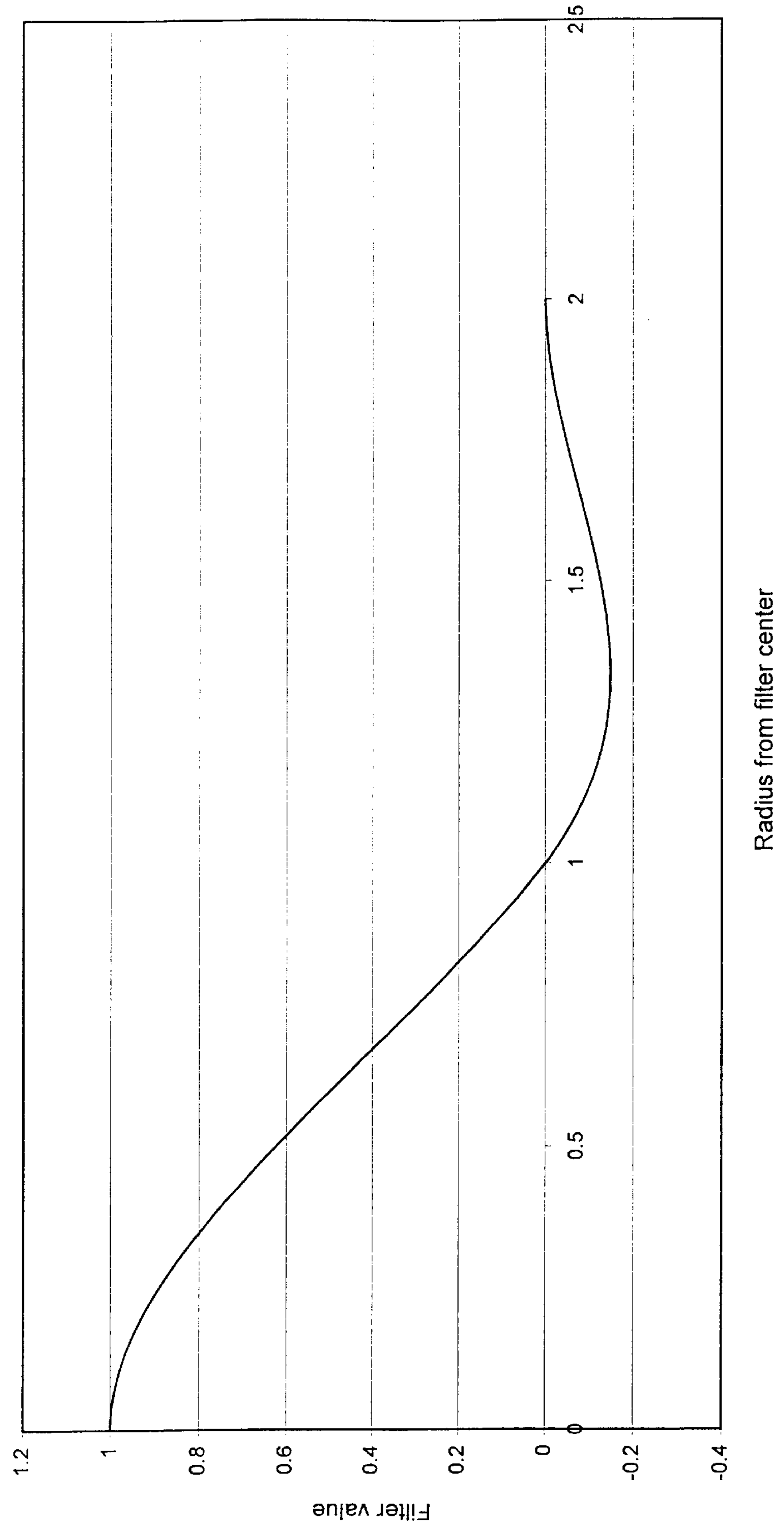
Fig. 23E Cardinal cubic spline, i.e. Mitchell-Netravali filter (0,1)

Fig. 24 Upward Shifted and Truncated Sinc Filter
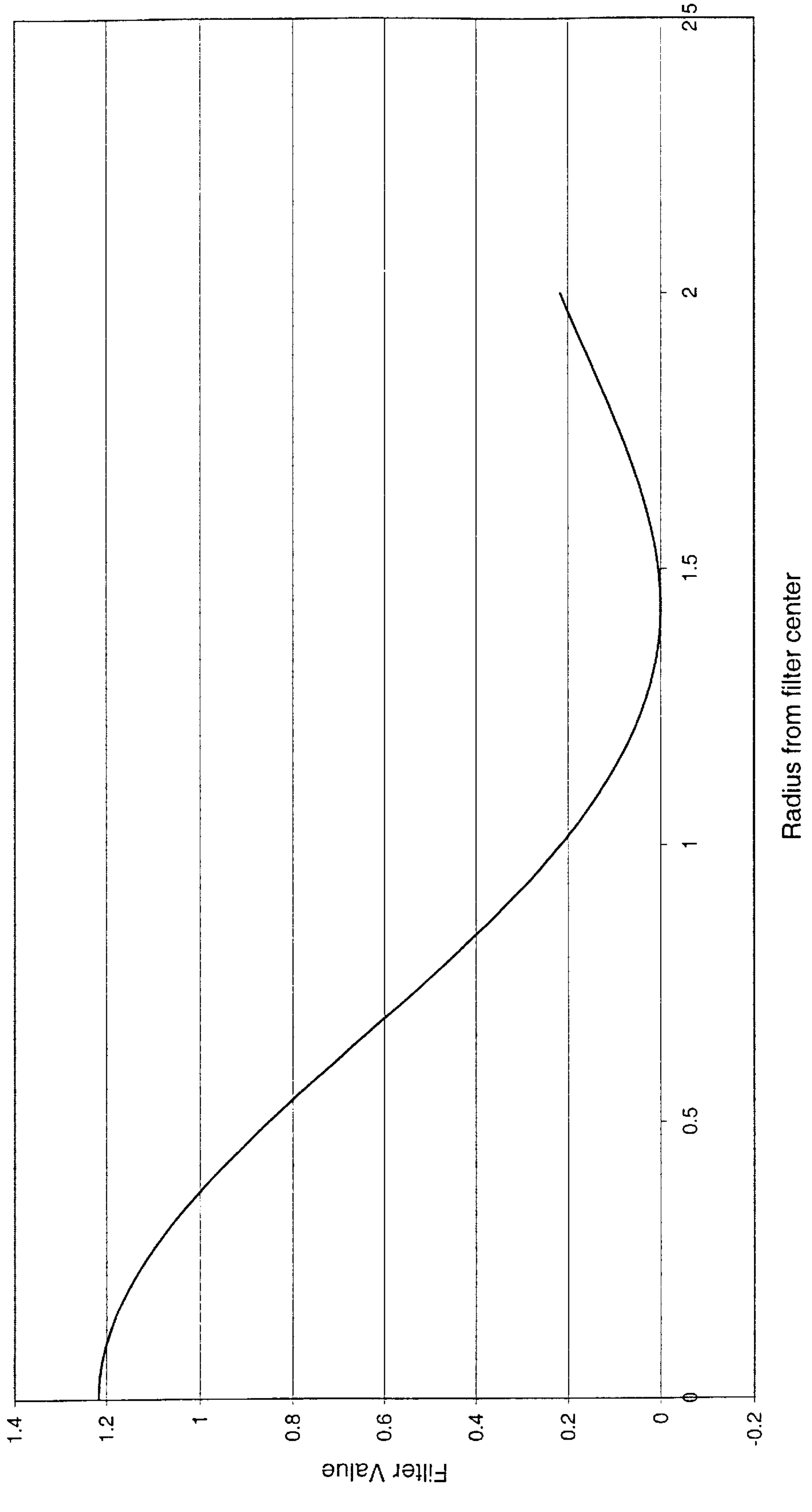

DYNAMICALLY ADJUSTING A SAMPLE-TO-PIXEL FILTER IN RESPONSE TO USER INPUT AND/OR SENSOR INPUT

CROSS-REFERENCE TO RELATED APPLICATIONS

This application claims the benefit of U.S. Provisional Application No. 60/175,384, filed on Jan. 11, 2000, and titled "Photorealistic Hardware Antialiasing".

This application is a continuation-in-part of co-pending U.S. application Ser. No. 09/251,840 titled "A Graphics System With A Variable-Resolution Sample Buffer", filed Feb. 17, 1999, now U.S. Pat. No. 6,717,578, invented by Michael F. Deering, and which was assigned to SUN MICROSYSTEMS, INC., which claims the benefit of U.S. Provisional Application No. 60/074,836, filed Feb. 17, 1998.

BACKGROUND OF THE INVENTION

1. Field of the Invention

This invention relates generally to the field of computer graphics and, more particularly, to high performance graphics systems.

2. Description of the Related Art

A computer system typically relies upon its graphics system for producing visual output on the computer screen or display device. Early graphics systems were only responsible for taking what the processor produced as output and displaying that output on the screen. In essence, they acted as simple translators or interfaces. Modem graphics systems, however, incorporate graphics processors with a great deal of processing power. They now act more like coprocessors rather than simple translators. This change is due to the recent increase in both the complexity and amount of data being sent to the display device. For example, modem computer displays have many more pixels, greater color depth, and are able to display images that are more complex with higher refresh rates than earlier models. Similarly, the images displayed are now more complex and may involve advanced techniques such as anti-aliasing and texture mapping.

As a result, without considerable processing power in the graphics system, the CPU would spend a great deal of time performing graphics calculations. This could rob the computer system of the processing power needed for performing other tasks associated with program execution and thereby dramatically reduce overall system performance. With a powerful graphics system, however, when the CPU is instructed to draw a box on the screen, the CPU is freed from having to compute the position and color of each pixel. Instead, the CPU may send a request to the video card stating: "draw a box at these coordinates". The graphics system then draws the box, freeing the processor to perform other tasks.

Generally, a graphics system in a computer (also referred to as a graphics system) is a type of video adapter that contains its own processor to boost performance levels. These processors are specialized for computing graphical transformations, so they tend to achieve better results than the general-purpose CPU used by the computer system. In addition, they free up the computer's CPU to execute other commands while the graphics system is handling graphics computations. The popularity of graphical applications, and especially multimedia applications, has made high performance graphics systems a common feature of computer systems. Most computer manufacturers now bundle a high performance graphics system with their systems.

Since graphics systems typically perform only a limited set of functions, they may be customized and therefore far more efficient at graphics operations than the computer's general-purpose central processor. While early graphics systems were limited to performing two-dimensional (2D) graphics, their functionality has increased to support three-dimensional (3D) wire-frame graphics, 3D solids, and now includes support for three-dimensional (3D) graphics with textures and special effects such as advanced shading, fogging, alpha-blending, and specular highlighting.

The processing power of 3D graphics systems has been improving at a breakneck pace. A few years ago, shaded images of simple objects could only be rendered at a few frames per second, while today's systems support rendering of complex objects at 60 Hz or higher. At this rate of increase, in the not too distant future, graphics systems will literally be able to render more pixels than a single human's visual system can perceive.

While the number of pixels is an important factor in determining graphics system performance, another factor of equal import is the quality of the image. For example, an image with a high pixel density may still appear unrealistic if edges within the image are too sharp or jagged (also referred to as "aliased"). One well-known technique to overcome these problems is anti-aliasing. Anti-aliasing involves smoothing the edges of objects by shading pixels along the borders of graphical elements. More specifically, anti-aliasing entails removing higher size components from an image before they cause disturbing visual artifacts. For example, anti-aliasing may soften or smooth high contrast edges in an image by forcing certain pixels to intermediate values (e.g., around the silhouette of a bright object superimposed against a dark background).

Another visual effect used to increase the realism of computer images is alpha blending. Alpha blending is a technique that controls the transparency of an object, allowing realistic rendering of translucent surfaces such as water or glass. Another technique used to improve realism is fogging. Fogging obscures an object as it moves away from the viewer. Simple fogging is a special case of alpha blending in which the degree of alpha changes with distance so that the object appears to vanish into a haze as the object moves away from the viewer. This simple fogging may also be referred to as "depth cueing" or atmospheric attenuation, i.e., lowering the contrast of an object so that it appears less prominent as it recedes. Types of fogging that are more complex go beyond a simple linear function to provide relationships that are more complex between the level of translucence and an object's distance from the viewer. Current state of the art software systems go even further by utilizing atmospheric models to provide low-lying fog with improved realism.

While the techniques listed above may dramatically improve the appearance of computer graphics images, they also have certain limitations. In particular, they may introduce their own aberrations and are typically limited by the density of pixels displayed on the display device.

As a result, a graphics system is desired which is capable of utilizing increased performance levels to increase not only the number of pixels rendered but also the quality of the image rendered. In addition, a graphics system is desired which is capable of utilizing increases in processing power to improve graphics effects such as anti-aliasing.

Prior art graphics systems have generally fallen short of these goals. Prior art graphics systems use a conventional frame buffer for refreshing pixel/video data on the display.

The frame buffer stores rows and columns of pixels that exactly correspond to respective row and column locations on the display. Prior art graphics system render 2D and/or 3D images or objects into the frame buffer in pixel form, and then read the pixels from the frame buffer during a screen refresh to refresh the display. Thus, the frame buffer stores the output pixels that are provided to the display. To reduce visual artifacts that may be created by refreshing the screen at the same time as the frame buffer is being updated, most graphics systems' frame buffers are double-buffered.

To obtain images that are more realistic, some prior art graphics systems have gone further by generating more than one sample per pixel. As used herein, the term "sample" refers to calculated color information that indicates the color, depth (z), transparency, and potentially other information, of a particular point on an object or image. For example, a sample may comprise the following component values: a red value, a green value, a blue value, a z value, and an alpha value (e.g., representing the transparency of the sample). A sample may also comprise other information, e.g., a z-depth value, a blur value, an intensity value, brighter-than-bright information, and an indicator that the sample consists partially or completely of control information rather than color information (i.e., "sample control information"). By calculating more samples than pixels (i.e., super-sampling), a more detailed image is calculated than can be displayed on the display device. For example, a graphics system may calculate four samples for each pixel to be output to the display device. After the samples are calculated, they are then combined or filtered to form the pixels that are stored in the frame buffer and then conveyed to the display device. Using pixels formed in this manner may create a more realistic final image because overly abrupt changes in the image may be smoothed by the filtering process.

These prior art super-sampling systems typically generate a number of samples that are far greater than the number of pixel locations on the display. These prior art systems typically have rendering processors that calculate the samples and store them into a render buffer. Filtering hardware then reads the samples from the render buffer, filters the samples to create pixels, and then stores the pixels in a traditional frame buffer. The traditional frame buffer is typically double-buffered, with one side being used for refreshing the display device while the other side is updated by the filtering hardware. Once the samples have been filtered, the resulting pixels are stored in a traditional frame buffer that is used to refresh the display device. These systems, however, have generally suffered from limitations imposed by the conventional frame buffer and by the added latency caused by the render buffer and filtering. Therefore, an improved graphics system is desired which includes the benefits of pixel super-sampling while avoiding the drawbacks of the conventional frame buffer.

A graphics system configured to overcome these drawbacks was proposed in U.S. patent application Ser. No. 09/251,840 titled "A GRAPHICS SYSTEM WITH A VARIABLE-RESOLUTION SAMPLE BUFFER" which is incorporated herein by reference in its entirety.

Although the effects of filtering yield images that are typically pleasing to the eye, filtering may also generate undesirable artifacts. In some situations, a filter having negative weights as well as positive weights may be used. For example, filters such as the windowed Sinc filter, the Mitchell-Netravali filter, etc. have negative lobes as well as one or more positive lobes. A negative lobe is a portion of the filter where the filter function attains negative values. A positive lobe is a portion of the filter where the filter function attains positive values.

Low-pass filters may be used to remove high spatial frequencies in a sampled image. The ideal low-pass filter corresponds to an infinite Sinc function in the X-Y domain, and a cylinder in the spatial frequency domain. The spatial width (e.g. the width of the main positive lobe) of the Sinc function primarily determines the cutoff spatial frequency of the low-pass filter. Many low-pass filters have negative lobes in an attempt to emulate some of the structure of the Sinc function over a finite support. Of course, all realizable filters have finite support (i.e. extent in the X-Y domain).

As a result of using filters with negative lobes and finite support, pixels with negative intensity values may be generated. Negative intensity values cannot be realized on a display device. A typical solution to these negative intensity values in prior art systems is to clip these values to zero, which means representing the pixel as black. As a result of this clipping, undesirable artifacts may become apparent, such as ringing or fringing (i.e. either light or dark bands echoing the edges of large transitions in intensities). Thus, a graphics system is desired that retains the benefits of real-time filtering of samples while reducing or eliminating the undesirable effects of negative lobes.

In addition to negative lobes, another impediment to realistic images is the variable nature of current display devices. Different displays (e.g., differing by display technology, age, or manufacturer) have different characteristics. For example, a CRT may have pixels that have more of a Gaussian intensity spread around the pixel. On the other hand, LCDs may have more of a square intensity distribution in their pixels. Furthermore, this situation is further complicated by different users having different preferences for the visual appearance of displayed images. For example, what might appear as an acceptably sharp image to one user may appear to another user as excessively smoothed. Thus, a graphics system is desired that can dynamically adjust the filter type, filter function and/or the filter support in response to user input. In addition, a graphics system is desired with the ability to detect the output of the display device and dynamically adjust the filter in response thereto.

SUMMARY OF THE INVENTION

A computer graphics system that utilizes a graphics processor, a sample buffer and one or more sample-to-pixel calculation units for refreshing a display is contemplated. The graphics processor generates a plurality of samples in response to an input stream of 3D graphics data, and stores the samples into the sample buffer. The graphics processor preferably generates and stores more than one sample for at least a subset of the pixel locations on the display. Thus, the sample buffer may be a super-sampled sample buffer which stores a number of samples that, in some embodiments, may be far greater than the number of pixel locations on the display. In other embodiments, the total number of samples may be closer to, equal to, or even less than the total number of pixel locations on the display device, but the samples may be more densely positioned in certain areas and less densely positioned in other areas.

The sample-to-pixel calculation units are configured to read the samples from the super-sampled sample buffer and filter or convolve the samples to generate output pixels. The output pixels are then provided to refresh the display. Note that, as used herein, the term "filter" refers to mathematically manipulating one or more samples to generate a pixel (e.g., by averaging, convolving, summing, applying a filtering function, weighting the samples and then manipulating them, applying a randomized function, etc.). The sample-to-pixel calculation units select one or more samples and filters them to generate an output pixel. Note that the number of samples selected and/or filtered by the a given sample-to-pixel calculation unit may be one or, as in the preferred embodiment, greater than one.

In some embodiments, the graphics system may operate without a conventional frame buffer. In other words, the output pixel stream generated by the sample-to-pixel calculation units may be supplied to the display device without an intervening frame buffer. Note that some displays may have internal frame buffers, but these are considered an integral part of the display device, not the graphics system. Thus, the sample-to-pixel calculation units may calculate each pixel for each screen refresh on a real-time basis. As used herein, the term "real-time" refers to a function that is performed at or near the display device's refresh rate. "On-the-fly" means at, near, or above the human visual system's perception capabilities for motion fusion (how often a picture must be changed to give the illusion of continuous motion) and/or flicker fusion (how often light intensity must be changed to give the illusion of continuous illumination). These concepts are further described in the book "Spatial Vision" by Russel L. De Valois and Karen K. De Valois, Oxford University Press, 1988.

In some embodiments, the graphics system may be operable to dynamically adjust the filter used for generating the output pixels in response to a subset of the output pixels having negative values. Pixels with negative values may be generated, for example, as a result of using a filter with negative lobes. The graphics system may include a negativity computation unit configured to receive the output pixels from the sample-to-pixel calculation units, and to compute a frame negativity value based on the negative pixels (or a subset of the negative pixels) in a frame. The negativity computation unit may compute the frame negativity value in parallel with the generation of the output pixels.

In one set of embodiments, the negativity computation unit first generates a histogram of the negative pixel values. A conventional histogram may be used or a histogram having binary cell widths may be used. The frame negativity value may be computed by forming a weighted average of all the cell sizes in the histogram. Cell sizes corresponding to cells of low negativity may be weighted less than cell sizes corresponding to cells of high negativity. The frame negativity value may be compared against a predetermined negativity threshold. Note that the frame negativity value, as referred to herein, is a positive number. The current filter may remain in force if the frame negativity value is less than the threshold. When the frame negativity value is above the threshold value, the graphics system may dynamically adjust the filter in order to reduce the negativity value for subsequent frames.

In one embodiment, the sample-to-pixel calculation units may apply the adjusted filter to the filtration of samples starting with the next frame. In other embodiments, the sample-to-pixel calculation units may apply the adjusted filter to the filtration of samples starting with the frame after next frame, or more generally, with the $N^{th}$ subsequent frame. In some embodiments, the graphics system may employ a level of hysteresis to prevent flickering.

The graphics system may continue to monitor the frame negativity value and continue to re-adjust the filter. In one embodiment, the graphics system may modify the filter coefficients in response to the frame negativity value continuing to increase.

In some embodiments, the filter may be dynamically adjusted in response to receiving user input. Different users may have different preferences as to the quality of an image. Certain users may prefer, for example, an image that is sharper, whereas other users may prefer an image that is less sharp and softer. Furthermore, different displays may have a different response to the same pixel values. For example, a CRT has a Gaussian intensity distribution about each pixel, while an LCD has a square intensity distribution with a sharp cut-off in intensity about every pixel. Thus, a user may be able to obtain the same visual effect from a CRT and from an LCD, for example, by dynamically adjusting the filter type, the filter function and/or the filter support.

In one embodiment, the user may be able to change the filter type, filter function and/or filter support on a per region basis. For example, a background scene may be more appropriately displayed using a softer filter than the foreground portions of the scene.

In a second embodiment, the graphics system may be operable to dynamically adjust the filter type, filter function and/or the filter support in response to measurements obtained by a display-monitoring system coupled to the graphics system. An example of a display-monitoring system may be a video camera configured to capture the image displayed by the display device. In one embodiment, after capturing the image frames from the video camera, the graphics system computes a sharpness value for each of the captured frames. The graphics system may also compute a sharpness value for every other frame, every other two frames, etc. if computational power is limited.

The graphics system may be further configured to compare the calculated sharpness value to a desired sharpness value. In response to the calculated sharpness value being above or below the desired value, the graphics system may dynamically adjust the filter type, the filter function and/or the filter support in order to return the sharpness value within a certain percentage of the desired value. For example, the graphics system may accomplish this by choosing different filter types and/or by adjusting the filter parameters, such as raising or lowering the filtering coefficients, adjusting the width of the filter, or extending or restricting the support of the filter (i.e., the bounds of the filter).

In another embodiment, the graphics system may be configured to compute a similarity value for each frame by comparing the captured image provided by the display-monitoring device to the generated output pixels. The graphics system may be further configured to compare the similarity value to a desired similarity value. In response to the similarity value being below a desired threshold, the graphics system may dynamically adjust the filter type and/or the filter parameters in order to obtain a similarity value for subsequent frames that is above the desired threshold.

BRIEF DESCRIPTION OF THE DRAWINGS

The foregoing, as well as other objects, features, and advantages of this invention may be more completely understood by reference to the following detailed description when read together with the accompanying drawings in which:

FIG. 23A shows one embodiment of a truncated sinc filter as a function of radius;

FIG. 23B shows one embodiment of a Catmull-Rom filter as a function of radius;

FIG. 23C shows one embodiment of a cubic B-spline filter;

FIG. 23E illustrates a cardinal cubic spline filter, i.e. a Mitchell-Netravali filter with parameters B=0; and C=1;

FIG. 24 illustrates an upward shifted and truncated sinc filter, which the minimum of the filter has be raised to the level of the horizontal axis;

Figure 1:
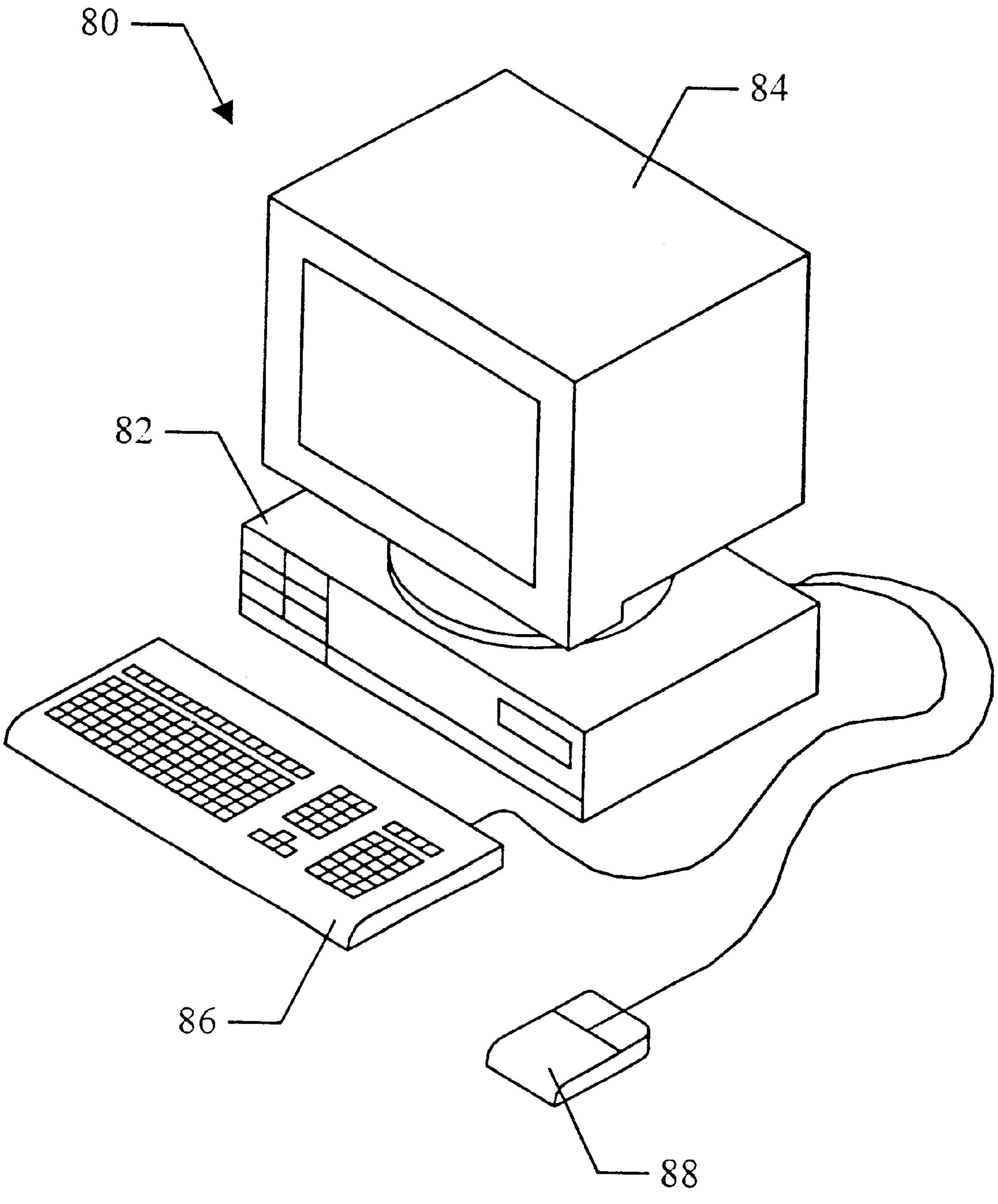
FIG. 1 illustrates one embodiment of a computer system that includes one embodiment of a graphics system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular forms disclosed, but on the contrary, the intention is to cover all modifications, equivalents and alternatives falling within the spirit and scope of the present invention as defined by the appended claims. Please note that the section headings used herein are for organizational purposes only and are not meant to limit the description or claims. The word "may" is used in this application in a permissive sense (i.e., having the potential to, being able to), not a mandatory sense (i.e., must). Similarly, the word include, and derivations thereof, are used herein to mean "including, but not limited to."

DETAILED DESCRIPTION OF SEVERAL EMBODIMENTS

Computer System—FIG. 1

FIG. 1 shows one embodiment of a computer system 80 that includes a three-dimensional (3-D) graphics system. The computer system may be comprised in any of various systems, including a traditional PC, network PC, Internet appliance, a television, including HDTV systems and interactive television systems, set top boxes, game console, personal digital assistants (PDAs), and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, body sensors, etc.). Application software may be executed by the computer system 80 to display 3-D graphical objects on display device 84. As described further below, the 3-D graphics system in computer system 80 includes a super-sampled sample buffer with a programmable real-time sample-to-pixel calculation unit to improve the quality and realism of images displayed on display device 84.

Figure 2:
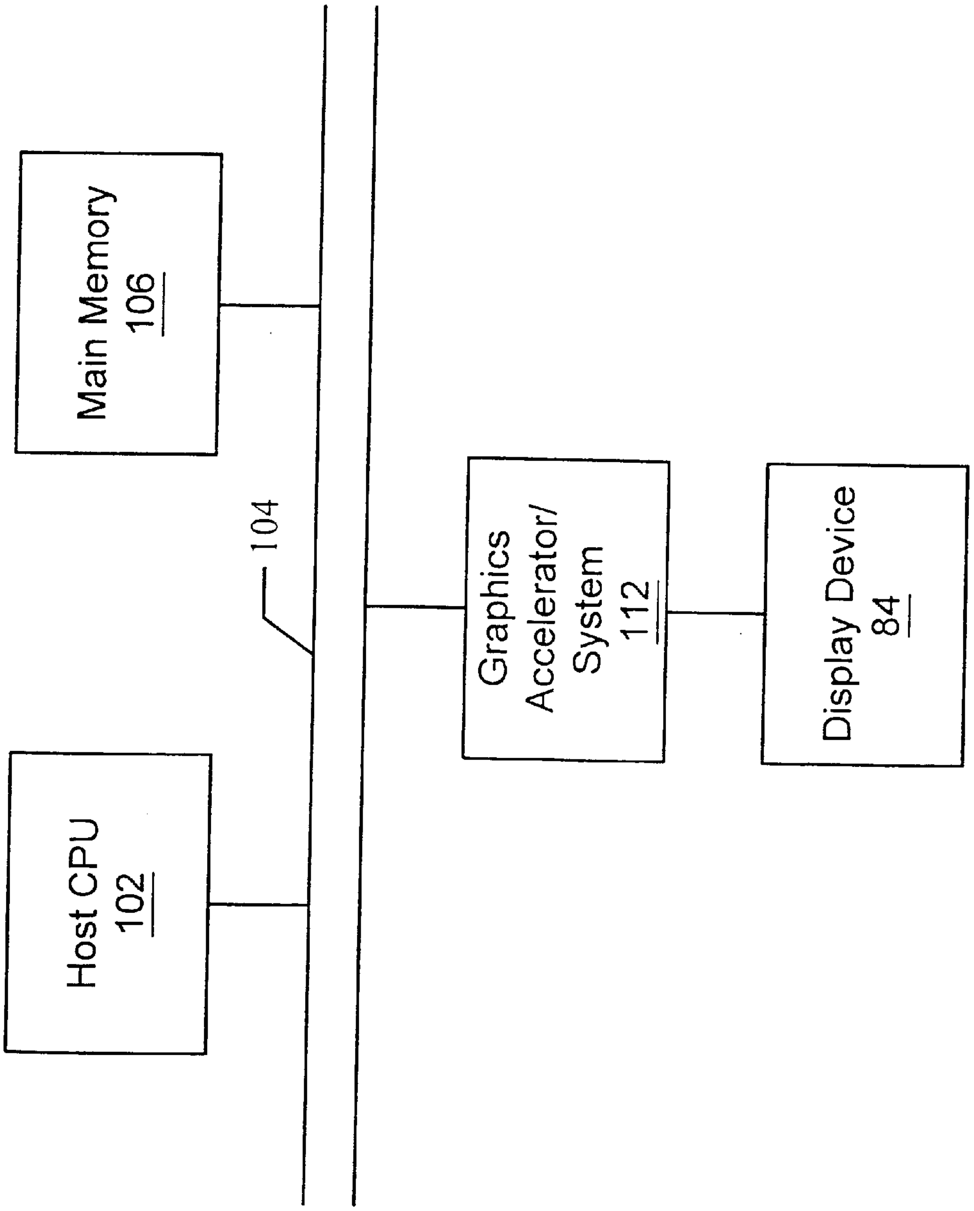
FIG. 2 is a simplified block diagram of the computer system of FIG. 1.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs", synchronous dynamic random access memories or "SDRAMs", and Rambus dynamic access memories or "RDRAM", among others) and mass storage devices. The system bus or host bus 104 may comprise one or more communication or host computer buses (for communication between host processors, CPUs, and memory subsystems) as well as specialized subsystem buses.

A 3-D graphics system or graphics system 112 according to the present invention is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the 3-D graphics system may be coupled to one or more of the buses in computer system 80 and/or may be coupled to various types of buses. In addition, the 3D graphics system may be coupled to a communication port and thereby directly receive graphics data from an external source, e.g., the Internet or a network. As shown in the figure, display device 84 is connected to the 3-D graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL® or Java 3D™ may execute on host CPU 102 and generate commands and data that define a graphics primitive (graphics data) such as a polygon for output on display device 84. As defined by the particular graphics interface used, these primitives may have separate color properties for the front and back surfaces. Host processor 102 may transfer these graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

As will be described below, graphics system 112 may be configured to allow more efficient microcode control, which results in increased performance for handling of incoming color values corresponding to the polygons generated by host processor 102. Note that while graphics system 112 is depicted as part of computer system 80, graphics system 112 may also be configured as a stand-alone device (e.g., with its own built-in display) or as part of another device, such as a PDA, television, or any other device with display capabilities. Graphics system 112 may also be configured as a single-chip device or as part of a system-on-a-chip or a multi-chip module.

Figure 3:
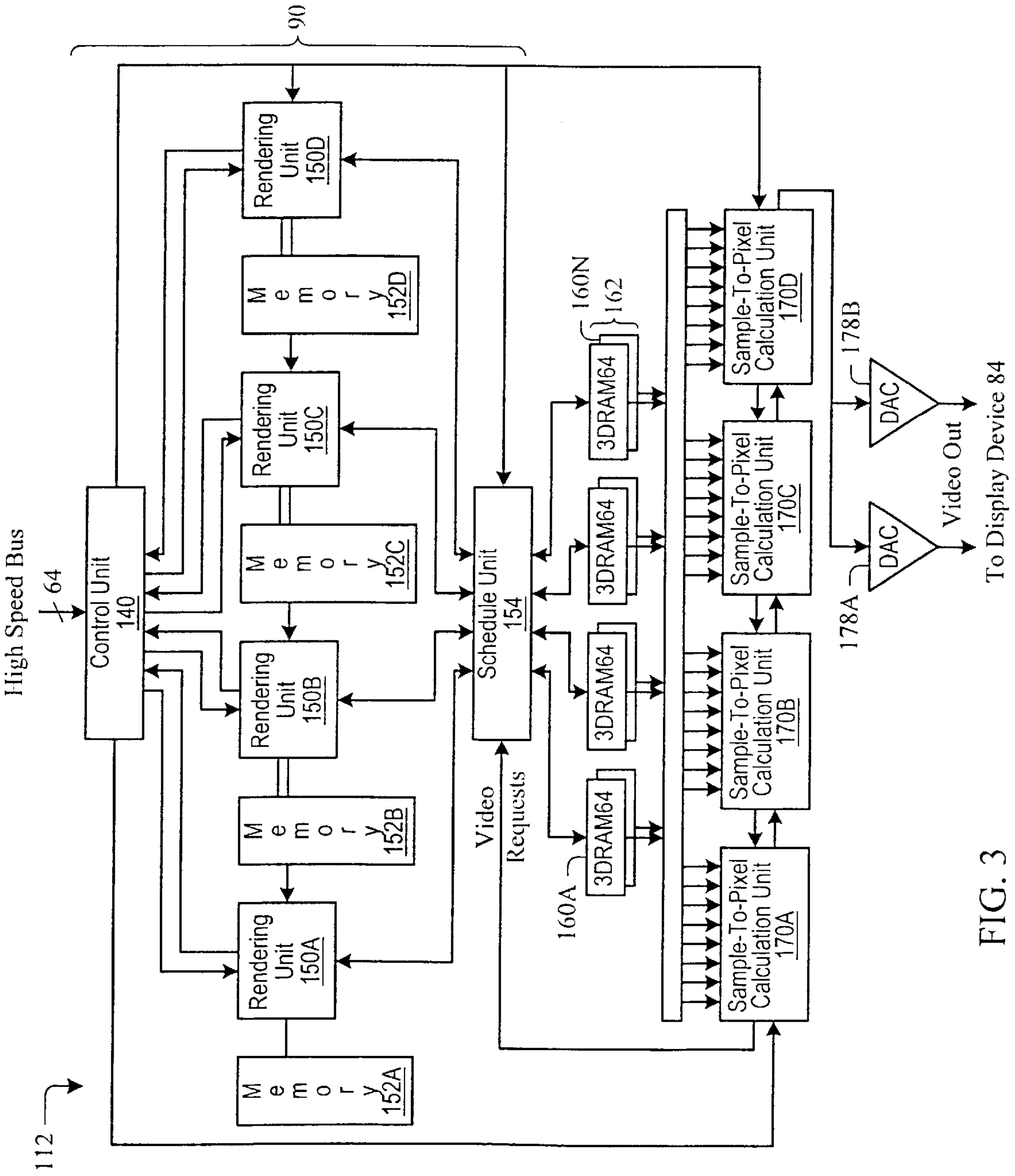
FIG. 3 is a block diagram illustrating more details of one embodiment of the graphics system of FIG. 1.

Graphics System—FIG. 3

Referring now to FIG. 3, a block diagram illustrating details of one embodiment of graphics system 112 is shown. As shown in the figure, graphics system 112 may comprise one or more graphics processors 90, one or more super-sampled sample buffers 162, and one or more sample-to-pixel calculation units 170A–D. Graphics system 112 may also comprise one or more digital-to-analog converters (DACs) 178A–B. Graphics processor 90 may be any suitable type of high performance processor (e.g., specialized graphics processors or calculation units, multimedia processors, DSPs, or general purpose processors). In one embodiment, graphics processor 90 may comprise one or more rendering units 150A–D. In the embodiment shown, however, graphics processor 90 also comprises one or more control units 140, one or more data memories 152A–D, and one or more schedule units 154. Sample buffer 162 may comprises one or more sample memories 160A–160N as shown in the figure.

A. Control Unit

Control unit 140 operates as the interface between graphics system 112 and computer system 80 by controlling the transfer of data between graphics system 112 and computer system 80. In embodiments of graphics system 112 that comprise two or more rendering units 150A–D, control unit 140 may also divide the stream of data received from computer system 80 into a corresponding number of parallel streams that are routed to the individual rendering units 150A–D. The graphics data may be received from computer system 80 in a compressed form. This may advantageously reduce the bandwidth requirements between computer system 80 and graphics system 112. In one embodiment, control unit 140 may be configured to split and route the data stream to rendering units 150A–D in compressed form.

The graphics data may comprise one or more graphics primitives. As used herein, the term graphics primitive includes polygons, parametric surfaces, splines, NURBS (non-uniform rational B-splines), sub-divisions surfaces, fractals, volume primitives, and particle systems. These graphics primitives are described in detail in the text book entitled "Computer Graphics: Principles and Practice" by James D. Foley, et al., published by Addison-Wesley Publishing Co., Inc., 1996. Note polygons are referred to throughout this detailed description for simplicity, but the embodiments and examples described may also be used with graphics data comprising other types of graphics primitives.

B. Rendering Units

Rendering units 150A–D (also referred to herein as draw units) are configured to receive graphics instructions and data from control unit 140 and then perform a number of functions, depending upon the exact implementation. For example, rendering units 150A–D may be configured to perform decompression (if the data is compressed), transformation, clipping, lighting, texturing, depth cueing, transparency processing, setup, and screen space rendering of various graphics primitives occurring within the graphics data. Each of these features is described separately below.

Depending upon the type of compressed graphics data received, rendering units 150A–D may be configured to perform arithmetic decoding, run-length decoding, Huffman decoding, and dictionary decoding (e.g., LZ77, LZSS, LZ78, and LZW). In another embodiment, rendering units 150A–D may be configured to decode graphics data that has been compressed using geometric compression. Geometric compression of 3D graphics data may achieve significant reductions in data size while retaining most of the image quality. Two methods for compressing and decompressing 3D geometry are described in U.S. Pat. No. 5,793,371, application Ser. No. 08/511,294, (filed on Aug. 4, 1995, entitled "Method And Apparatus For Geometric Compression Of Three-Dimensional Graphics Data,") and U.S. patent application Ser. No. 09/095,777, filed on Jun. 11, 1998, entitled "Compression of Three-Dimensional Geometry Data Representing a Regularly Tiled Surface Portion of a Graphical Object,").

In embodiments of graphics system 112 that support decompression, the graphics data received by each rendering unit 150 is decompressed into one or more graphics "primitives" which may then be rendered. The term primitive refers to components of objects that define its shape (e.g., points, lines, triangles, polygons in two or three dimensions, polyhedra, or free-form surfaces in three dimensions). Rendering units 150 may be any suitable type of high performance processor (e.g., specialized graphics processors or calculation units, multimedia processors, DSPs, or general purpose processors).

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

Clipping refers to the elimination of graphics primitives or portions of graphics primitives that lie outside of a 3-D view volume in world space. The 3-D view volume may represent that portion of world space that is visible to a virtual observer situated in world space. For example, the view volume may be a solid truncated pyramid generated by a 2-D view window and a viewpoint located in world space. The solid truncated pyramid may be imagined as the union of all rays emanating from the viewpoint and passing through the view window. The viewpoint may represent the world space location of the virtual observer. Primitives or portions of primitives that lie outside the 3-D view volume are not currently visible and may be eliminated from further processing. Primitives or portions of primitives that lie inside the 3-D view volume are candidates for projection onto the 2-D view window.

In order to simplify the clipping and projection computations, primitives may be transformed into a second, more convenient, coordinate system referred to herein as the viewport coordinate system. In viewport coordinates, the view volume maps to a canonical 3-D viewport that may be more convenient for clipping against.

Graphics primitives or portions of primitives that survive the clipping computation may be projected onto a 2-D viewport depending on the results of a visibility determination. Instead of clipping in 3-D, graphics primitives may be projected onto a 2-D view plane (which includes the 2-D viewport) and then clipped with respect to the 2-D viewport.

Screen-space rendering refers to the calculations performed to actually calculate the data used to generate each pixel that will be displayed. In prior art systems, each pixel is calculated and then stored in a frame buffer. The contents of the frame buffer are then output to the display device to create the final image. In the embodiment of graphics system 112 shown in the figure, however, rendering units 150A–D calculate "samples" instead of actual pixel data. This allows rendering units 150A–D to "super-sample" or calculate more than one sample per pixel. Super-sampling is described in greater detail below. The rendering units 150A–D may also generate a greater area of samples than the viewable area of the display 84 for various effects such as panning and zooming. Note that rendering units 150A–B may comprises a number of smaller functional units, e.g., a separate set-up/decompress unit and a lighting unit.

More details on super-sampling are discussed in the following books:

"Principles of Digital Image Synthesis" by Andrew S. Glassner, 1995, Morgan Kaufman Publishing (Volume 1);

The Renderman Companion" by Steve Upstill, 1990, Addison Wesley Publishing; and

"Advanced Renderman: Beyond the Companion" by Anthony A. Apodaca.

C. Data Memories

Each rendering unit 150A–D may be coupled to an instruction and data memory 152A–D. In one embodiment, each data memory 152A–D may be configured to store both data and instructions for rendering units 150A–D. While implementations may vary, in one embodiment each data memory 152A–D may comprise two 8 MByte SDRAMs providing a total of 16 MBytes of storage for each rendering unit 150A–D. In another embodiment, RDRAMs (Rambus DRAMs) may be used to support the decompression and set-up operations of each rendering unit, while SDRAMs may be used to support the draw functions of rendering units 150A–D.

D. Schedule Unit

Schedule unit 154 may be coupled between the rendering units 150A–D and the sample memories 160A–N. Schedule unit 154 is configured to sequence the completed samples and store them in sample memories 160A–N. Note in larger configurations, multiple schedule units 154 may be used in parallel. In one embodiment, schedule unit 154 may be implemented as a crossbar switch.

E. Sample Memories

Super-sampled sample buffer 162 comprises sample memories 160A–160N, which are configured to store the plurality of samples generated by the rendering units. As used herein, the term "sample buffer" refers to one or more memories that store samples. As previously noted, samples are rendered into the sample buffer 162 at positions in the sample buffer which correspond to locations in screen space on the display. The positions may be calculated using various methods, such as grid-based position generation, stochastic position generation, or perturbed grid position generation, among others. The positions may be calculated or programmatically determined on a per frame basis, a per bin basis, or even a per sample basis. In one embodiment, sample position information is stored with the samples in the sample buffer.

One or more samples are then filtered to form each output pixels (i.e., pixels to be displayed on a display device). The number of samples stored may be greater than, equal to, or less than the total number of pixels output to the display device to refresh a single frame. Each sample may correspond to one or more output pixels. As used herein, a sample "corresponds" to an output pixel when the sample's information contributes to final output value of the pixel. Note, however, that some samples may contribute zero to their corresponding output pixel after filtering takes place.

Stated another way, the sample buffer stores a plurality of samples that have positions that correspond to locations in screen space on the display, i.e., the samples contribute to one or more output pixels on the display. The number of stored samples may be greater than the number of pixel locations, and more than one sample may be combined in the convolution (filtering) process to generate a particular output pixel displayed on the display device. Any given sample may contribute to one or more output pixels.

Sample memories 160A–160N may comprise any of a number of different types of memories (e.g., SDRAMs, SRAMs, RDRAMs, 3DRAMs, or next-generation 3DRAMs) in varying sizes. In one embodiment, each schedule unit 154 is coupled to four banks of sample memories, wherein each bank comprises four 3DRAM-64 memories. Together, the 3DRAM-64 memories may form a 116-bit deep super-sampled sample buffer that stores multiple samples per pixel. For example, in one embodiment, each sample memory 160A–160N may store up to sixteen samples per pixel.

3DRAM-64 memories are specialized memories configured to support full internal double buffering with single buffered Z in one chip. The double buffered portion comprises two RGBX buffers, wherein X is a fourth channel that can be used to store other information (e.g., alpha). 3DRAM-64 memories also have a lookup table that takes in window ID information and controls an internal 2-1 or 3-1 multiplexer that selects which buffer's contents will be output. 3DRAM-64 memories are next-generation 3DRAM memories that may soon be available from Mitsubishi Electric Corporation's Semiconductor Group. In one embodiment, 32 chips used in combination are sufficient to create a double-buffered 1280×1024 super-sampled sample buffer.

Since the memories are internally double-buffered, the input pins for each of the two frame buffers in the double-buffered system are time multiplexed (using multiplexers within the memories). The output pins may similarly be time multiplexed. This allows reduced pin count while still providing the benefits of double buffering. 3DRAM-64 memories further reduce pin count by not having z output pins. Since z comparison and memory buffer selection is dealt with internally, this may simplify sample buffer 162 (e.g., using less or no selection logic on the output side). Use of 3DRAM-64 also reduces memory bandwidth since information may be written into the memory without the traditional process of reading data out, performing a z comparison, and then writing data back in. Instead, the data may be simply written into the 3DRAM-64, with the memory performing the steps described above internally.

However, in other embodiments of graphics system 112, other memories (e.g., SDRAMs, SRAMs, RDRAMs, or current generation 3DRAMs) may be used to form sample buffer 162.

Graphics processor 90 may be configured to generate a plurality of sample positions according to a particular sample-positioning scheme (e.g., a regular grid, a perturbed regular grid, stochastic, etc.). The sample position information for each of the samples may be stored for later use by the sample-to-pixel calculation unit(s). For example, the graphics processor 90 may store the sample position information in the sample buffer with the samples, or may store the sample position information in a separate sample position memory. Alternatively, the sample positions (or position information (e.g., offsets that are added to regular grid positions to form the sample positions) may be predetermined or pre-computed using one of the above schemes and simply read from the sample position memory (e.g., a RAM/ROM table). The sample position information may be pre-computed by the graphics processor, by the host CPU, or by other logic.

The sample position information may comprise coordinate values relative to a sample buffer coordinate system, e.g., coordinate values relative to the display screen space. The sample position information may also comprise offset values, wherein the offset values are relative to pre-defined locations in the sample buffer, such as a pre-defined regular grid, pre-defined bins, or pixel center coordinates.

Upon receiving a polygon that is to be rendered, graphics processor 90 determines which samples reside within the polygon based upon the sample position information. Graphics processor 90 renders the samples that reside within the polygon and stores rendered samples in sample memories 160A–N. Note that as used herein the terms "render" and "draw" are used interchangeably and refer to calculating color values for samples. Depth samples, including one or more of color values, depth values, alpha values, blur values, and other per-sample values may also be calculated in the rendering or drawing process.

F. Sample-to-pixel Calculation Units

Sample-to-pixel calculation units 170A–D (sometimes collectively referred to as sample-to-pixel calculation unit 170) may be coupled between sample memories 160A–N and DACs 178A–B. Sample-to-pixel calculation units 170A–D are configured to read selected samples from sample memories 160A–N, wherein the 160A–N samples are selected based on the position information of the samples, and then perform a convolution (e.g., a filtering and weighting function or a low pass filter) on the samples to generate the output pixel values which are output to DACs 178A–B. The sample-to-pixel calculation units 170A–D may be programmable to allow them to perform different filter functions at different times, depending upon the type of output desired.

In one embodiment, the sample-to-pixel calculation units 170A–D may implement a super-sample reconstruction band-pass filter to convert the super-sampled sample buffer data (stored in sample memories 160A–N) to single pixel values. The support of the band-pass filter may cover a rectangular area M pixels high and N pixels wide. Thus, the number of samples covered by the band-pass filter is approximately equal to $M \cdot N \cdot S$, where S is the number of samples per pixel. A variety of values for M, N, & S are contemplated. For example, in one embodiment of the band-pass filter M=N=5. It is noted that with certain sample positioning schemes, the number of samples that fall within the filter support may vary as the filter center (i.e., pixel center) moves.

In other embodiments, calculation units 170A–D may filter a selected number of samples to calculate an output pixel. The selected samples may be multiplied by a spatial weighting function that gives weights to samples based on their position with respect to the center of the pixel being calculated.

The filtering operations performed by sample-to-pixel calculation units 170 may use any of a variety of filters, either alone or in combination. For example, the filtering operations may comprise convolution with a box filter, a tent filter, a cylindrical filter, a cone filter, a Gaussian filter, any filter in the Mitchell-Netravali family (e.g. the Catmull-Rom filter), a windowed Sinc filter, etc. Furthermore, the support of the filters used by sample-to-pixel calculation units 170 may be circular, elliptical, rectangular (e.g., square), triangular, hexagonal, etc.

Sample-to-pixel calculation units 170A–D may also be configured with one or more of the following features: color look-up using pseudo color tables, direct color, inverse gamma correction, filtering of samples to pixels, and conversion of pixels to non-linear light space. Other features of sample-to-pixel calculation units 170A–D may include programmable video timing generators, programmable pixel clock synthesizers, cursor generators, color space converters, and crossbar functions. Once the sample-to-pixel calculation units have manipulated the timing and color of each pixel, the pixels are output to DACs 178A–B.

G. DACs

DACs 178A–B operate as the final output stage of graphics system 112. The DACs 178A–B serve to translate the digital pixel data received from cross units 174A–B into analog video signals that are then sent to the display device. Note in one embodiment DACs 178A–B may be bypassed or omitted completely in order to output digital pixel data in lieu of analog video signals. This may be useful when display device 84 is based on a digital technology (e.g., an LCD-type display, LCOS display, or a digital micro-mirror display).

Figure 4:
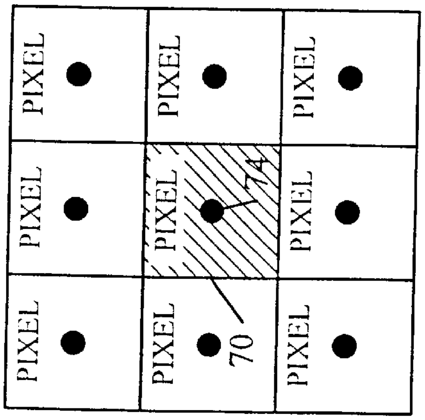
FIG. 4 is diagram illustrating traditional pixel calculation.

Super-Sampling—FIGS. 4–5

Turning now to FIG. 4, an example of traditional, non-super-sampled pixel value calculation is illustrated. Each pixel has exactly one data point calculated for it, and the single data point is located at the center of the pixel. For example, only one data point (i.e., sample 74) contributes to value of pixel 70.

Figure 5A:
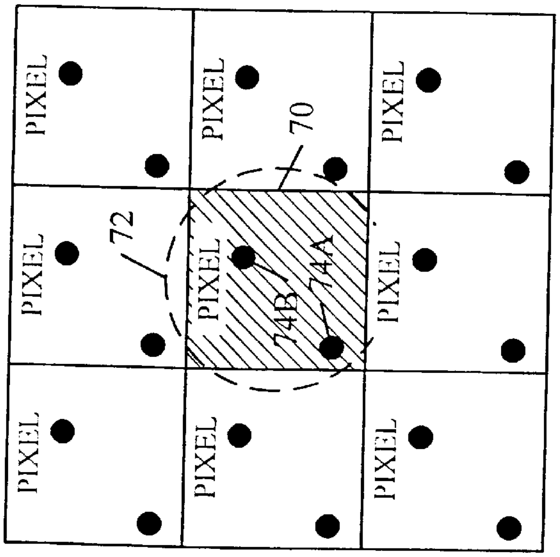
FIG. 5A is diagram illustrating one embodiment of super-sampling.

Turning now to FIG. 5A, an example of one embodiment of super-sampling is illustrated. In this embodiment, a number of samples are calculated. The number of samples may be related to the number of pixels or completely independent of the number of pixels. In this example, there are 18 samples distributed in a regular grid across nine pixels. Even with all the samples present in the figure, a simple one to one correlation could be made (e.g., by throwing out all but the sample nearest to the center of each pixel). However, the more interesting case is performing a filtering function on multiple samples to determine the final pixel values. Also, as noted above, a single sample can be used to generate a plurality of output pixels, i.e., sub-sampling.

A circular filter 72 is illustrated in the figure. In this example, samples 74A–B both contribute to the final value of pixel 70. This filtering process may advantageously improve the realism of the image displayed by smoothing abrupt edges in the displayed image (i.e., performing anti-aliasing). Filter 72 may simply average samples 74A–B to form the final value of output pixel 70, or it may increase the contribution of sample 74B (at the center of pixel 70) and diminish the contribution of sample 74A (i.e., the sample farther away from the center of pixel 70). Circular filter 72 is repositioned for each output pixel being calculated so the center of filter 72 coincides with the center position of the pixel being calculated. Other filters and filter positioning schemes are also possible and contemplated.

Figure 5B:
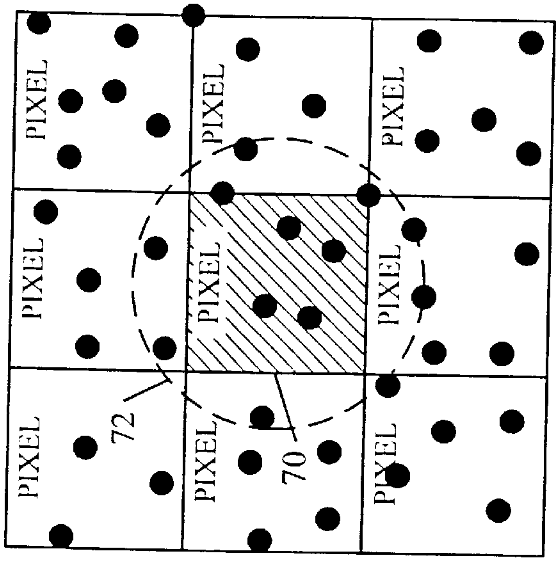
FIG. 5B is diagram illustrating a random distribution of samples.
Figure 6:
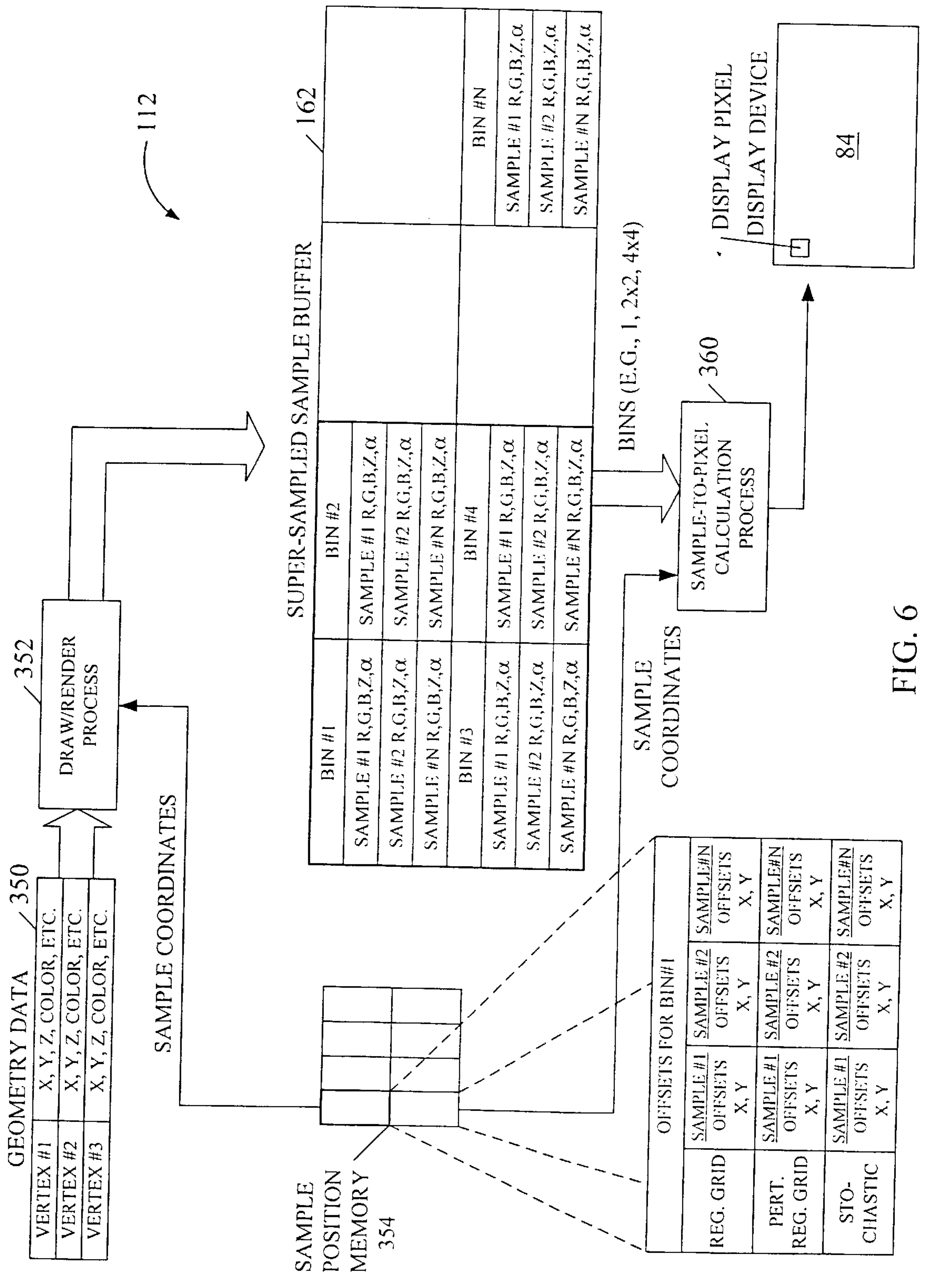
FIG. 6 is a diagram illustrating details of one embodiment of a graphics system having one embodiment of a variable resolution super-sampled sample buffer.

Turning now to FIG. 5B, another embodiment of super-sampling is illustrated. In this embodiment, however, the samples are positioned randomly. More specifically, different sample positions are selected and provided to graphics processor 90 (and render units 150A–D), which calculate color information to form samples at these different locations. Thus the number of samples falling within filter 72 may vary from pixel to pixel.

Super-Sampled Sample Buffer with Real-Time Convolution—FIGS. 6–13

FIGS. 6A, 6B, 7A and 7B illustrate possible configurations for the flow of data through one embodiment of graphics system. As the figures show, geometry data 350 is received by graphics system 112 and used to perform draw or render process 352. The draw process 352 is implemented by one or more of control unit 140, rendering units 150, memories 152, and schedule unit 154. Geometry data 350 comprises data for one or more polygons. Each polygon comprises a plurality of vertices (e.g., three vertices in the case of a triangle), some of which may be shared. Data such as x, y, and z coordinates, color data, lighting data and texture map information may be included for each vertex.

In addition to the vertex data, draw process 352 (which may be performed by rendering units 150A–D) also receives sample position information from a sample position memory 354. Draw process 352 selects the samples that fall within the polygon currently being rendered and calculates a set of values (e.g. red, green, blue, z, alpha, and/or depth of field information) for each of these samples based on their respective positions within the polygon. For example, the z value of a sample that falls within a triangle may be interpolated from the known z values of the three vertices. Each set of computed sample values are stored into sample buffer 162.

In one embodiment, sample position memory 354 is embodied within rendering units 150A–D. In another embodiment, sample position memory 354 may be realized as part of memories 152A–152D, or as a separate memory.

Sample position memory 354 may store sample positions in terms of their sample (virtual) screen coordinates (X, Y). Alternatively, sample position memory 354 may be configured to store only offsets dX and dY for the samples with respect to positions on a regular grid. Storing only the offsets may use less storage space than storing the entire coordinates (X, Y) for each sample. The sample position information stored in sample position memory 354 may be read by a dedicated sample-position calculation unit (not shown) and processed to calculate sample positions for graphics processing unit 90.

In another embodiment, sample position memory 354 may be configured to store a table of random numbers. Sample position memory 354 may also comprise dedicated hardware to generate one or more different types of regular grids. This hardware may be programmable. The stored random numbers may be added as offsets to the regular grid positions generated by the hardware. In one embodiment, sample position memory 354 may be programmable to access or "unfold" the random number table in a number of different ways, and thus may deliver more apparent randomness for a given length of the random number table. Thus, a smaller table may be used without generating the visual artifacts caused by simple repetition of sample position offsets.

Sample-to-pixel calculation process 360 uses the same sample positions as draw process 352. Thus, in one embodiment, sample position memory 354 may generate a sequence of random offsets to compute sample positions for draw process 352, and may subsequently regenerate the same sequence of random offsets to compute the same sample positions for sample-to-pixel calculation process 360. In other words, the unfolding of the random number table may be repeatable. Thus, it may not be necessary to store sample positions at the time of their generation for draw process 352.

As shown in FIGS. 6A and 6B, the sample position information may be stored in a separate sample position memory 354. For example, the sample position information (e.g., offsets that are added to regular grid positions to form the sample positions) may be pre-determined or pre-computed using one of the above schemes and read from the sample position memory 354 (e.g., a RAM/ROM table) during rendering. The sample positions may be pre-computed by the graphics processor 90, by the host CPU, or by other logic as noted above. Alternatively, the graphics processor 90 may generate the sample position information during rendering and store the sample position information In one embodiment, sample position memory 354 may comprise a RAM/ROM that contains stochastic sample points (or locations) for different total sample counts per bin. As used herein, the term "bin" refers to a region or area in screen-space and contains however many samples are in that area (e.g., the bin may be 1×1 pixels in area, 2×2 pixels in area, etc.). The use of bins may simplify the storage and access of samples in sample buffer 162. A number of different bin sizes may be used (e.g., one sample per bin, four samples per bin, etc.). In the preferred embodiment, each bin has an xy-position that corresponds to a particular location on the display. The bins are preferably regularly spaced. In this embodiment, the bins' xy-positions may be determined from the bin's storage location within sample buffer 162. The bins' positions correspond to particular positions on the display. In some embodiments, the bin positions may correspond to pixel centers, while in other embodiments the bin positions correspond to points that are located between pixel centers. The specific position of each sample within a bin may be determined by looking up the sample's offset in the RAM/ROM table (the offsets may be stored relative to the corresponding bin position). However, depending upon the implementation, not all bin sizes may have a unique RAM/ROM entry. Some bin sizes may simply read a subset of the larger bin sizes' entries. In one embodiment, each supported size has at least four different sample-position scheme variants, which may reduce final image artifacts due to repeating sample positions.

In one embodiment, position memory 354 may store pairs of 6-bit numbers, each pair comprising an x-offset and a y-offset (other possible offsets are also possible, e.g., a time offset, a z-offset, etc.). When added to a bin position, each pair defines a particular position in screen space. The term "screen space" refers generally to the coordinate system of the display device. To improve read times, memory 354 may be constructed in a wide/parallel manner so as to allow the memory to output more than one sample location per clock cycle.

Once the sample positions have been read from sample position memory 354, draw process 352 selects the sample positions that fall within the polygon currently being rendered. Draw process 352 then calculates the z and color information (which may include alpha or other depth of field information values) for each of these samples and stores the data into sample buffer 162. In one embodiment, the sample buffer may only single-buffer z values (and perhaps alpha values) while double buffering other sample components such as color. Unlike prior art systems, graphics system 112 may double buffer all samples (although not all sample components may be double-buffered, i.e., the samples may have components that are not double-buffered). In one embodiment, the samples are stored into sample buffer 162 in bins. In some embodiments, the size of bins, i.e., the quantity of samples within a bin, may vary from frame to frame and may also vary across different regions of display device 84 within a single frame. For example, bins along the edges of display device may comprise only one sample, while bins corresponding to pixels near the center of display device 84 may comprise sixteen samples. Note the area of bins may vary from region to region. The use of bins will be described in greater detail below in connection with FIG. 11.

In parallel and independently of draw process 352, filter process 360 is configured to read samples from sample buffer 162, filter (i.e., filter) them, and then output the resulting output pixel to display device 84. Sample-to-pixel calculation units 170 implement filter process 380. Thus, for at least a subset of the output pixels, the filter process is operable to filter a plurality of samples to produce a respective output pixel. In one embodiment, filter process 360 is configured to: (i) determine the distance from each sample to the center of the output pixel being filtered; (ii) multiply the sample's components (e.g., color and alpha) with a filter value that is a specific (programmable) function of the distance; (iii) sum all the weighted samples that contribute to the output pixel, and (iv) normalize the resulting output pixel. The filter process 360 is described in greater detail below (see description accompanying FIGS. 11, 12, and 14). Note the extent of the filter function need not be circular (i.e., it may be a function of x and y instead of the distance), but even if the extent is circular, the filter function need not be circularly symmetrical. The filter's "extent" is the area within which samples can influence the particular pixel being calculated with the filter.

Figure 7:
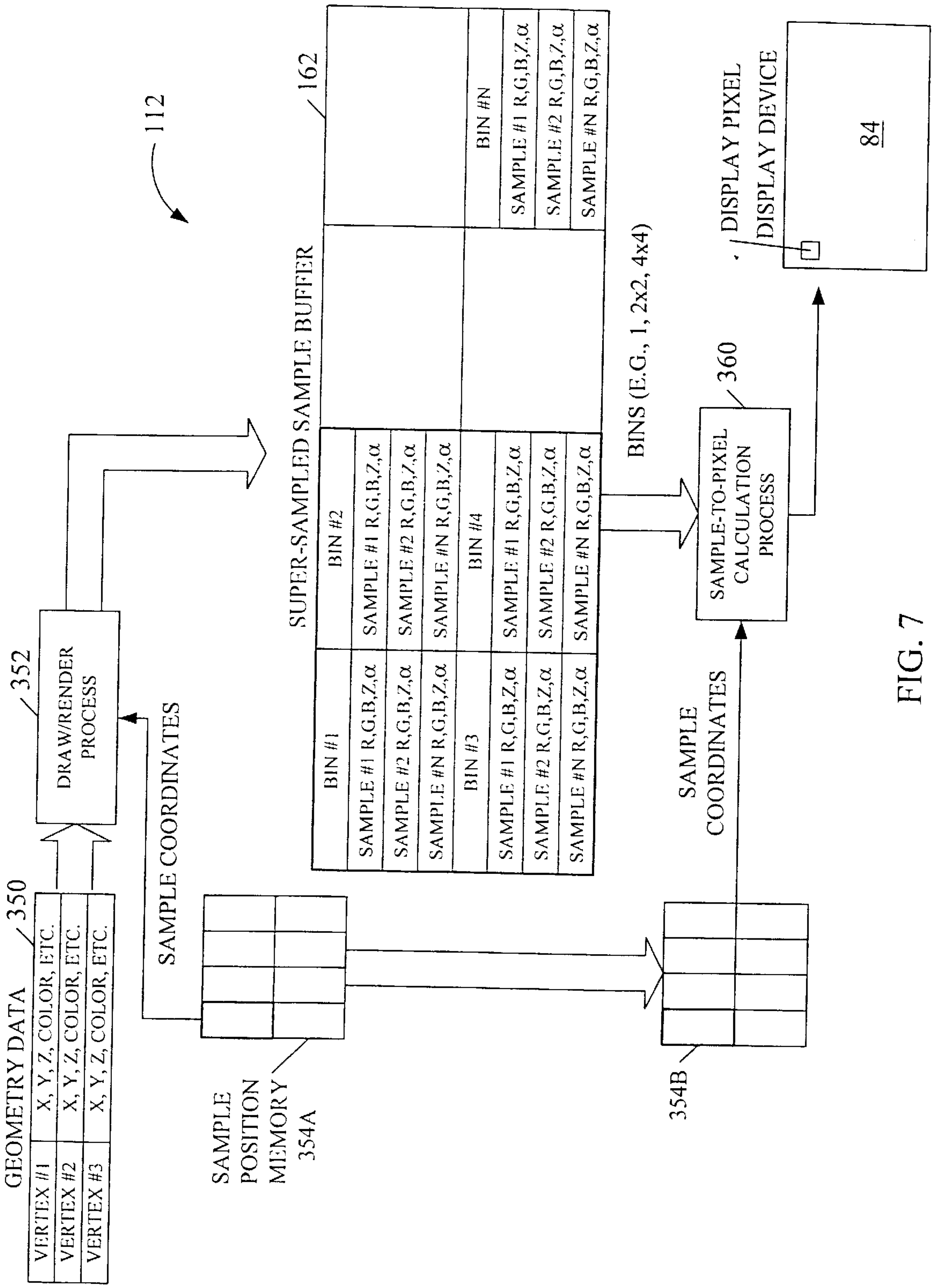
FIG. 7 is a diagram illustrating details of another embodiment of a graphics system having one embodiment of a variable resolution super-sampled sample buffer.

Turning now to FIG. 7, a diagram illustrating an alternate embodiment of graphics system 112 is shown. In this embodiment, two or more sample position memories 354A and 354B are utilized. Thus, the sample position memories 354A–B are essentially double-buffered. If the sample positions are kept the same from frame to frame, then the sample positions may be single buffered. However, if the sample positions may vary from frame to frame, then graphics system 112 may be advantageously configured to double-buffer the sample positions. The sample positions may be double buffered on the rendering side (i.e., memory 354A may be double buffered) and or the filter/convolve side (i.e., memory 354B may be double buffered). Other combinations are also possible. For example, memory 354A may be single-buffered, while memory 354B is doubled buffered. This configuration may allow one side of memory 354B to be used for refreshing (i.e., by filter/convolve process 360) while the other side of memory 354B is used being updated. In this configuration, graphics system 112 may change sample position schemes on a per-frame basis by shifting the sample positions (or offsets) from memory 354A to double-buffered memory 354B as each frame is rendered. Thus, the positions used to calculate the samples (read from memory 354A) are copied to memory 354B for use during the filtering process (i.e., the sample-to-pixel conversion process). Once the position information has been copied to memory 354B, position memory 354A may then be loaded with new sample position offsets to be used for the second frame to be rendered. In this way the sample position information follows the samples from the draw/render process to the filter process.

Yet another alternative embodiment may store tags to offsets with the samples themselves in super-sampled sample buffer 162. These tags may be used to look-up the offset/perturbation associated with each particular sample.

Sample Positioning Schemes

Figure 8:
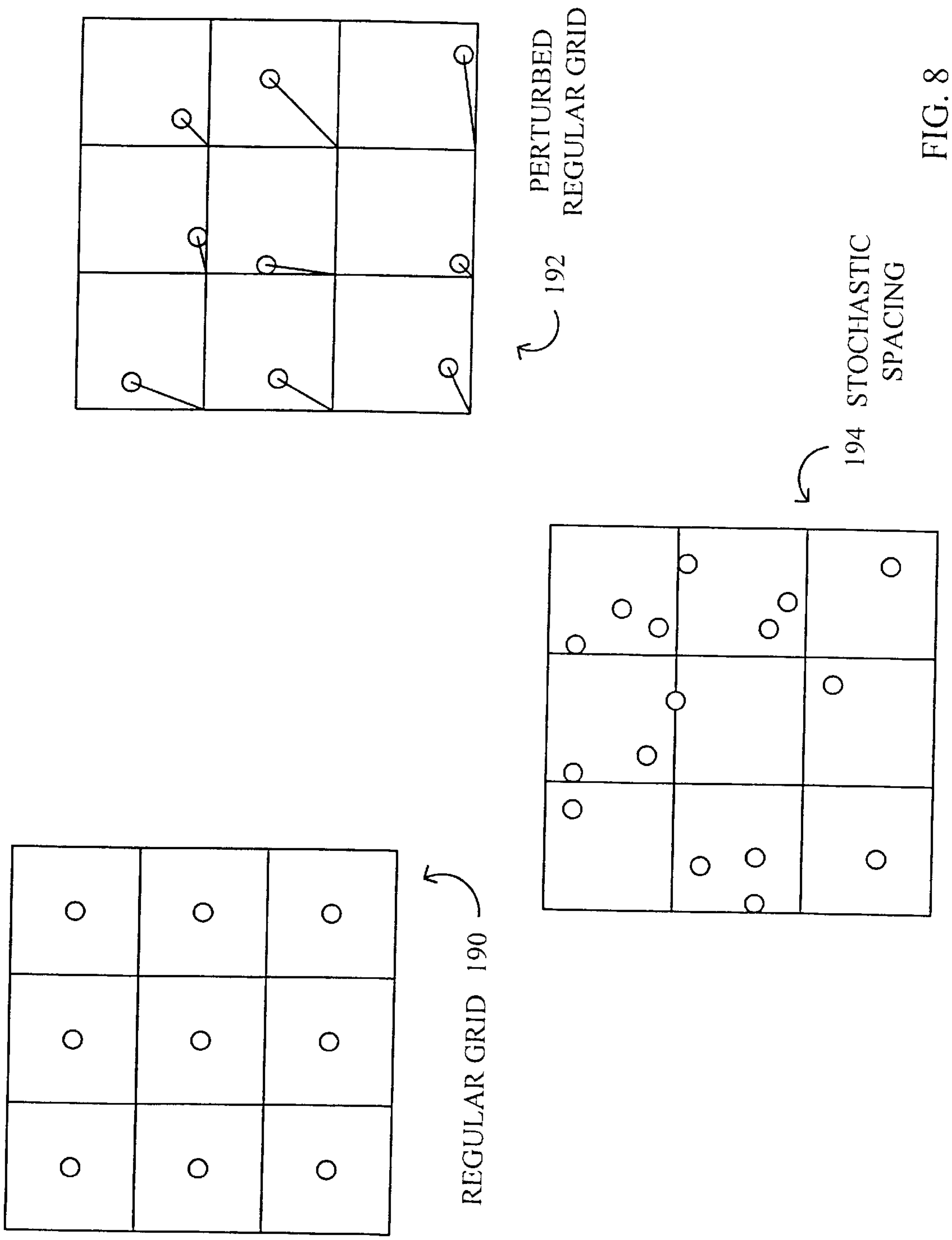
FIG. 8 is a diagram illustrating details of three different embodiments of sample positioning schemes.

FIG. 8 illustrates a number of different sample positioning schemes. In regular grid positioning scheme 190, each sample is positioned at an intersection of a regularly-spaced grid. Note however, that as used herein the term "regular grid" is not limited to square grids. Other types of grids are also considered "regular" as the term is used herein, including, but not limited to, rectangular grids, hexagonal grids, triangular grids, logarithmic grids, and semi-regular lattices such as Penrose tiling.

Perturbed regular grid positioning scheme 192 is based upon the previous definition of a regular grid. However, the samples in perturbed regular grid scheme 192 may be offset from their corresponding grid intersection. In one embodiment, the samples may be offset by a random angle (e.g., from 0° to 360°) and a random distance, or by random x and y offsets, which may or may not be limited to a predetermined range. The offsets may be generated in a number of ways, e.g., by hardware based upon a small number of seeds, looked up from a table, or by using a pseudo-random function. Once again, perturbed regular gird scheme 192 may be based on any type of regular grid (e.g., square, or hexagonal). A rectangular or hexagonal perturbed grid may be particularly desirable due to the geometric properties of these grid types.

Stochastic sample positioning scheme 194 represents a third potential type of scheme for positioning samples. Stochastic sample positioning involves randomly distributing the samples across a region (e.g., the displayed region on a display device or a particular window). Random positioning of samples may be accomplished through a number of different methods, e.g., using a random number generator such as an internal clock to generate pseudo-random numbers. Random numbers or positions may also be pre-calculated and stored in memory.

Figure 9:
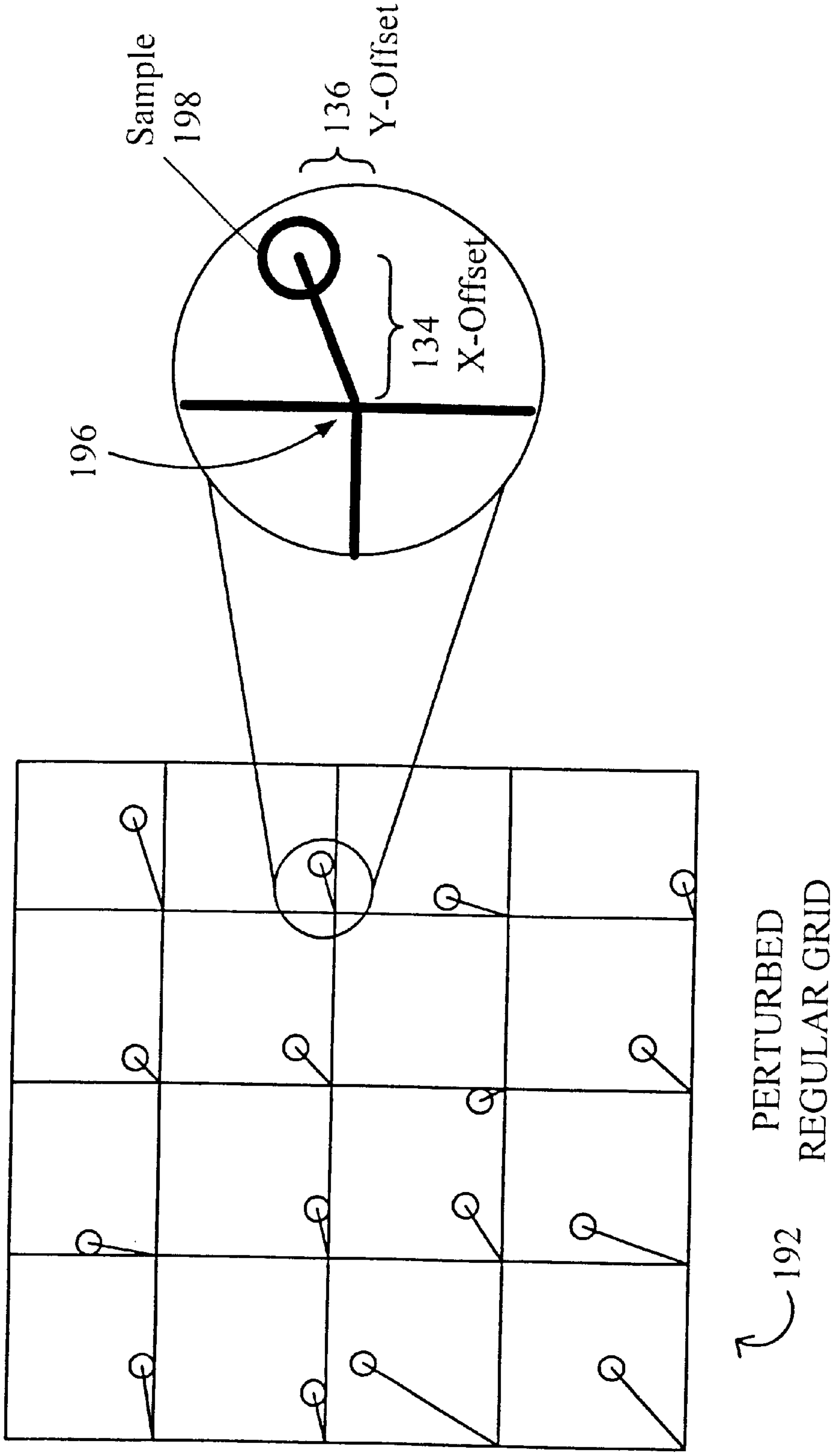
FIG. 9 is a diagram illustrating details of one embodiment of a sample positioning scheme.

Turning now to FIG. 9, details of one embodiment of perturbed regular grid scheme 192 are shown. In this embodiment, samples are randomly offset from a regular square grid by x- and y-offsets. As the enlarged area shows, sample 198 has an x-offset 134 that specifies its horizontal displacement from its corresponding grid intersection point 196. Similarly, sample 198 also has a y-offset 136 that specifies its vertical displacement from grid intersection point 196. The random offset may also be specified by an angle and distance. As with the previously disclosed embodiment that utilized angles and distances, x-offset 134 and y-offset 136 may be limited to a particular minimum and or maximum value or range of values.

Figure 10:
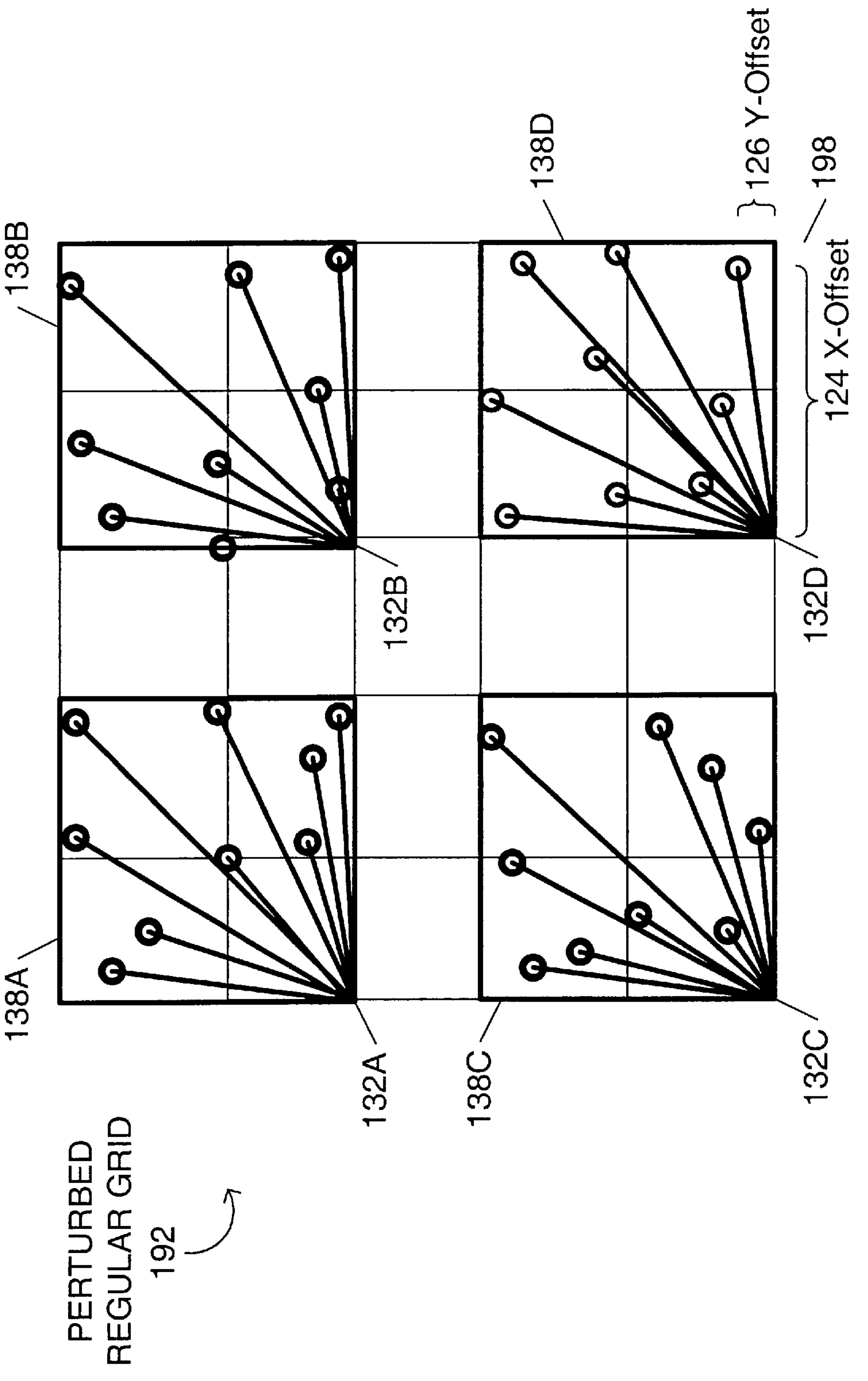
FIG. 10 is a diagram illustrating details of another embodiment of a sample positioning scheme.

Turning now to FIG. 10, details of another embodiment of perturbed regular grid scheme 192 are shown. In this embodiment, the samples are grouped into "bins" 138A–D. In this embodiment, each bin comprises nine (i.e., 3×3) samples. Different bin sizes may be used in other embodiments (e.g., bins storing 2×2 samples or 4×4 samples). In the embodiment shown, each sample's position is determined as an offset relative to the position of the bin. The position of the bins may be defined as any convenient position related to the grid, e.g., the lower left-hand corners 132A–D as shown in the figure. For example, the position of sample 198 is determined by summing x-offset 124 and y-offset 126 to the x and y coordinates of the corner 132D of bin 138D. As previously noted, this may reduce the size of the sample position memory used in some embodiments.

Figure 11:
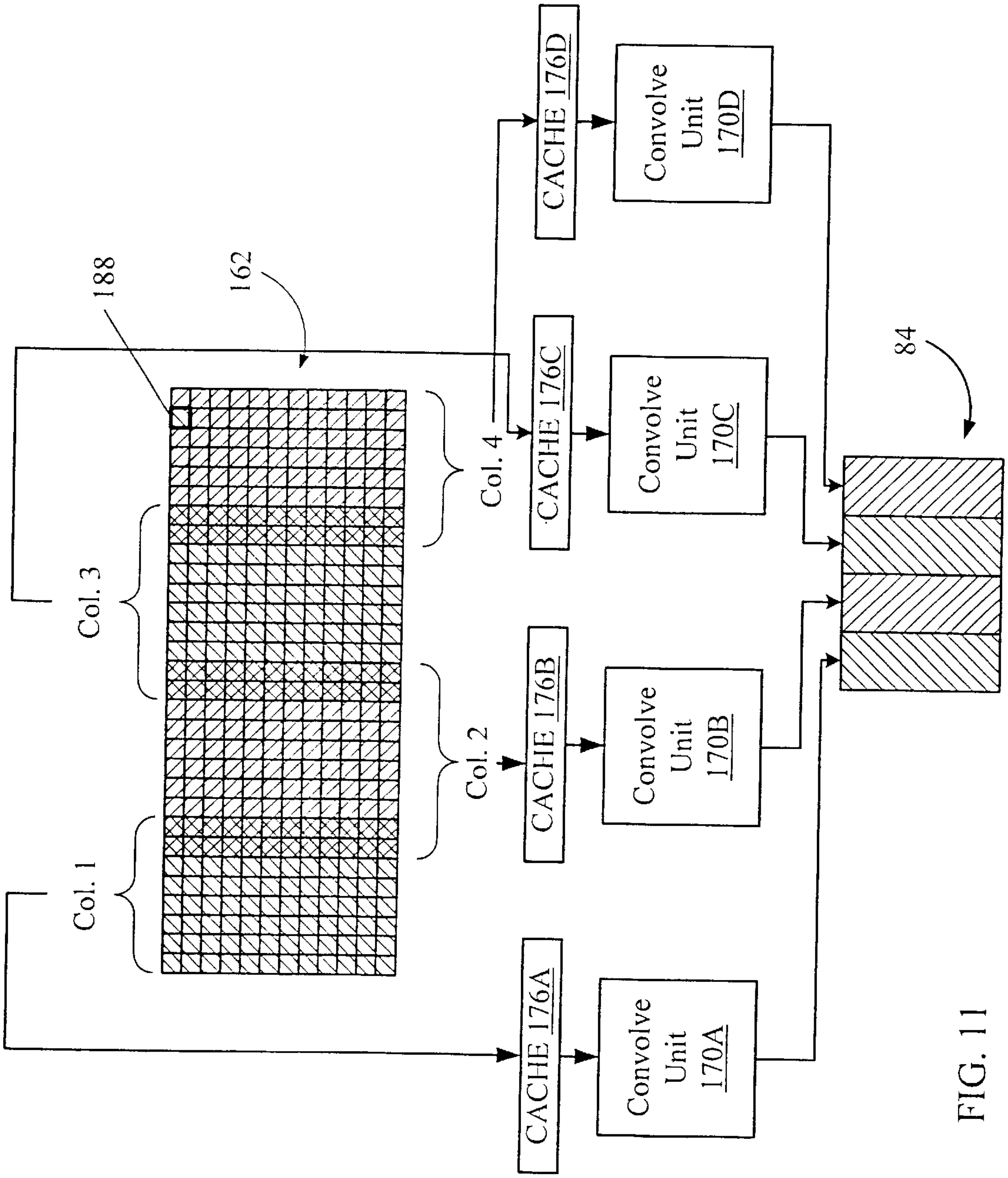
FIG. 11 is a diagram illustrating details of method of converting samples to pixels in parallel.

Turning now to FIG. 11, one possible method for rapidly converting samples stored in sample buffer 162 into pixels is shown. In this embodiment, the contents of sample buffer 162 are organized into columns (e.g., Cols. 1–4). Each column in sample buffer 162 may comprise a two-dimensional array of bins. The columns may be configured to horizontally overlap (e.g., by one or more bins), and each column may be assigned to a particular sample-to-pixel calculation unit 170A–D for the convolution process. The amount of the overlap may depend upon the extent of the filter being used. The example shown in the figure illustrates an overlap of two bins (each square such as square 188 represents a single bin comprising one or more samples). Advantageously, this configuration may allow sample-to-pixel calculation units 170A–D to work independently and in parallel, with each sample-to-pixel calculation unit 170A–D receiving and converting its own column. Overlapping the columns will eliminate visual bands or other artifacts appearing at the column boundaries for any operators larger than a pixel in extent.

Figure 11A:
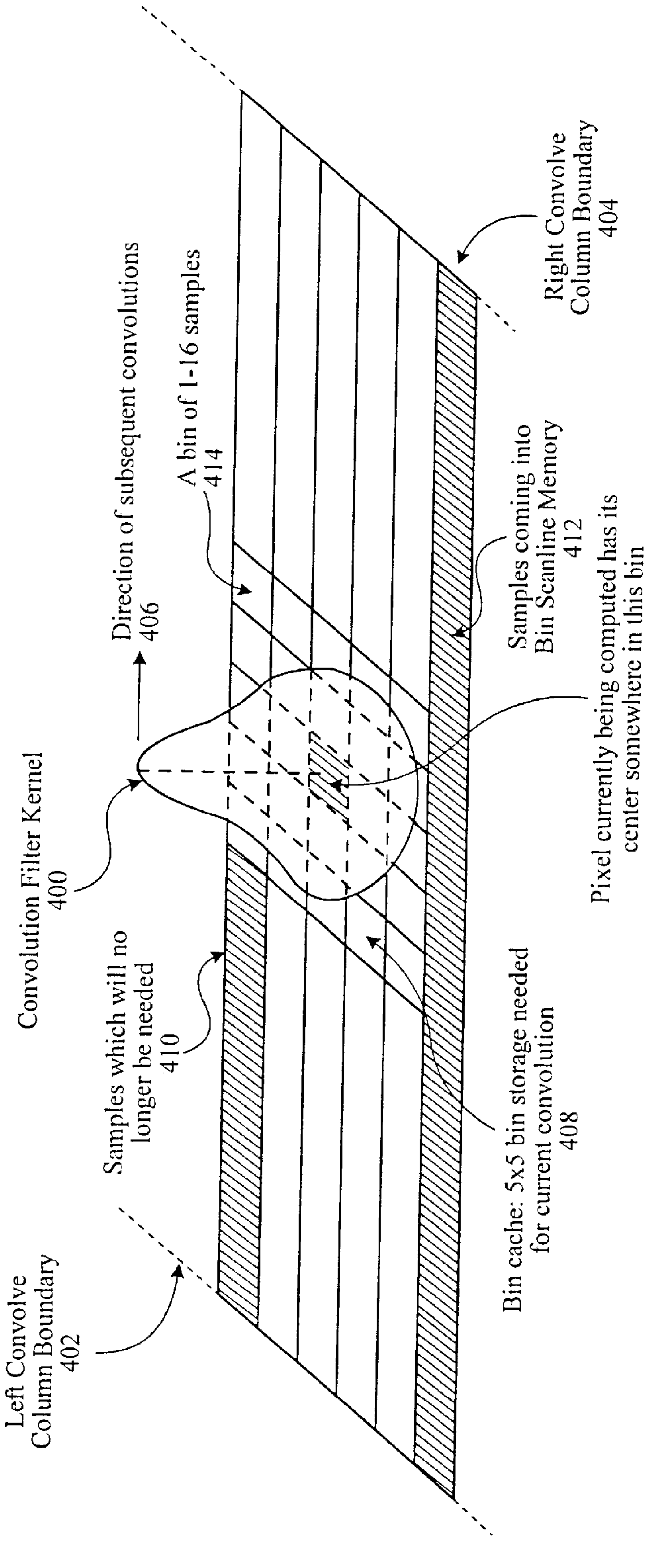
FIG. 11A is a diagram illustrating more details of the embodiment from FIG. 11.

Turning now to FIG. 11A, more details of one embodiment of a method for reading the samples from a super-sampled sample buffer are shown. As the figure illustrates, the convolution filter kernel 400 travels across column 414 (see arrow 406) to generate output pixels. One or more sample-to-pixel calculation units 170 may implement the convolution filter kernel 400. A bin cache 408 may used to provide quick access to the samples that may potentially contribute to the output pixel. As the convolution process proceeds, bins are read from the super-sampled sample buffer and stored in bin cache 408. In one embodiment, bins that are no longer needed 410 are overwritten in the cache by new bins 412. As each pixel is generated, convolution filter kernel 400 shifts. Kernel 400 may be visualized as proceeding in a sequential fashion within the column in the direction indicated by arrow 406. When kernel 400 reaches the end of the column, it may shift down one or more rows of samples and then proceed again. Thus the convolution process proceeds in a scan line manner, generating one column of output pixels for display.

Figure 11B:
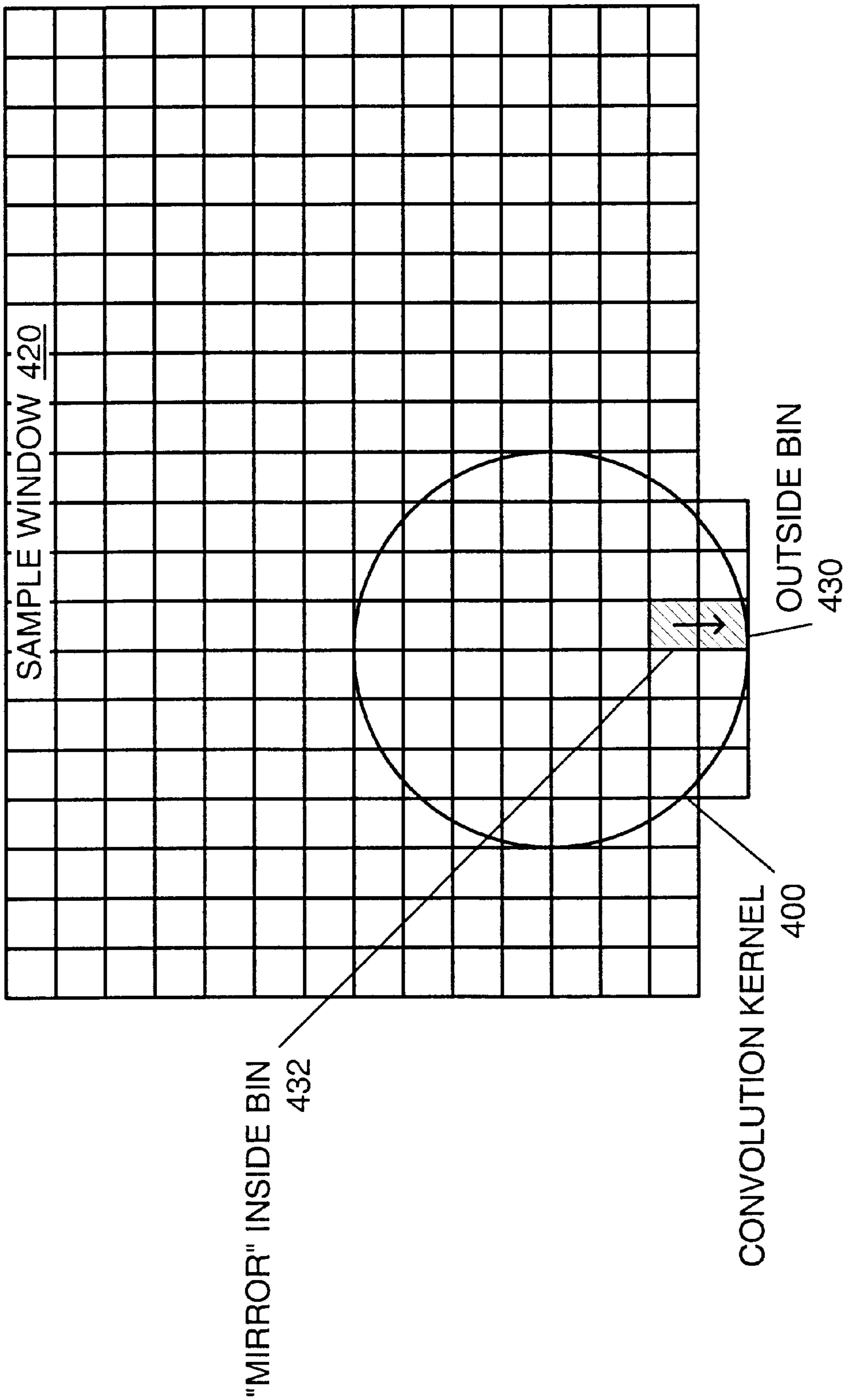
FIG. 11B is a diagram illustrating details of one embodiment of a method for dealing with boundary conditions.

Turning now to FIG. 11B, a diagram illustrating potential border conditions is shown. In one embodiment, the bins that fall outside of sample window 420 may be replaced with samples having predetermined background colors specified by the user. In another embodiment, bins that fall outside the window are not used by setting their weighting factors to zero (and then dynamically calculating normalization coefficients). In yet another embodiment, the bins at the inside edge of the window may be duplicated to replace those outside the window. This is indicated by outside bin 430 being replaced by mirror inside bin 432.

Figure 12:
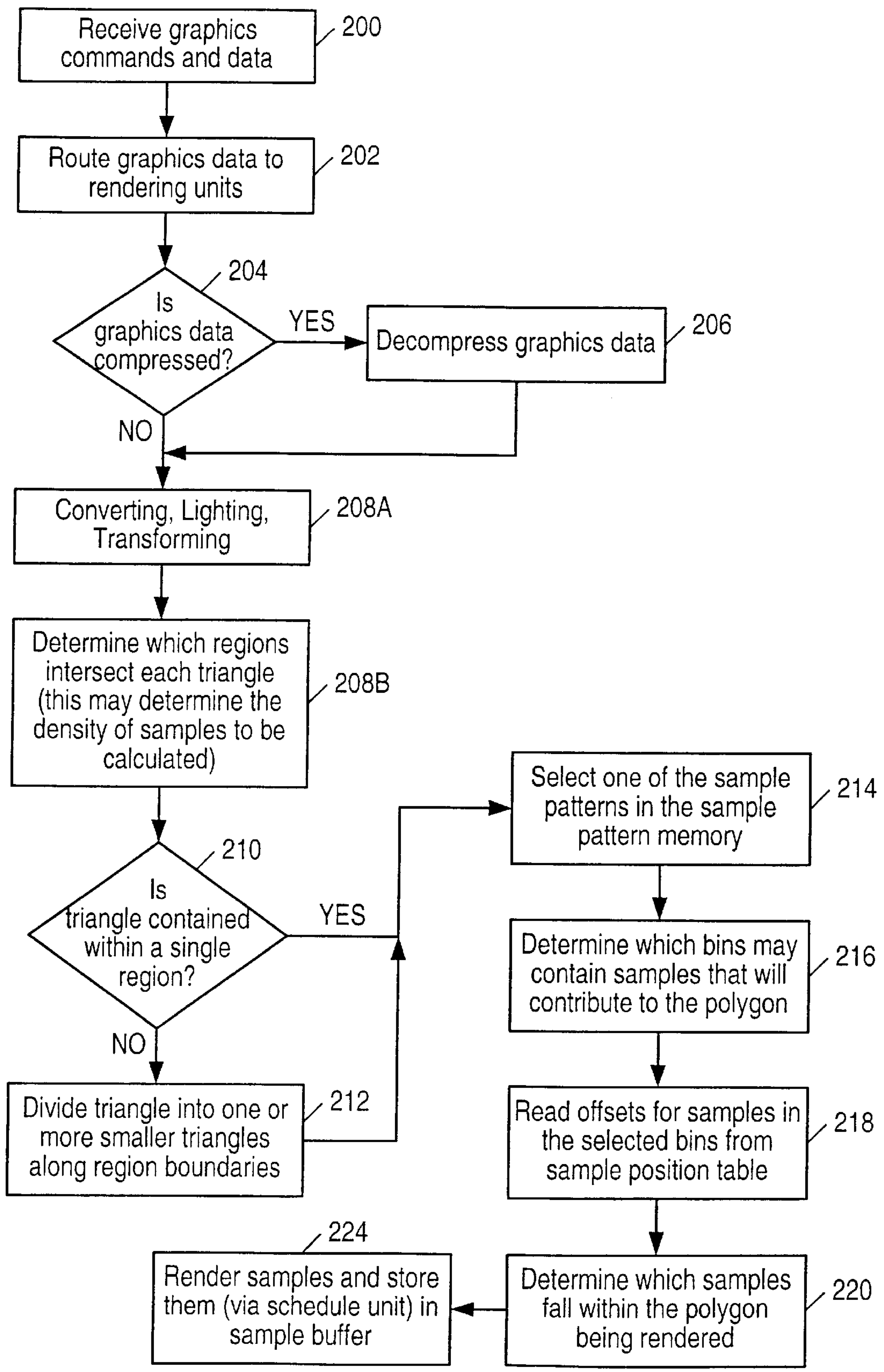
FIG. 12 is a flowchart illustrating one embodiment of a method for drawing samples into a super-sampled sample buffer.

FIG. 12 is a flowchart of one embodiment of a method for drawing or rendering sample pixels into a super-sampled sample buffer. Certain of the steps of FIG. 12 may occur concurrently or in different orders. In this embodiment, the graphics system receives graphics commands and graphics data from the host CPU 102 or directly from main memory 106 (step 200). Next, the instructions and data are routed to one or more rendering units 150A–D (step 202). If the graphics data is compressed (step 204), then the rendering units 150A–D decompress the data into a useable format, e.g., triangles (step 206). Next, the triangles are processed, e.g., converted to screen space, lit, and transformed (step 208A). If the graphics system implements variable resolution super sampling, then the triangles are compared with the sample density region boundaries (step 208B). In variable-resolution super-sampled sample buffer implementations, different regions of the display device may be allocated different sample densities based upon a number of factors (e.g., the center of the attention on the screen as determined by eye or head tracking). Sample density regions are described in greater detail below (see section entitled Variable Resolution Sample buffer below). If the triangle crosses a region boundary (step 210), then the triangle may be divided into two smaller polygons along the region boundary (step 212). This may allow each newly formed triangle to have a single sample density. In one embodiment, the graphics system may be configured to simply use the entire triangle twice (i.e., once in each region) and then use a bounding box to effectively clip the triangle.

Next, one of the sample position schemes (e.g., regular grid, perturbed regular grid, or stochastic) are selected from the sample position memory 184 (step 214). The sample position scheme will generally have been pre-programmed into the sample position memory 184, but may also be selected "on the fly". Based upon this sample position scheme and the sample density of the region containing the triangle, rendering units 150A–D determine which bins may contain samples located within the triangle's boundaries (step 216). The offsets for the samples within these bins are then read from sample position memory 184 (step 218). Each sample's position is then calculated using the offsets and is compared with the triangle's vertices to determine if the sample is within the triangle (step 220). Step 220 is discussed in greater detail below.

For each sample that is determined to be within the triangle, the rendering unit draws the sample by calculating the sample's color, alpha and other attributes. This may involve lighting calculation and interpolation based upon the color and texture map information associated with the vertices of the triangle. Once the sample is rendered, it may be forwarded to schedule unit 154, which then stores the sample in sample buffer 162 (step 224).

Note the embodiment of the method described above is used for explanatory purposes only and is not meant to be limiting. For example, in some embodiments the steps shown in the figure as occurring serially may be implemented in parallel. Furthermore, some steps may be reduced or eliminated in certain embodiments of the graphics system (e.g., steps 204–206 in embodiments that do not implement geometry compression or steps 210–212 in embodiments that do not implement a variable resolution super-sampled sample buffer).

Determination of Which Samples Reside Within the Polygon Being Rendered

The comparison may be performed in a number of different ways. In one embodiment, the deltas between the three vertices defining the triangle are first determined. For example, these deltas may be taken in the order of first to second vertex (v2−v1)=d12, second to third vertex (v3−v2)=d23, and third vertex back to the first vertex (v1−v3)=d31. These deltas form vectors, and each vector may be categorized as belonging to one of the four quadrants of the coordinate plane (e.g., by using the two sign bits of its delta X and Y coefficients). A third condition may be added determining whether the vector is an X-major vector or Y-major vector. This may be determined by calculating whether abs(delta_x) is greater than abs(delta_y).

Figure 12A:
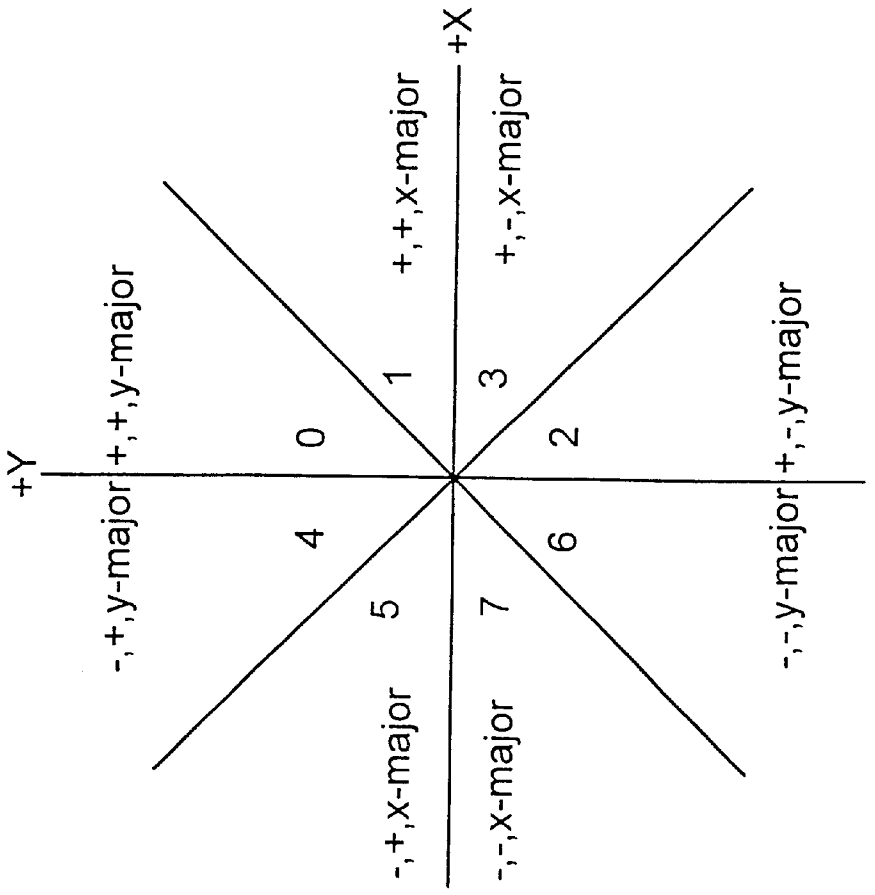
FIG. 12A is a diagram illustrating one embodiment for coding triangle vertices.

Using these three bits of information, the vectors may each be categorized as belonging to one of eight different regions of the coordinate plane. If three bits are used to define these regions, then the X-sign bit (shifted left by two), the Y-sign bit (shifted left by one), and the X-major bit, may be used to create the eight regions as shown in FIG. 12A.

Next, three edge equations may be used to define the inside portion of the triangle. These edge equations (or half-plane equations) may be defined using slope-intercept form. To reduce the numerical range needed, both X-major and Y-major equation forms may be used (such that the absolute value of the slope value may be in the range of 0 to 1). Thus, the two edge equations are:

*X*-major: $y-m\cdot x-b<0$, when the point is below the line

*Y*-major: $x-m\cdot y-b<0$, when the point is to the left of the line

The X-major equations produces a negative versus positive value when the point in question is below the line, while the Y-major equation produces a negative versus positive value when the point in question is to the left of the line. Since which side of the line is the "accept" side is known, the sign bit (or the inverse of the sign bit) of the edge equation result may be used to determine whether the sample is on the "accept" side or not. This is referred to herein as the "accept bit". Thus, a sample is on the accept side of a line if:

*X*-major:($y-m\cdot x-b<0$)<x or>accept

*Y*-major:($x-m\cdot y-b<0$)<x or>accept

The accept bit may be calculated according to the following table, wherein cw designates whether the triangle is clockwise (cw=1) or counter-clockwise (cw=0):

1: accept=!cw
0: accept=cw
4: accept=cw
5: accept=cw
7: accept=cw
6: accept=!cw
2: accept=!cw
3: accept=!cw Tie breaking rules for this representation may also be implemented (e.g., coordinate axes may be defined as belonging to the positive octant). Similarly, X-major may be defined as owning all points that tie on the slopes.

In an alternate embodiment, the accept side of an edge may be determined by applying the edge equation to the third vertex of the triangle (the vertex that is not one of the two vertices forming the edge). This method may incur the additional cost of a multiply-add, which may not be used by the technique described above.

To determine the "faced-ness" of a triangle (i.e., whether the triangle is clockwise or counter-clockwise), the delta-directions of two edges of the triangle may be checked and the slopes of the two edges may be compared. For example, assuming that edge 12 has a delta-direction of 1 and the second edge (edge23) has a delta-direction of 0, 4, or 5, then the triangle is counter-clockwise. If, however, edge23 has a delta-direction of 3, 2, or 6, then the triangle is clockwise. If edge23 has a delta-direction of 1 (i.e., the same as edge12), then comparing the slopes of the two edges breaks the tie (both are x-major). If edge12 has a greater slope, then the triangle is counter-clockwise. If edge23 has a delta-direction of 7 (the exact opposite of edge12), then again the slopes are compared, but with opposite results in terms of whether the triangle is clockwise or counter-clockwise.

The same analysis can be exhaustively applied to all combinations of edge12 and edge23 delta-directions, in every case determining the proper faced-ness. If the slopes are the same in the tie case, then the triangle is degenerate (i.e., with no interior area). It can be explicitly tested for and culled, or, with proper numerical care, it could be let through as it will cause no pixels to render. One special case is when a triangle splits the view plane, but that may be detected earlier in the pipeline (e.g., when front plane and back plane clipping are performed).

Note in most cases only one side of a triangle is rendered. Thus, after the faced-ness of a triangle is determined, if the face is the one to be rejected, then the triangle can be culled (i.e., subject to no further processing with no pixels generated). Further note that this determination of faced-ness only uses one additional comparison (i.e., of the slope of edge12 to that of edge23) beyond factors already computed. Many traditional approaches may utilize more complex computation (though at earlier stages of the set-up computation).

Figure 13:
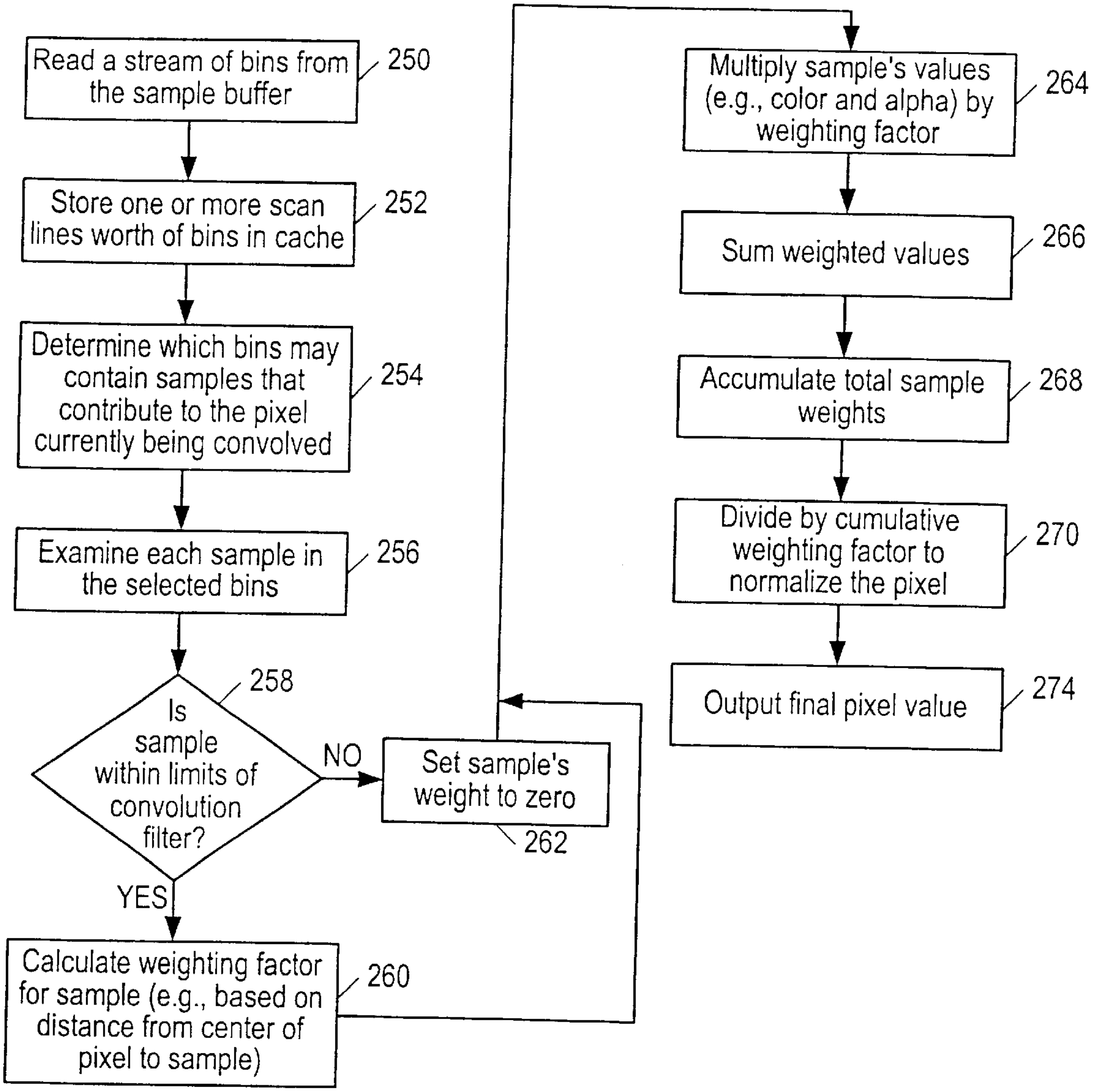
FIG. 13 is a diagram illustrating one embodiment of a method for calculating pixels from samples.

FIG. 13 is a flowchart of one embodiment of a method for filtering samples stored in the super-sampled sample buffer to generate output pixels. First, a stream of bins are read from the super-sampled sample buffer (step 250). These may be stored in one or more caches to allow the sample-to-pixel calculation units 170 easy access during the convolution process (step 252). Next, the bins are examined to determine which may contain samples that contribute to the output pixel currently being generated by the filter process (step 254). Each sample that is in a bin that may contribute to the output pixel is then individually examined to determine if the sample does indeed contribute (steps 256–258). This determination may be based upon the distance from the sample to the center of the output pixel being generated.

In one embodiment, the sample-to-pixel calculation units 170 may be configured to calculate this distance (i.e., the extent of the filter at sample's position) and then use it to index into a table storing filter weight values according to filter extent (step 260). In another embodiment, however, the potentially expensive calculation for determining the distance from the center of the pixel to the sample (which typically involves a square root function) is avoided by using distance squared to index into the table of filter weights. Alternatively, a function of x and y may be used in lieu of one dependent upon a distance calculation. In one embodiment, this may be accomplished by utilizing a floating point format for the distance (e.g., four or five bits of mantissa and three bits of exponent), thereby allowing much of the accuracy to be maintained while compensating for the increased range in values. In one embodiment, the table may be implemented in ROM. However, RAM tables may also be used. Advantageously, RAM tables may, in some embodiments, allow the graphics system to vary the filter coefficients on a per-frame basis. For example, the filter coefficients may be varied to compensate for known shortcomings of the display or for the user's personal preferences. The graphics system can also vary the filter coefficients on a screen area basis within a frame, or on a per-output pixel basis. Another alternative embodiment may actually calculate the desired filter weights for each sample using specialized hardware (e.g., multipliers and adders). The filter weight for samples outside the limits of the convolution filter may simply be multiplied by a filter weight of zero (step 262), or they may be removed from the calculation entirely.

Once the filter weight for a sample has been determined, the sample may then be multiplied by its filter weight (step 264). The weighted sample may then be summed with a running total to determine the final output pixel's color value (step 266). The filter weight may also be added to a running total pixel filter weight (step 268), which is used to normalize the filtered pixels. Normalization advantageously prevents the filtered pixels (e.g., pixels with more samples than other pixels) from appearing too bright or too dark by compensating for gain introduced by the convolution process. After all the contributing samples have been weighted and summed, the total pixel filter weight may be used to divide out the gain caused by the filtering (step 270). Finally, the normalized output pixel may be output for gamma correction, digital-to-analog conversion (if necessary), and eventual display (step 274).

Figure 14:
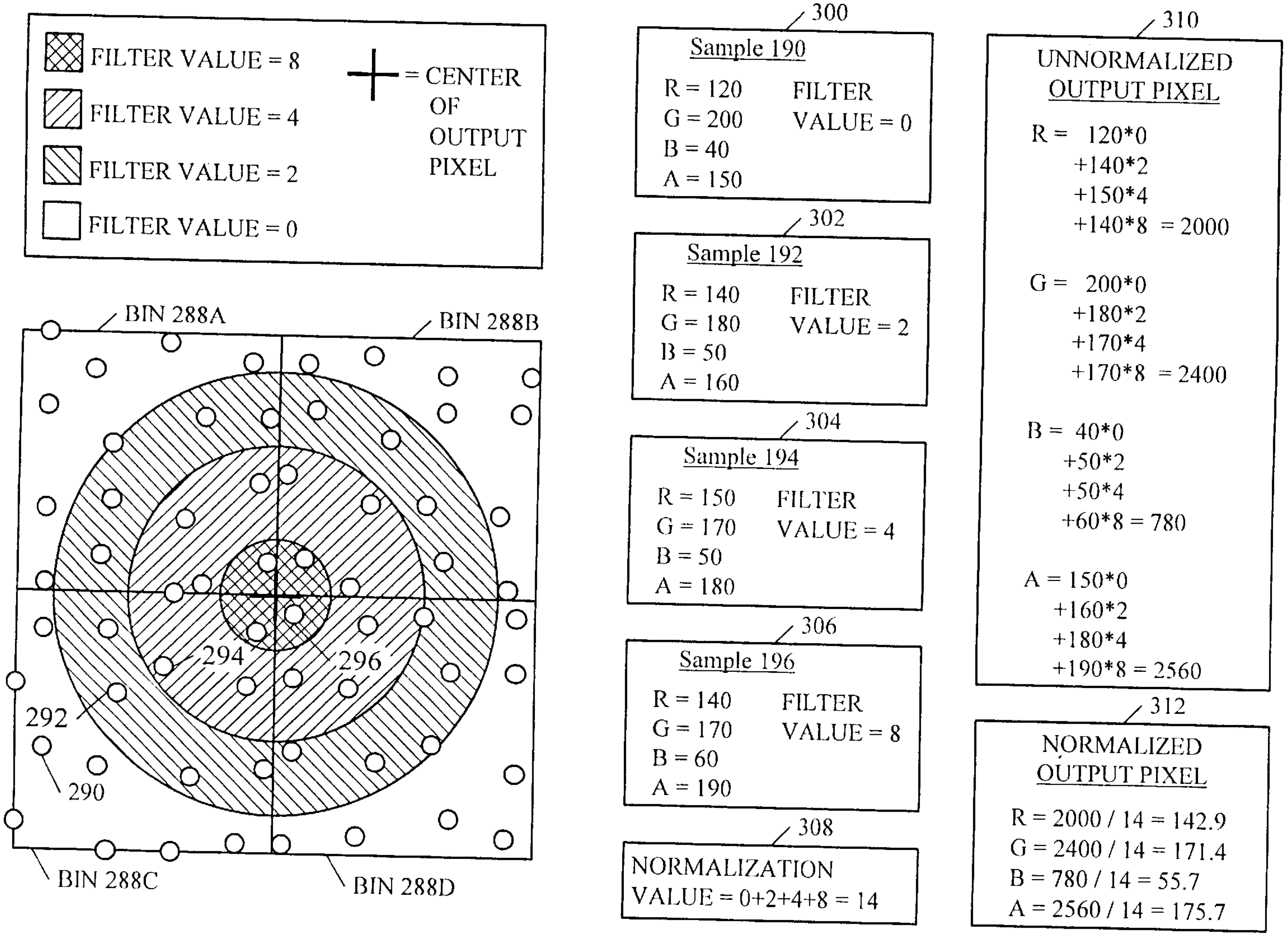
FIG. 14 is a diagram illustrating details of one embodiment of a pixel convolution for an example set of samples.

FIG. 14 illustrates a simplified example of an output pixel convolution. As the figure shows, four bins 288A–D contain samples that may possibly contribute to the output pixel. In this example, the center of the output pixel is located at the boundary of bins 288A–288D. Each bin comprises sixteen samples, and an array of 2 four bins (2×2) is filtered to generate the output pixel. Assuming circular filters are used, the distance of each sample from the pixel center determines which filter value will be applied to the sample. For example, sample 296 is relatively close to the pixel center, and thus falls within the region of the filter having a filter value of 8. Similarly, samples 294 and 292 fall within the regions of the filter having filter values of 4 and 2, respectively. Sample 290, however, falls outside the maximum filter extent, and thus receives a filter value of 0. Thus, sample 290 will not contribute to the output pixel's value. This type of filter ensures that the samples located the closest to the pixel center will contribute the most, while pixels located the far from the pixel center will contribute less to the final output pixel values. This type of filtering automatically performs anti-aliasing by smoothing any abrupt changes in the image (e.g., from a dark line to a light background). Another particularly useful type of filter for anti-aliasing is a windowed sinc filter. Advantageously, the windowed sinc filter contains negative lobes that re-sharpen some of the blended or "fuzzed" image. Negative lobes are areas where the filter causes the samples to subtract from the pixel being calculated. In contrast, samples on either side of the negative lobe add to the pixel being calculated.

Example values for samples 290–296 are illustrated in boxes 300–308. In this example, each sample comprises red, green, blue and alpha values, in addition to the sample's positional data. Block 310 illustrates the calculation of each pixel component value for the non-normalized output pixel. As block 310 indicates, potentially undesirable gain is introduced into the final pixel values (i.e., an out pixel having a red component value of 2000 is much higher than any of the sample's red component values). As previously noted, the filter values may be summed to obtain normalization value 308. Normalization value 308 is used to divide out the unwanted gain from the output pixel. Block 312 illustrates this process and the final normalized example pixel values.

The filter presented in FIG. 14 has been chosen for descriptive purposes only and is not meant to be limiting. A wide variety of filters may be used for pixel value computations depending upon the desired filtering effect(s). It is a well-known fact that the sinc filter realizes an ideal band-pass filter. However, the sinc filter takes non-zero values over the whole of the X-Y plane. Thus, various windowed approximations of the sinc filter have been developed. Some of these approximations such as the cone filter or Gaussian filter approximate only the central lobe of the sinc filter, and thus, achieve a smoothing effect on the sampled image. Better approximations such as the Mitchell Netravali filter (including the Catmull-Rom filter as a special case) are obtained by approximating some of the negative lobes and positive lobes that surround the central positive lobe of the sinc filter. The negative lobes allow a filter to more effectively retain spatial frequencies up to the cutoff frequency and reject spatial frequencies beyond the cutoff frequency. A negative lobe is a portion of a filter where the filter values are negative. Thus, some of the samples residing in the support of a filter may be assigned negative filter values (i.e. filter weights).

A wide variety of filters may be used for the pixel value convolutions including filters such as a box filter, a tent filter, a cylinder filter, a cone filter, a Gaussian filter, a Catmull-Rom filter, a Mitchell-Netravali filter, any windowed approximation of a sinc filter, etc. Furthermore, the support of the filters used for the pixel value convolutions may be circular, elliptical, rectangular (e.g. square), triangular, hexagonal, etc.

Full-Screen Anti-aliasing

The vast majority of current 3D graphics systems only provide real-time anti-aliasing for lines and dots. While some systems also allow the edge of a polygon to be "fuzzed", this technique typically works best when all polygons have been pre-sorted in depth. This may defeat the purpose of having general-purpose 3D rendering hardware for most applications (which do not depth pre-sort their polygons). In one embodiment, graphics system 112 may be configured to implement full-screen anti-aliasing by stochastically sampling up to sixteen samples per output pixel, filtered by a 5×5-convolution filter.

Variable Resolution Super-Sampling

Currently, the brute force method of utilizing a fixed number of samples per pixel location, e.g., an 8×super-sampled sample buffer, would entail the use of eight times more memory, eight times the fill rate (i.e., memory bandwidth), and a convolution pipe capable of processing eight samples per pixel.

In one embodiment, graphics system 112 may be configured to overcome these potential obstacles by implementing variable resolution super-sampling. In this embodiment, graphics system 112 mimics the human eye's characteristics by allocating a higher number of samples per pixel at one or more first locations on the screen (e.g., the point of foveation on the screen), with a drop-off in the number of samples per pixel for one or more second locations on the screen (e.g., areas farther away from the point of foveation). Depending upon the implementation, the point of foveation may be determined in a variety of ways. In one embodiment, the point of foveation may be a predetermined area around a certain object displayed upon the screen. For example, the area around a moving cursor or the main character in a computer game may be designated the point of foveation. In another embodiment, the point of foveation on the screen may be determined by head-tracking or eye-tracking. Even if eye/head/hand-tracking, cursor-based, or main character-based points of foveation are not implemented, the point of foveation may be fixed at the center of the screen, where the majority of viewer's attention is focused the majority of the time. Variable resolution super-sampling is described in greater detail below.

Variable-Resolution Super-Sampled Sample Buffer—FIGS. 15–19

A traditional frame buffer is one rectangular array of uniformly sampled pixels. For every pixel on the final display device (CRT or LCD), there is a single pixel or location of memory storage in the frame buffer (perhaps double buffered). There is a trivial one-to-one correspondence between the 2D memory address of a given pixel and its 2D sample address for the mathematics of rendering. Stated another way, in a traditional frame buffer there is no separate notion of samples apart from the pixels themselves. The output pixels are stored in a traditional frame buffer in a row/column manner corresponding to how the pixels are provided to the display during display refresh.

In a variable-resolution super-sampled sample buffer, the number of computed samples per output pixel varies on a regional basis. Thus, output pixels in regions of greater interest are computed using a greater number of samples, thus producing greater resolution in this region, and output pixels in regions of lesser interest are computed using a lesser number of samples, thus producing lesser resolution in this region.

As previously noted, in some embodiments graphic system 112 may be configured with a variable resolution super-sampled sample buffer. To implement variable resolution super-sampling, sample buffer 162 may be divided into smaller pieces, called regions. The size, location, and other attributes of these regions may be configured to vary dynamically, as parameterized by run-time registers on a per-frame basis.

Figure 15:
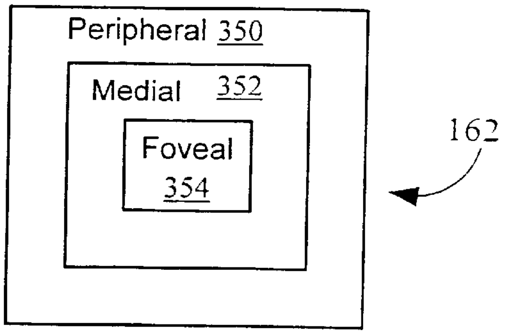
FIG. 15 is a diagram illustrating one embodiment of a method for dividing a super-sampled sample buffer into regions.

Turning now to FIG. 15, a diagram of one possible scheme for dividing sample buffer 162 is shown. In this embodiment, sample buffer 162 is divided into the following three nested regions: foveal region 354, medial region 352, and peripheral region 350. Each of these regions has a rectangular shaped outer border, but the medial and the peripheral regions have a rectangular shaped hole in their center. Each region may be configured with certain constant (per frame) properties, e.g., a constant density sample density and a constant size of pixel bin. In one embodiment, the total density range may be 256, i.e., a region could support between one sample every 16 screen pixels (4×4) and 16 samples for every 1 screen pixel. In other embodiments, the total density range may be limited to other values, e.g., 64. In one embodiment, the sample density varies, either linearly or non-linearly, across a respective region. Note in other embodiments the display may be divided into a plurality of constant sized regions (e.g., squares that are 4×4 pixels in size or 40×40 pixels in size).

Figure 16:
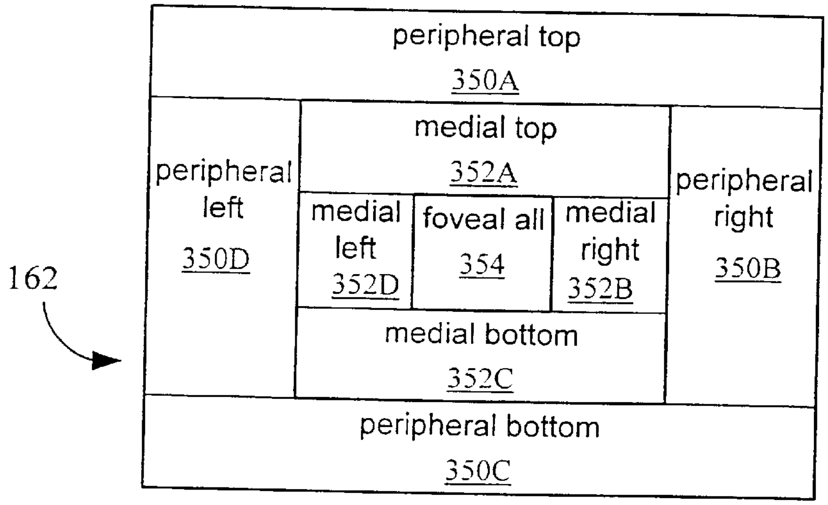
FIG. 16 is a diagram illustrating another embodiment of a method for dividing a super-sampled sample buffer into regions.

To simply perform calculations for polygons that encompass one or more region corners (e.g., a foveal region corner), the sample buffer may be further divided into a plurality of subregions. Turning now to FIG. 16, one embodiment of sample buffer 162 divided into sub-regions is shown. Each of these sub-regions are rectangular, allowing graphics system 112 to translate from a 2D address with a sub-region to a linear address in sample buffer 162. Thus, in some embodiments each sub-region has a memory base address, indicating where storage for the pixels within the sub-region starts. Each sub-region may also have a "stride" parameter associated with its width.

Figure 17:
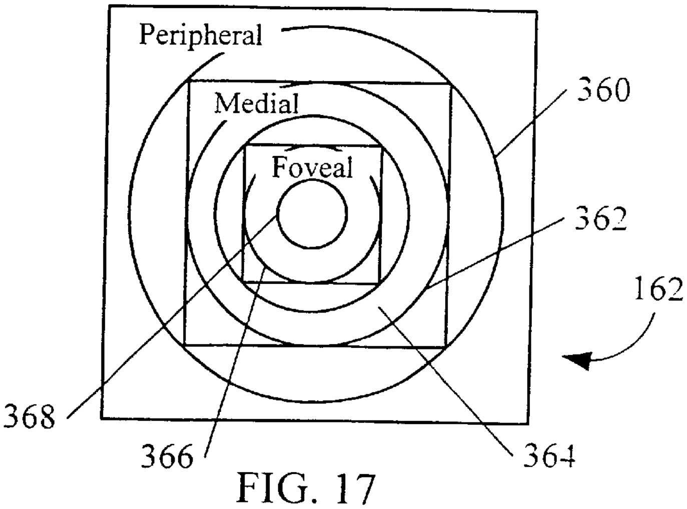
FIG. 17 is a diagram illustrating yet another embodiment of a method for dividing a super-sampled sample buffer into regions.

Another potential division of the super-sampled sample buffer is circular. Turning now to FIG. 17, one such embodiment is illustrated. For example, each region may have two radii associated with it (i.e., 360–368), dividing the region into three concentric circular-regions. The circular-regions may all be centered at the same screen point, the fovea center point. Note however, that the fovea center-point need not always be located at the center of the foveal region. In some instances it may even be located off-screen (i.e., to the side of the visual display surface of the display device). While the embodiment illustrated supports up to seven distinct circular-regions, it is possible for some of the circles to be shared across two different regions, thereby reducing the distinct circular-regions to five or less.

The circular regions may delineate areas of constant sample density actually used. For example, in the example illustrated in the figure, foveal region 354 may allocate a sample buffer density of 8 samples per screen pixel, but outside the innermost circle 368, it may only use 4 samples per pixel, and outside the next circle 366 it may only use two samples per pixel. Thus, in this embodiment the rings need not necessarily save actual memory (the regions do that), but they may potentially save memory bandwidth into and out of the sample buffer (as well as pixel convolution bandwidth). In addition to indicating a different effective sample density, the rings may also be used to indicate a different sample position scheme to be employed. As previously noted, these sample position schemes may stored in an on-chip RAM/ROM, or in programmable memory.

As previously discussed, in some embodiments super-sampled sample buffer 162 may be further divided into bins. For example, a bin may store a single sample or an array of samples (e.g., 2×2 or 4×4 samples). In one embodiment, each bin may store between one and sixteen sample points, although other configurations are possible and contemplated. Each region may be configured with a particular bin size, and a constant memory sample density as well. Note that the lower density regions need not necessarily have larger bin sizes. In one embodiment, the regions (or at least the inner regions) are exact integer multiples of the bin size enclosing the region. This may allow for more efficient utilization of the sample buffer in some embodiments.

Variable-resolution super-sampling involves calculating a variable number of samples for each pixel displayed on the display device. Certain areas of an image may benefit from a greater number of samples (e.g., near object edges), while other areas may not need extra samples (e.g., smooth areas having a constant color and brightness). To save memory and bandwidth, extra samples may be used only in areas that may benefit from the increased resolution. For example, if part of the display is colored a constant color of blue (e.g., as in a background), then extra samples may not be particularly useful because they will all simply have the constant value (equal to the background color being displayed). In contrast, if a second area on the screen is displaying a 3D rendered object with complex textures and edges, the use of additional samples may be useful in avoiding certain artifacts such as aliasing. A number of different methods may be used to determine or predict which areas of an image would benefit from higher sample densities. For example, an edge analysis could be performed on the final image, and with that information being used to predict how the sample densities should be distributed. The software application may also be able to indicate which areas of a frame should be allocated higher sample densities.

A number of different methods may be used to implement variable-resolution super sampling. These methods tend to fall into the following two general categories: (1) those methods that concern the draw or rendering process, and (2) those methods that concern the convolution process. Rendering process methods include methods which render samples into sample buffer 162 with a variable sample density. For example, sample density may be varied on a per-region basis (e.g., medial, foveal, and peripheral), or on a scan-line basis (or on a small number of scan lines basis). Varying sample density on a scan-line basis may be accomplished by using a look-up table of densities. For example, the table may specify that the first five pixels of a particular scan line have three samples each, while the next four pixels have two samples each, and so on. Convolution process methods include methods which filter samples based on a uniform convolution filter, a continuously variable convolution filter, or a convolution filter operating at multiple spatial frequencies.

A uniform convolve filter may, for example, have a constant extent (or number of samples selected) for each pixel calculated. In contrast, a continuously variable convolution filter may gradually change the number of samples used to calculate a pixel. The function may be vary continuously from a maximum at the center of attention to a minimum in peripheral areas.

Different combinations of these methods (both on the rendering side and convolution side) are also possible. For example, a constant sample density may be used on the rendering side, while a continuously variable convolution filter may be used on the samples.

Different methods for determining which areas of the image will be allocated more samples per pixel are also contemplated. In one embodiment, if the image on the screen has a main focal point (e.g., a character like Mario in a computer game), then more samples may be calculated for the area around Mario and fewer samples may be calculated for pixels in other areas (e.g., around the background or near the edges of the screen).

In another embodiment, the viewer's point of foveation may be determined by eye/head/hand-tracking. In head-tracking embodiments, the direction of the viewer's gaze is determined or estimated from the orientation of the viewer's head, which may be measured using a variety of mechanisms. For example, a helmet or visor worn by the viewer (with eye/head tracking) may be used alone or in combination with a hand-tracking mechanism, wand, or eye-tracking sensor to provide orientation information to graphics system 112. Other alternatives include head-tracking using an infra-red reflective dot placed on the user's forehead, or using a pair of glasses with head- and or eye-tracking sensors built in. One method for using head- and hand-tracking is disclosed in U.S. Pat. No. 5,446,834 (entitled "Method and Apparatus for High Resolution Virtual Reality Systems Using Head Tracked Display," by Michael Deering, issued Aug. 29, 1995), which is incorporated herein by reference in its entirety. Other methods for head tracking are also possible and contemplated (e.g., infrared sensors, electromagnetic sensors, capacitive sensors, video cameras, sonic and ultrasonic detectors, clothing based sensors, video tracking devices, conductive ink, strain gauges, force-feedback detectors, fiber optic sensors, pneumatic sensors, magnetic tracking devices, and mechanical switches).

As previously noted, eye-tracking may be particularly advantageous when used in conjunction with head-tracking. In eye-tracked embodiments, the direction of the viewer's gaze is measured directly by detecting the orientation of the viewer's eyes in relation to the viewer's head. This information, when combined with other information regarding the position and orientation of the viewer's head in relation to the display device, may allow an accurate measurement of viewer's point of foveation (or points of foveation if two eye-tracking sensors are used). One possible method for eye tracking is disclosed in U.S. Pat. No. 5,638,176 (entitled "Inexpensive Interferometric Eye Tracking System"). Other methods for eye tracking are also possible and contemplated (e.g., the methods for head tracking listed above).

Regardless of which method is used, as the viewer's point of foveation changes position, so does the distribution of samples. For example, if the viewer's gaze is focused on the upper left-hand corner of the screen, the pixels corresponding to the upper left-hand corner of the screen may each be allocated eight or sixteen samples, while the pixels in the opposite corner (i.e., the lower right-hand corner of the screen) may be allocated only one or two samples per pixel. Once the viewer's gaze changes, so does the allotment of samples per pixel. When the viewer's gaze moves to the lower right-hand corner of the screen, the pixels in the upper left-hand corner of the screen may be allocated only one or two samples per pixel. Thus, the number of samples per pixel may be actively changed for different regions of the screen in relation the viewer's point of foveation. Note in some embodiments, multiple users may each have head/eye/hand tracking mechanisms that provide input to graphics system 112. In these embodiments, there may conceivably be two or more points of foveation on the screen, with corresponding areas of high and low sample densities. As previously noted, these sample densities may affect the render process only, the filter process only, or both processes.

Figure 18A:
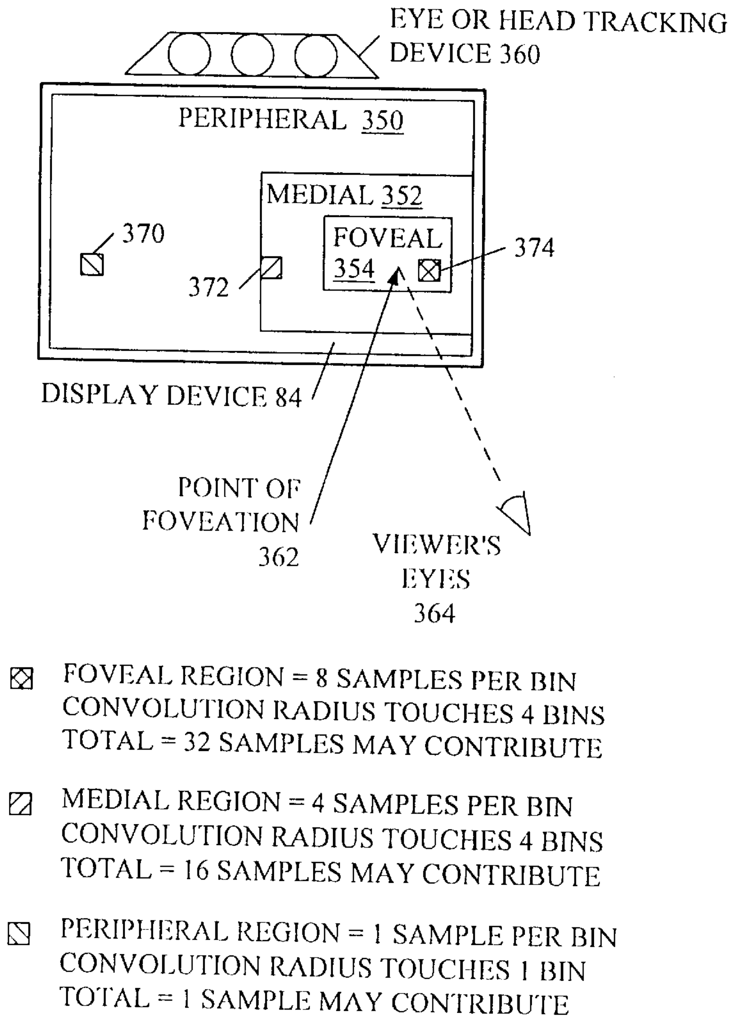
FIGS. 18A–B are diagrams illustrating one embodiment of a graphics system configured to utilize input from an eye tracking or head tracking device.
Figure 18B:
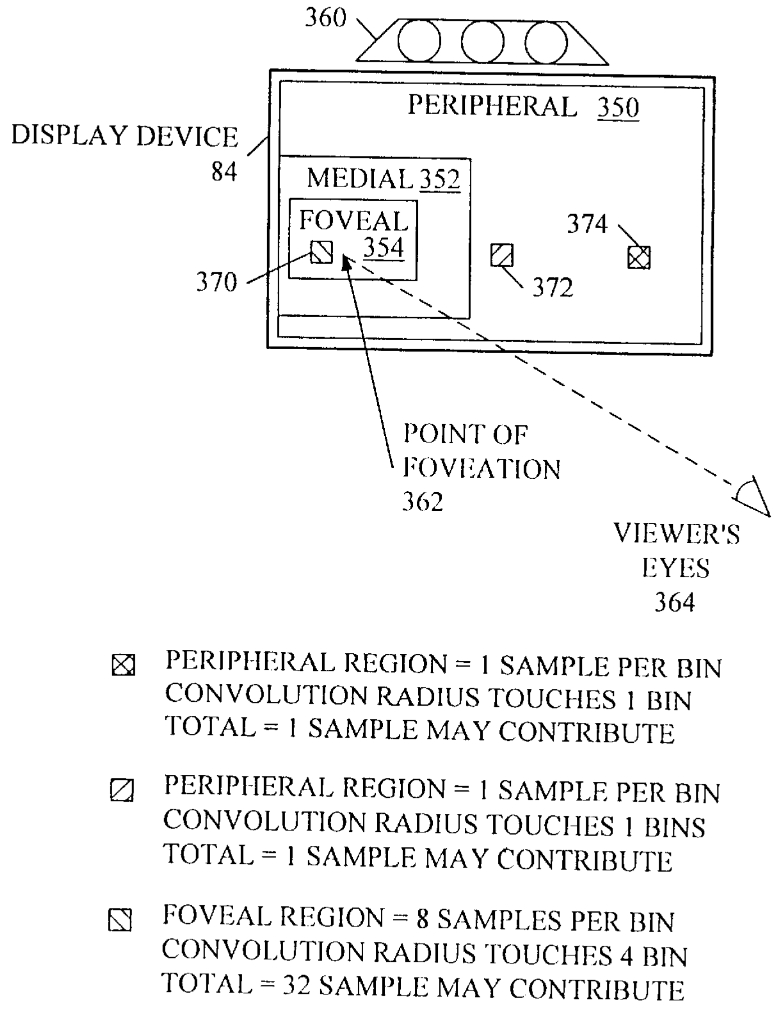

Turning now to FIGS. 18A–B, one embodiment of a method for apportioning the number of samples per pixel is shown. The method apportions the number of samples based on the location of the pixel relative to one or more points of foveation. In FIG. 18A, an eye- or head-tracking device 360 is used to determine the point of foveation 362 (i.e., the focal point of a viewer's gaze). This may be determined by using tracking device 360 to determine the direction that the viewer's eyes (represented as 364 in the figure) are facing. As the figure illustrates, in this embodiment, the pixels are divided into foveal region 354 (which may be centered around the point of foveation 362), medial region 352, and peripheral region 350.

Three sample pixels are indicated in the figure. Sample pixel 374 is located within foveal region 314. Assuming foveal region 314 is configured with bins having eight samples, and assuming the convolution radius for each pixel touches four bins, then a maximum of 32 samples may contribute to each pixel. Sample pixel 372 is located within medial region 352. Assuming medial region 352 is configured with bins having four samples, and assuming the convolution radius for each pixel touches four bins, then a maximum of 16 samples may contribute to each pixel. Sample pixel 370 is located within peripheral region 350. Assuming peripheral region 370 is configured with bins having one sample each, and assuming the convolution radius for each pixel touches one bin, then there is a one sample to pixel correlation for pixels in peripheral region 350. Note these values are merely examples and a different number of regions, samples per bin, and convolution radius may be used.

Turning now to FIG. 18B, the same example is shown, but with a different point of foveation 362. As the figure illustrates, when tracking device 360 detects a change in the position of point of foveation 362, it provides input to the graphics system, which then adjusts the position of foveal region 354 and medial region 352. In some embodiments, parts of some of the regions (e.g., medial region 352) may extend beyond the edge of display device 84. In this example, pixel 370 is now within foveal region 354, while pixels 372 and 374 are now within the peripheral region. Assuming the sample configuration as the example in FIG. 18A, a maximum of 32 samples may contribute to pixel 370, while only one sample will contribute to pixels 372 and 374. Advantageously, this configuration may allocate more samples for regions that are near the point of foveation (i.e., the focal point of the viewer's gaze). This may provide a more realistic image to the viewer without the need to calculate a large number of samples for every pixel on display device 84.

Figure 19A:
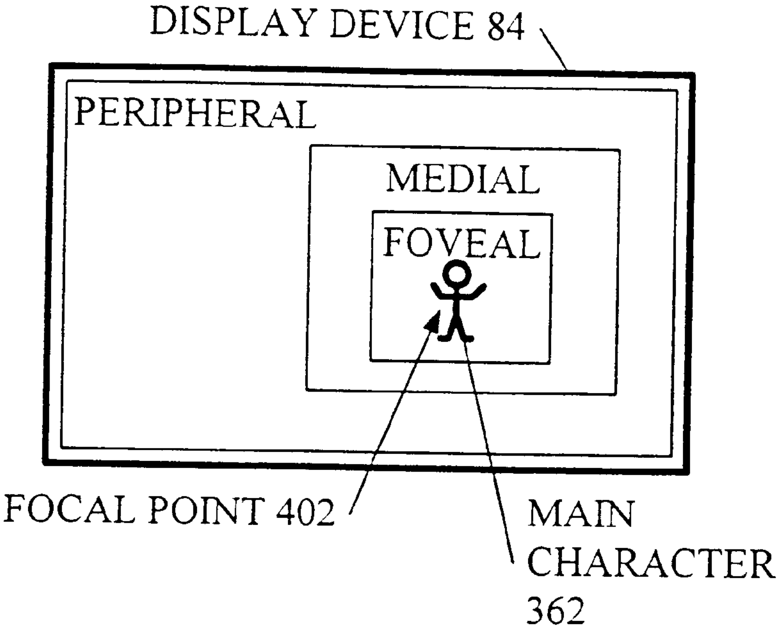
FIGS. 19A–B are diagrams illustrating one embodiment of a graphics system configured to vary region position according to the position of a cursor or visual object.
Figure 19B:
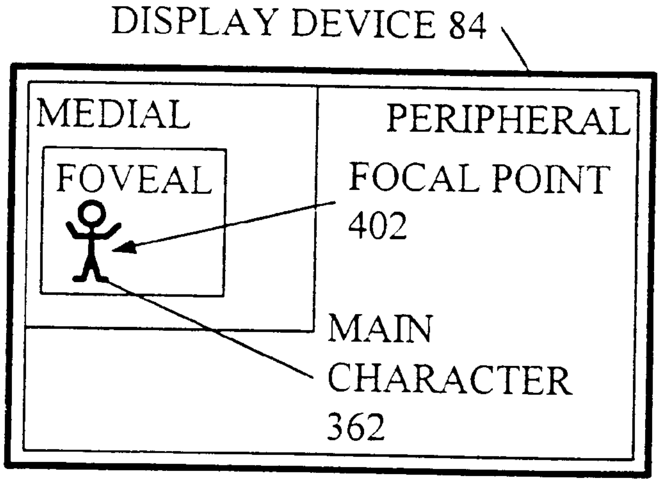

Turning now to FIGS. 19A–B, another embodiment of a computer system configured with a variable resolution super-sampled sample buffer is shown. In this embodiment, the center of the viewer's attention is determined by position of a main character 362. Medial and foveal regions are centered on main character 362 as it moves around the screen. In some embodiments, the main character may be a simple cursor (e.g., as moved by keyboard input or by a mouse).

In still another embodiment, regions with higher sample density may be centered around the middle of display device 84's screen. Advantageously, this may require less control software and hardware while still providing a shaper image in the center of the screen (where the viewer's attention may be focused the majority of the time).

Figure 20:
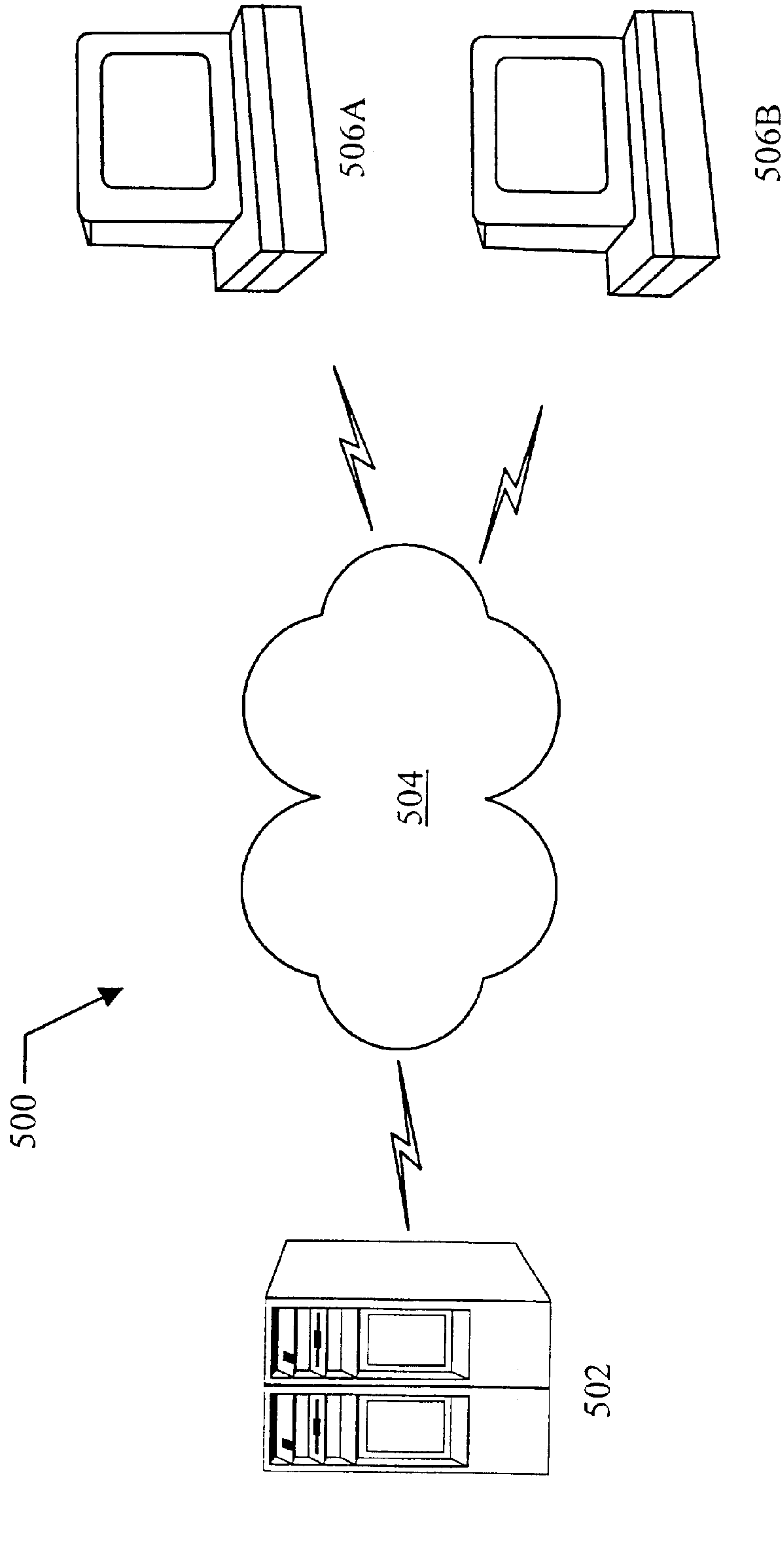
FIG. 20 is a diagram of one embodiment of a computer network connecting multiple computers.

Computer Network—FIG. 20

Referring now to FIG. 20, a computer network 500 is shown comprising at least one server computer 502 and one or more client computers 506A–N. (In the embodiment shown in FIG. 4, client computers 506A–B are depicted). One or more of the client systems may be configured similarly to computer system 80, with each having one or more graphics systems 112 as described above. Server 502 and client(s) 506 may be joined through a variety of connections 504, such as a local-area network (LAN), a wide-area network (WAN), or an Internet connection. In one embodiment, server 502 may store and transmit 3-D geometry data (which may be compressed) to one or more of clients 506. The clients 506 receive the compressed 3-D geometry data, decompress it (if necessary), and then render the geometry data. The rendered image is then displayed on the client's display device. The clients render the geometry data and display the image using super-sampled sample buffer and real-time filter techniques described above. In another embodiment, the compressed 3-D geometry data may be transferred between client computers 506.

Dynamically Adjusting the Sample-to-Pixel Filter

The graphics system may be further operable to dynamically adjust the filter used for generating output pixels in response to a subset of the output pixels having negative values. Pixels with negative values may be generated, for example, as a result of using a filter with negative lobes.

In one set of embodiments, the graphics system may be configured to examine the color values for pixels in a frame, and to compute a pixel negativity value for each pixel having one or more negative color values. For example, if any of the colors R, G, or B for a given pixel attains a negative value, the pixel negativity value for the given pixel may be computed as (a) a sum of those color components (R, G and/or B) which achieve negative values, (b) an average of those color components which achieve negative values, (c) the color component which achieves the most negative value, or (d) any function of one or more of the color components which achieve negative values. The present invention contemplates a wide variety of methodologies for computing the pixel negativity value based on the negative-valued color components of a pixel.

A pixel is said to be "negative" when one or more of its color components are negative. A pixel is said to be "red negative" when its red component is negative. A pixel is said to be "green negative" when its green component is negative. A pixel is said to be "blue negative" when its blue component is negative. The process of scanning pixel color values to determine negative pixels is referred to herein as negative pixel scanning. The negative pixel scanning may be performed on all the pixels in a frame, or a subset of the pixels in a frame. The pixel negativity computation may be performed on those pixels determined to be negative by the negative pixel scanning.

In one embodiment, the negative pixel scanning and/or pixel negativity computation may be performed by one or more sample-to-pixel calculation units. In another embodiment, the negative pixel scanning and/or pixel negativity computation may be performed by a separate negativity computation unit (NCU) which receives the pixel data streams generated by the one or more sample-to-pixel calculation units.

The above discussion of negative pixel scanning and the pixel negativity computation naturally generalizes to any desired color system, i.e., it is not necessary to use the RGB color system. In addition, a pixel may include other attributes such as alpha which may attain a negative value. Thus, the negative pixel scanning and pixel negativity computation may be expanded to include additional pixel attributes.

Based on the pixel negativity values of the negative pixels, the graphics system may compute a frame negativity value for the given frame. The frame negativity value may be (1) a sum of the pixel negativity values, (2) an average of the pixel negativity values, (3) a statistic computed on the population of pixel negativity values, or (4) the extreme of the pixel negativity values (i.e. the pixel negativity value which represents the most negative pixel), etc. For example, the graphics system may generate a histogram of the pixel negativity values and operate on the histogram values (i.e. the population values) to determine the frame negativity value. Thus, the frame negativity value measures the amount of "negativity" present in a given frame. The frame negativity value may be computed for every frame or every $N_f$ frames, where $N_f$ is a positive integer.

It is noted that the graphics system may be configured for use with monochrome displays. In other words, the graphics processor 90 may be configured to generate a single intensity value per sample. Thus, sample-to-pixel calculation units 170 may correspondingly generate a single intensity value per pixel. In this case, the pixel negativity value may not require a special computation, i.e. the single intensity value, when it is negative, may be the pixel negativity value.

In some embodiments, a separate frame negativity value may be computed for each color (or, more generally, for each pixel attribute). The red (green, blue) frame negativity value may be computed based on the red (green, blue) values of those pixels which are red (green, blue) negative. For example, the red frame negativity value may be computed as (1) a sum of the red values of the red negative pixels, (2) an average of the red values of the red negative pixels, (3) a statistic computed on the population of red values of the red negative pixels, (4) the extreme of the red values of the red negative pixels, or (5) any function of the red values of the red negative pixels. The per-color frame negativity values may be computed by one or more of the sample-to-pixel calculation units or by the negativity computation unit.

In one set of embodiments, the per-color frame negativity values are computed based on corresponding histograms. For example, the red frame negativity value may be computed based on a histogram of the red components of the red negative pixels. This histogram is referred as the "red histogram". A weighted sum of the red histogram values may determine the red frame negativity value. Thus, the graphics system may generate a red histogram, a green histogram and a blue histogram for a given frame, and compute each of the per-color frame negativity values from the corresponding histogram. The graphics system may compute the per-color histograms and frame negativity values for every frame or for every $N_f$ frames of video output where $N_f$ is a positive integer.

In one set of embodiments, an average (or sum) of the pixel attribute values (e.g. R, G and B) may be formed to determine whether a pixel is negative. In this embodiment, the pixel is said to be "negative" when the attribute average is negative. Also, the pixel negativity value may be defined as this attribute average.

As noted above, only a portion of the pixels in a frame may be subject to the negative pixel scanning (i.e. examined to determine positive/negative status). For example, only pixels within a certain window or pixels within a certain region of the screen may be examined. In addition, the graphics system may examine a certain subset of the pixels in the frame, for example, pixels on a grid (i.e. pixels at the intersections of vertical and horizontal grid lines), one out of every two pixels, every three pixels, or every $N_{sc}$ pixels where $N_{sc}$ is a positive integer. The graphics system may also examine random pixels.

Figure 21:
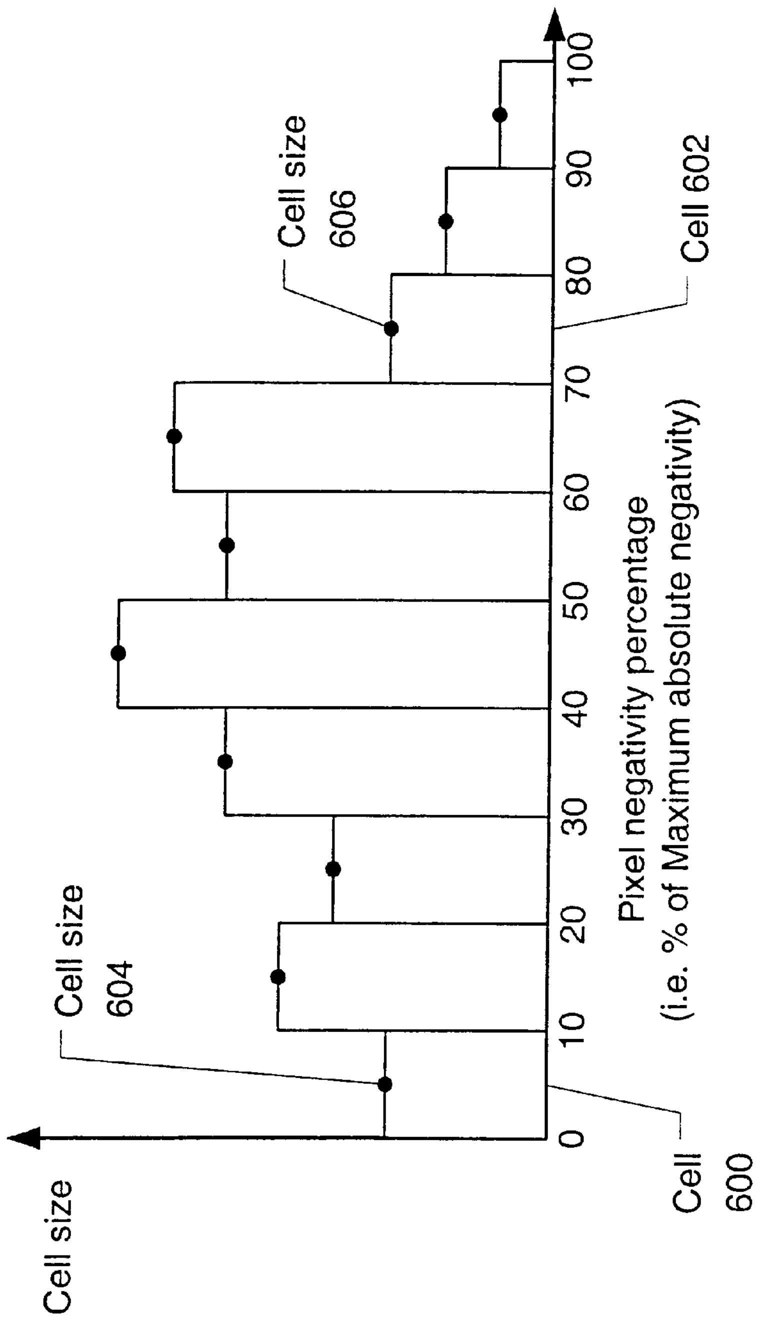
FIG. 21 shows one embodiment of a histogram of pixel negativity values used to compute the frame negativity value for a current frame.

FIG. 21 illustrates one embodiment of a pixel negativity histogram. The horizontal axis of the histogram represents pixel negativity percentage, i.e.

$$|(\text{pixel negativity})/(\text{maximum pixel negativity})|\times 100.$$

The maximum pixel negativity for a given filter may be achieved when the all samples in the negative-valued portions of the filter have maximally positive color intensities, and all the samples in the positive-valued portions of the filter have zero color intensities. The histogram comprises a plurality of cells, each extending from a low negativity percentage to a high negativity percentage. Each cell has a corresponding size value. The cell size represents the number of pixels with negativity percentages between the cell's low and high percentage boundaries. For example, cell 600 has a cell size 604 that equals the number of pixels (or some function of the number of pixel) having negativity percentage between 0 and 10 percent.

Figure 22:
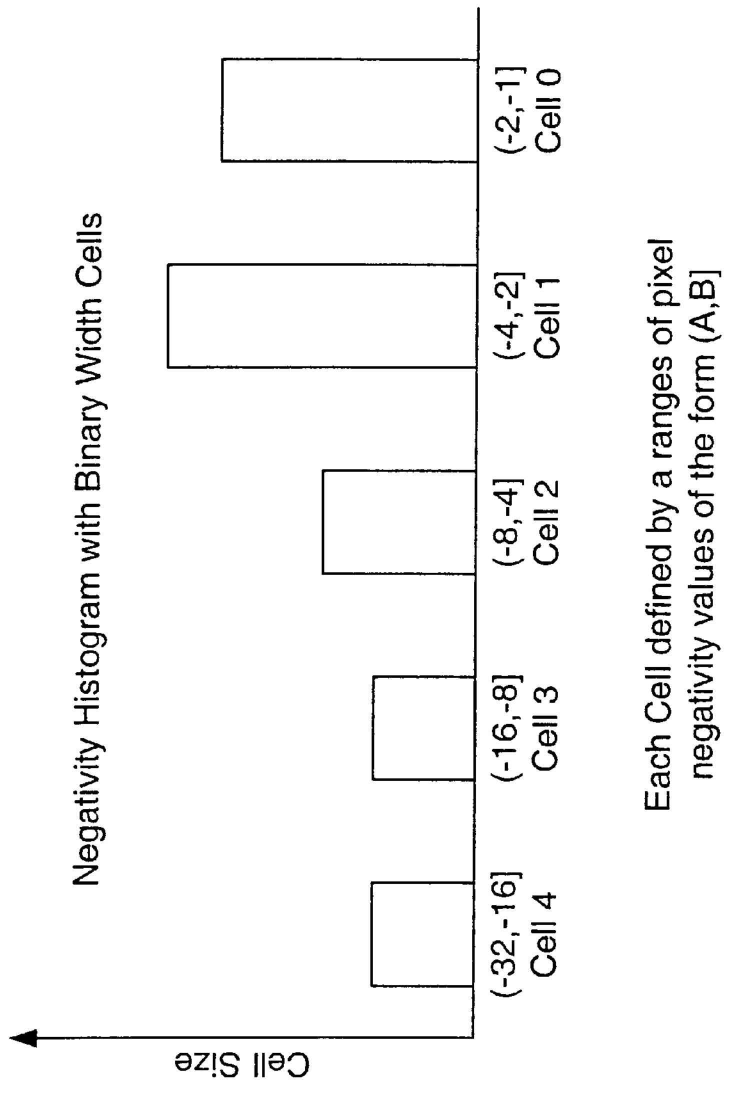
FIG. 22 shows another embodiment of a histogram having cell boundaries at successive powers of two.

FIG. 22 illustrates another embodiment of a histogram of pixel negativity values with cells defined by intervals the form $(-2^{n+1}, -2^n]$ where index n varies from zero to an upper limit $N_L$ which depends on the number of bits allocated to the pixel negativity value. In other words, the $n^{th}$ cell of the histogram is defined as the interval of pixel negativity values X given by the inequality $-2^{n+1}<X\leqq-2^n$. The following table illustrates the pixel negativity ranges for cells 1 through 5. The left and right pixel negativity limits for each cell are indicated in both decimal and 2s complement notation.

TABLE 1

Binary-Aligned Histogram Cells

| Cell # | Left Limit (non-inclusive) | Right Limit (inclusive) | Width |
|---|---|---|---|
| 1 | −2 = 111110 | −1 = 111111 | 1 |
| 2 | −4 = 111100 | −2 = 111110 | 2 |
| 3 | −8 = 111000 | −4 = 111100 | 4 |

TABLE 1-continued

| Binary-Aligned Histogram Cells | | | |
|---|---|---|---|
| Cell # | Left Limit (non-inclusive) | Right Limit (inclusive) | Width |
| 4 | −16 = 110000 | −8 = 111000 | 8 |
| 5 | −32 = 100000 | −16 = 110000 | 16 |

Because the limits of the cell ranges occur at powers of two, the assignment of each pixel negativity value to the cell range in which it resides may be performed with increased efficiency. (The most significant one bit of |X|, i.e. the absolute value of the frame negativity value, determines the cell number.) While the embodiment of FIG. 22 assumes that the pixel negativity value X is represented by a six-bit word in 2s complement form, the principles inherent in this example naturally generalize to any number of bits or any numeric representation scheme.

It is noted that the probability of achieving a pixel negativity value X may often be a decreasing function of |X|. Thus, it may be desirable to define the cell ranges so the cell resolution decreases (i.e. so that the cell width increases) with increasing magnitude of the pixel negativity. The cell ranges in the embodiment of FIG. 22 realize this desired property by having widths which are successive powers of two. More cells (higher resolution) are provided at low negative values, and fewer cells (coarser resolution) are provided at high negative values.

In some embodiments, a frame negativity value may be determined by computing a weighted average (or weighted sum) of the cell sizes. The size of a cell is typically the number of pixels (or pixel components) in the cell. The cell sizes corresponding to cells of low pixel negativity may be weighted less than the cell sizes corresponding to cells of high pixel negativity. (Pixel negativity is said to be "low" when the absolute value of pixel negativity is small, and "high" when the absolute value of pixel negativity is large.) For example, referring back to FIG. 21, cell size 604 may be given less weight than cell size 606. In the embodiment of FIG. 22, the size of cell n may be weighted by $2^{-n}$, and thus, a weighted sum of the cells sizes corresponds to a population average.

The calculated frame negativity value may then be compared against a negativity threshold. In some embodiments, the negativity threshold may be a user-adjustable value. For example, the user may adjust the threshold through a graphical user interface that executes on host CPU 102 and/or graphics system 112. In one embodiment, the user may change the threshold via one or more physical controls (e.g. buttons, knobs and/or sliders) on or coupled to system unit 82, display device 84 and/or graphics system 112.

In one set of embodiments, the graphics system may adjust the sample-to-pixel filter (e.g. the filter function and/or the filter support) in response to the frame negativity value of a current frame being unacceptably large as defined by the negativity threshold. The current frame negativity value may be declared unacceptably large when its magnitude (i.e. absolute value) is larger than the negativity threshold. The filter is adjusted so as to reduce the frame negativity value of subsequent frames. The graphics system may include dedicated circuitry and/or a processor operable to execute program code for implementing the filter adjustment(s). In one embodiment, the filter adjustment may be implemented by the negativity computation unit (NCU) external to the sample-to-pixel calculation units. For example, the NCU may update one or more filter coefficient tables from which the sample-to-pixel calculation units derive their filter coefficient values.

Conversely, the graphics system may continue to use the current filter for one or more subsequent frames if the current frame negativity value is acceptably small, e.g., if the absolute value of the current frame negativity is smaller than the threshold value. It is noted that the frame negativity value has been described above as a non-positive quantity (i.e. typically negative in sign). However, in some embodiments, the frame negativity value may be a non-negative quantity. For example, the frame negativity value may be computed from a histogram of the absolute value of the pixel negativity values.

In some embodiments, any filter adjustments induced by the current frame may be applied to the filter used (by the sample-to-pixel calculation units) in subsequent frames, i.e. the current frame is not affected. In other embodiments, any filter adjustments induced by the current frame are applied to the filter used in frames after the first subsequent frame, second subsequent frame, etc.

Figure 23D:
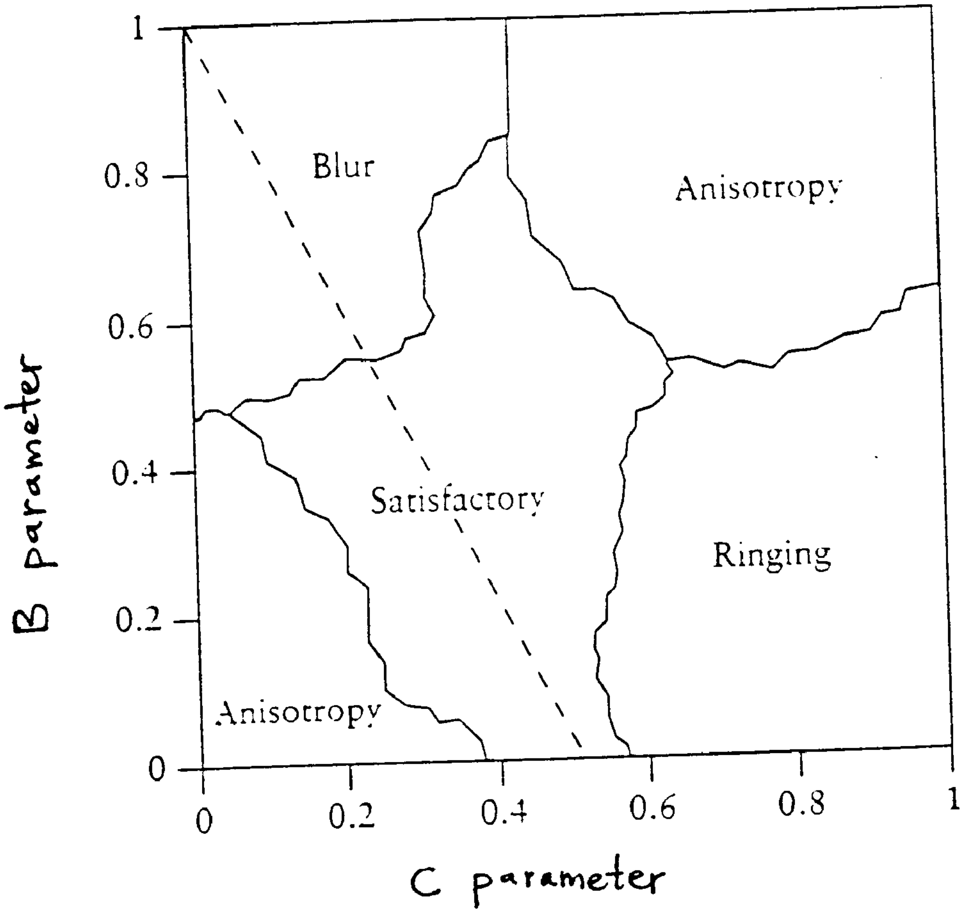
FIG. 23D illustrates a parameter square for the Mitchell-Netravali filter family.

FIG. 23A illustrates one embodiment of a truncated sinc filter plotted with respect to radius from the filter center. FIG. 23B illustrates one embodiment of a Catmull-Rom filter plotted with respect to radius from the filter center. Both filters are depicted with a maximum radius of two pixel units. If either filter were used to filter sample values, the resulting pixels may attain negative values due to the negative lobe in the range of radii between 1 and 2 pixel units. FIG. 23C illustrates one embodiment of a cubic B-spline filter. The cubic B-spline filter is similar is shape to the Gaussian filter and has no negative lobes. If this filter were used to filter sample values, the resulting pixel values may advantageously avoid the problem of attaining negative values. However, the resulting pixilated image may appear blurry.

It is noted that the Catmull-Rom and cubic B-spline filters are special case filters in the Mitchell-Netravali family of filters. The Mitchell-Netravali family of filters is parameterized by two parameters referred to herein as B and C. Each parameter takes a value in the interval [0,1]. Thus, the parameters space is a unit square. An ordered pair (B,C) which resides in the unit square defines a particular filter in the Mitchell-Netravali family. The Catmull-Rom filter corresponds to the ordered pair (0,1/2). The cubic B-spline corresponds to the ordered pair (1,0). Please refer to "Principles of Digital Image Synthesis" by Andrew S. Glassner, ©1995, Morgan Kaufman Publishing, Volume 1, pages 531–536 for a definition and discussion of the Mitchell-Netravali family. The parameter space may be partitioned into regions based on the filtering effect of the corresponding filters as suggested by FIG. 23D. Filters in the neighborhood of the cubic B-spline (1,0) may have only a small amount of energy in their negative lobes (if they have negative lobes at all). The frame negativity value resulting from use of such filters may be small or zero. Unfortunately, however, these filters may produce images that are unacceptably blurry to most viewers.

Filters in the neighborhood of the (0,1) filter in the parameter space may have a significant amount of energy in their negative lobes. Thus, the images generated by such filters may have an unacceptable amount of ringing (e.g. at the boundaries of objects), and the frame negativity values may have larger magnitudes. FIG. 23E illustrates the (0,1) Mitchell-Netravali filter.

Another neighborhood in the parameter space may give filters which generate satisfactory images (i.e. images which appear satisfactory on average to most viewers). However, even within the satisfactory neighborhood of the parameter space, there may be variations in sharpness versus blurriness, ringing versus non-ringing, etc. Filters along the parameter curve 2C+B=1 are generally satisfactory filters.

In some embodiments, the sample-to-pixel filter may be changed in response to the magnitude of the frame negativity value being above the negativity threshold. For example, the current filter may be replaced with a filter having less energy in the negative lobe(s) or no negative lobes at all. Succeeding frames generated with the new filter should have frame negativity values with smaller magnitude due to the reduced negative lobes of the new filter. The graphics system may apply adjustments to the sample-to-pixel filter as long as the magnitude of the frame negativity value exceeds the threshold. Furthermore, the graphics system may apply a control strategy which measures the amount deltaX by which the frame negativity exceeds threshold, and determines a new filter (or filter adjustment) based on the amount deltaX, a numerical derivative of deltaX, a numerical integration of deltaX, a discrete-time filtration of deltaX, or some combination thereof.

In one embodiment, the graphics system (e.g. a sample-to-pixel calculation unit or the negativity computation unit) may add a positive constant to the filter function to shift the filter function upwards in response to the frame negativity exceeding the negativity threshold. The upward shifted filter function has less energy in its negative lobe(s). FIG. 24 illustrates a truncated sinc function which has been shifted upward so that its absolute minimum rests on the horizontal axis, and thus, the negative lobes of the truncated sinc have been completely eliminated. The amount of the upward shift (or delta shift) may depend on the amount by which the frame negativity exceeds threshold. The filter function may be represented in graphics system 112 by a table of filter coefficients indexed by radius (or radius squared). Thus, the upward shift in the filter function may be realized by adding a positive constant to the tabulated filter coefficients. In another embodiment, instead of shifting the filter function upwards, the graphics system may replace the current filter with a filter such as a truncated Gaussian filter which has no negative lobes, and restore the original filter having negative lobes after the frame negativity has dropped below threshold. In a third embodiment, the graphics system may adjust the current filter in the direction of decreasing negative lobe energy within a family of filters (such as the Mitchell-Netravali family) in response to the frame negativity exceeding threshold.

As used herein, the negative lobe energy of a filter may be defined as the negation of the sum of the negative coefficients of the filter, or equivalently, as the sum of the absolute values of the negative coefficients of the filter.

In some embodiments, the graphics system may maintain an upper and lower negativity threshold, and may invoke adjustments of the sample-to-pixel filter when the frame negativity strays outside the interval bounded by the lower and upper thresholds. The control adjustments seek to drive the frame negativity back towards the threshold which has been violated, i.e. back towards the interior of the interval.

Figure 25:
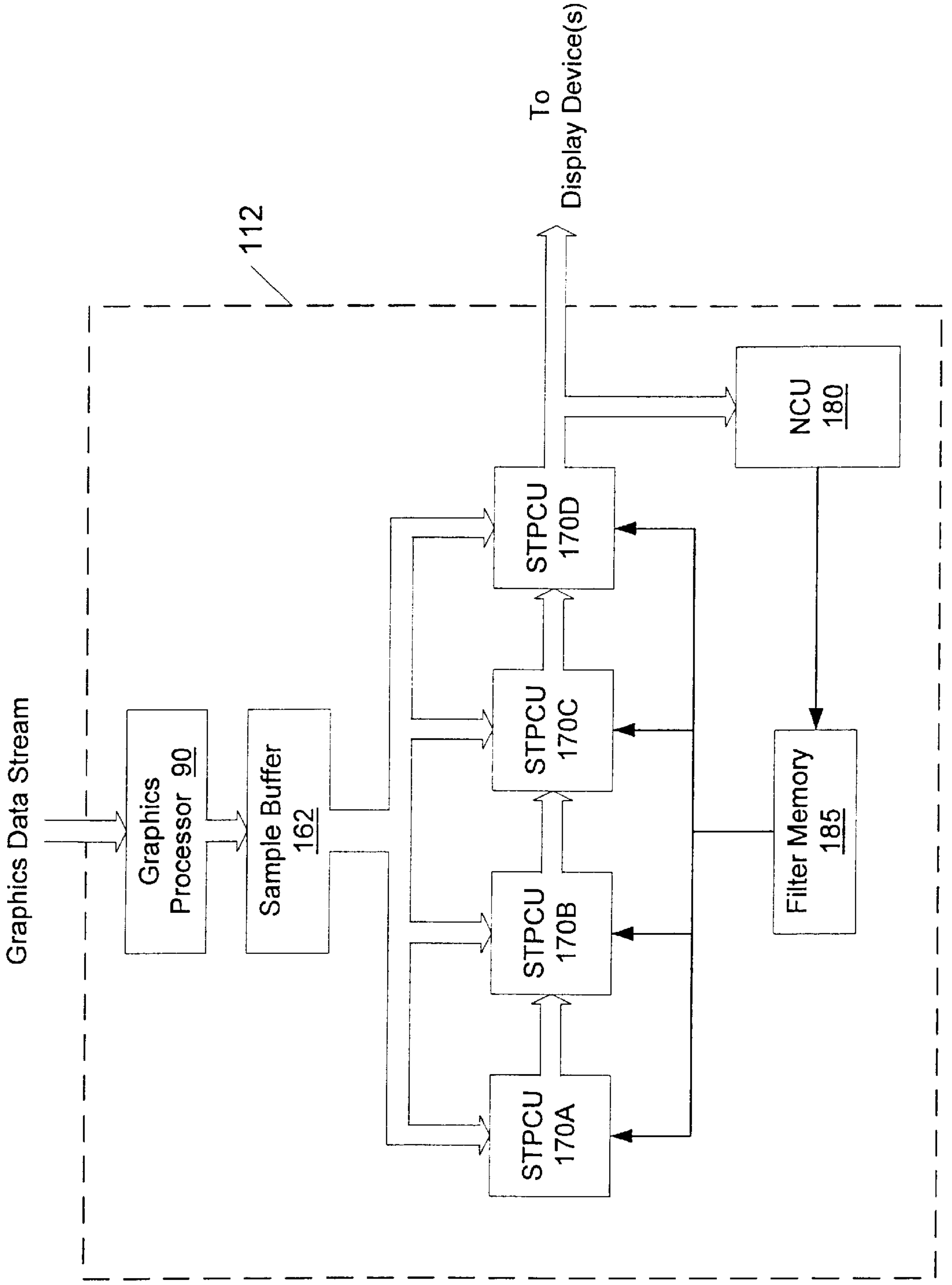
FIG. 25 illustrates one embodiment of a graphics system configured to dynamically adjust the sample-to-pixel calculation filter based on frame negativity.

FIG. 25 illustrates one embodiment of graphics system 112 which is configured to implement dynamic filter adjustments based on the frame negativity values. The graphics system includes graphics processor 90, sample buffer 162, one or more sample-to-pixel calculation units 170, negativity computation unit 180 and filter memory 185. Graphics processor 90 may render samples in response to a stream of received graphics data. The rendered samples may be stored in sample buffer 162. The one or more sample-to-pixel calculation units 170 may read samples from sample buffer 162, and filter the samples to generate a stream of output pixels. The stream of output pixels may be passed to a display device for presentation to a user/viewer. In addition, the stream of output pixels may be passed to negativity computation unit 180 for computation of a frame negativity value for the current frame. In response to the frame negativity value being larger in magnitude than a negativity threshold, the negativity computation unit 180 may implement a filter adjustment by modifying the values in filter memory 185. Filter memory 185 may store computed values of the filter function at a fixed set of radius values. Alternatively, filter memory 185 may store a set of parameters from which values of the filter function may be readily computed.

The sample-to-pixel calculation units 170 may read the filter values and/or filter parameters from the filter memory 185, and use the filter values and/or parameters to perform the sample-to-pixel filtering. In one embodiment, each of the sample-to-pixel calculation units has a dedicated filter memory. Thus, the negativity computation unit 180 may update some or all of the dedicated filter memories.

Figure 26:
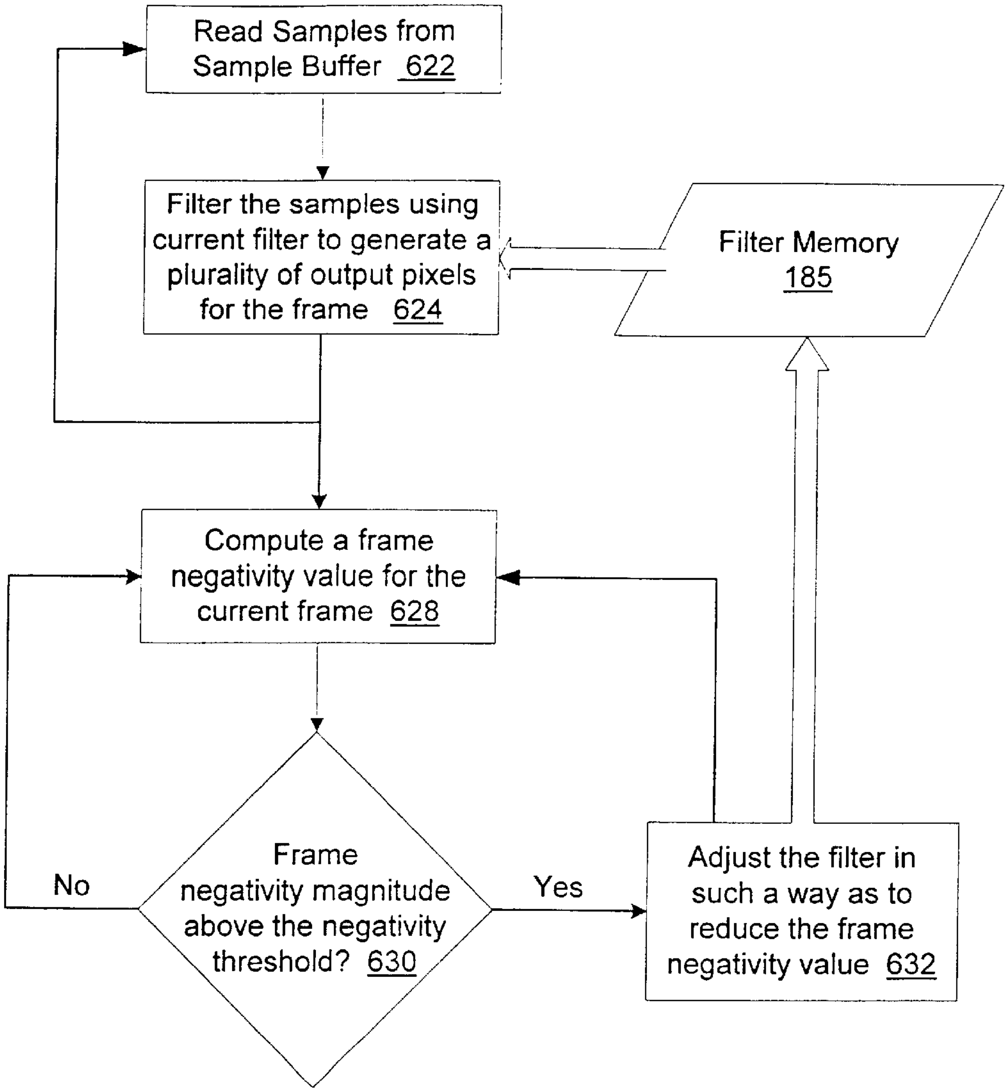
FIG. 26 shows a flowchart describing one embodiment of a method for adjusting the filter in response to the magnitude of the frame negativity value being above a certain threshold.

FIG. 26 is a flowchart describing one embodiment of a method for adjusting the filter. In step 622, one or more sample-to-pixel calculation units may read samples from sample buffer 162. Each sample-to-pixel calculation unit may receive a corresponding stream of samples from sample buffer 162, and may filter the samples of the corresponding stream to generate output pixels as indicated in step 624. The filter used by the sample-to-pixel calculation units may be defined by the filter values and/or filter parameters stored in filter memory 185. Filter values and/or filter parameters for a default filter having one or more negative lobes may be initially stored in filter memory 185. The output pixels generated by each sample-to-pixel calculation unit may be integrated into an output pixel stream as suggested by FIG. 25. The output pixel stream is transmitted to one or more display devices. In some embodiments, the operations of (a) reading samples from sample buffer 162 and (b) filtering the samples to generate output pixels are performed concurrently. Graphics processor 90 may continuously update sample buffer 162 with rendered samples in response to a received stream of graphics data (e.g. triangle data). Similarly, sample-to-pixel calculation units 170 may continuously read bins of sample data according to a raster scan pattern (or approximately a raster scan pattern) from sample buffer 162, and may filter the sample data to generate output pixels, for one frame after another.

In step 628, the graphics system (e.g. negativity computation unit 180) may receive the output pixel stream and compute a frame negativity value for the current frame. It is noted that the computation of the frame negativity may be initiated as soon as the first pixels of the current frame become available.

In step 630, the graphics system (e.g. the negativity computation unit 180) may compare the frame negativity value of the current frame to the threshold value. If the frame negativity value is larger in magnitude than the threshold value, step 632 may be performed. In step 632, the graphics system may adjust the filter so that the frame negativity values of future frames may be reduced in magnitude. In some embodiments, the amount of the filter adjustment may depend on the amount by which the frame negative value exceeds the threshold in magnitude. In other embodiments, the graphics system may incorporate information about the rate of change of the frame negativity value and the past history of the frame negativity value (in previous frames) to determine the filter adjustment.

Filter adjustments may be realized by updating the filter values and/or parameters stored in filter memory 185. For example, negativity computation unit 180 may compute filter values for the adjusted filter at the fixed set of radii, or may compute adjusted values of the Mitchell-Netravali parameters B and C, and store these filter values/parameters in filter memory 185. In one set of embodiments, the filter memory 185 may be updated before the start of the next frame so that the sample-to-pixel calculation units 170 may use the updated filter for the output pixel computations of the next frame. After the filter has been adjusted, the computation of the frame negativity value (i.e. step 628) may be initiated for the next frame as soon as the output pixel data for the next frame is available.

If, in the comparison of step 630, the frame negativity value is determined to be smaller in magnitude than the threshold value, the filter adjustment may be bypassed. Thus, the same filter, as defined by the contents of filter memory 185, may be used in the next frame.

It is noted that a wide variety of filter adjustments are contemplated. For example, the filter function may be (a) shifted up by the addition of a constant, (b) morphed in the direction of decreasing negative lobe energy in a parameterized family of filters, (c) replaced with a filter of a different type having little or no negative lobes, (d) modified by clamping the negative coefficients (i.e. coefficients in the negative lobes) of the current filter to zero, (e) modified by attenuating the negative coefficients of the current filter (i.e. by moving them closer to zero), or (f) any combination of the preceding operations. After the frame negativity is reduced in magnitude to a value below the threshold, filters having increased negative lobe energy may be used once again. For example, an original default filter may be restored once the frame negativity magnitude drops below threshold.

In one set of embodiments, the graphics system is configured to use a separate filter for each color. Thus, a red filter function may be used to filter the red components of samples, a green filter function may be used to filter the green components of samples, and a blue filter function may be used to filter the blue components of samples. As described above, the graphics system may compute a frame negativity value for each color. The filter function (and/or support) for each color may be adjusted based on the corresponding color frame negativity value. FIG. 26 may be interpreted as a method for adjusting any of the color filters in response to the corresponding color frame negativity value.

Figure 27:
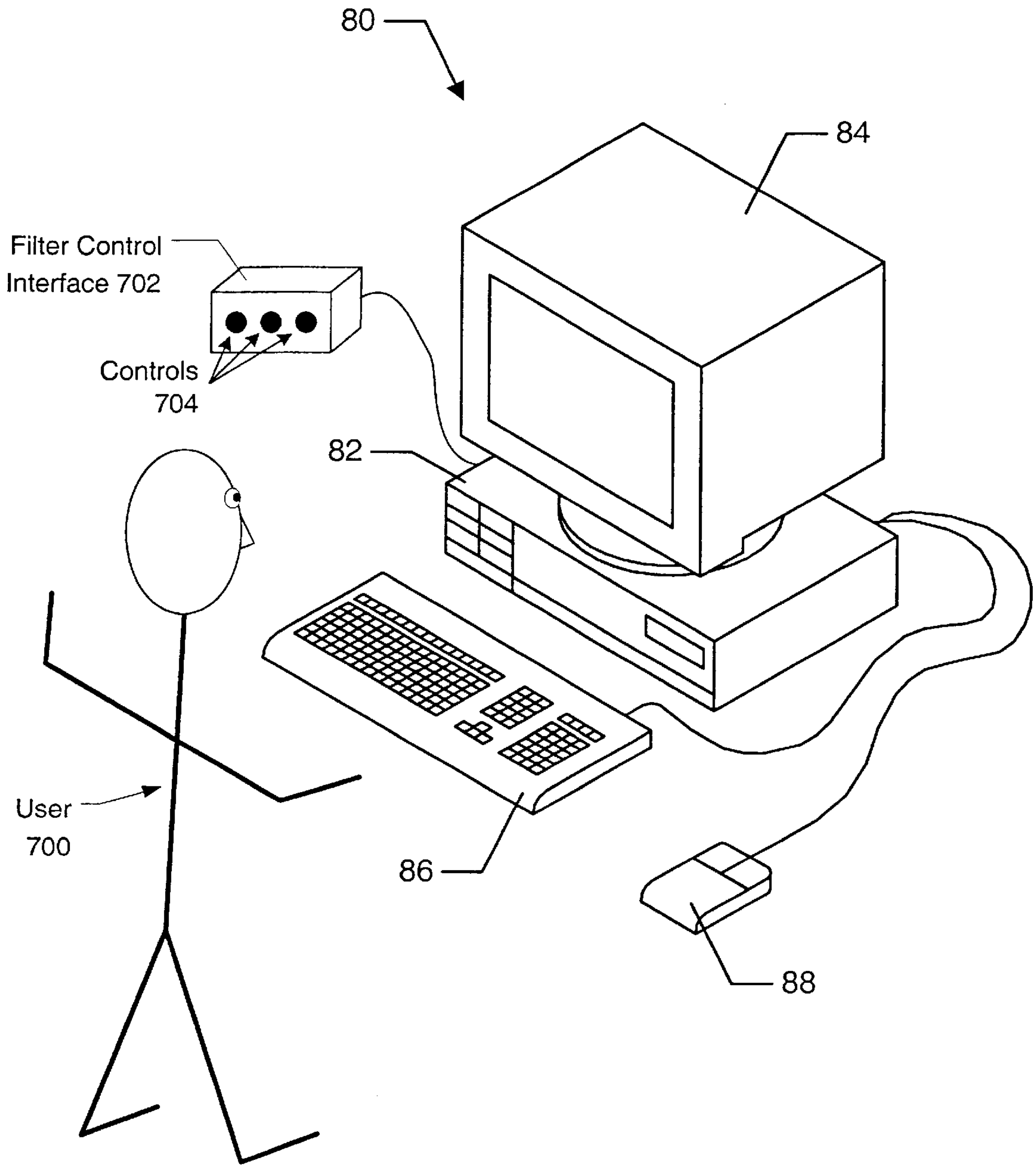
FIG. 27 shows a computer system, wherein a user, using filter control interface 702, may adjust the filter type, filter function and/or filter support.

FIG. 27 shows one embodiment of a computer system 80 comprising system unit 82, display device 84, keyboard 86, and pointing device 88. User 700 is operating computer system 80 and is viewing display 84. In one embodiment, the graphics system 112 may initially use a default filter for generating output pixels from the rendered samples. User 700 may then adjust the filter according to his/her personal preferences with respect to the quality of the image. The user may dynamically adjust the filter by manipulating controls 704 located on filter-control interface 702. The filter adjustments may be implemented in real-time, and thus, the user may immediately observe the effects of his/her control adjustments on the displayed image quality.

While filter-control interface 702 is depicted as having three controls, in other embodiments, the filter-control interface may comprise a greater or lesser number of controls. In addition, controls 704 are intended to represent any desired combination of controls such as knobs, buttons, sliders, joysticks and balls. Filter-control interface 702 may be an external physical device as suggested by FIG. 27. In this case, filter-control interface 702 may couple to an input port on graphics system 112 or device port on system unit 82.

In another embodiment, filter-control interface 702 may be implemented in software through which the user may be able to control the filter properties (e.g., in an operating system or windows system or application control panel). For example, host CPU 102 may execute program code which supports a graphical filter-control interface. In this embodiment, controls 704 are realized by graphical controls, and an external (i.e. physical) filter-control interface may not be needed. In other embodiments, the functionality of the filter control interface may be implemented as a combination of physical device interface and software interface.

The graphics system may be configured to control several properties of the sample-to-pixel filter, and more generally, properties of the filtering process that generates the output pixels from the rendered samples, in response to adjustments of controls 704. In one embodiment, one or more of the controls 704 enable a user to select a filter type. Examples of filter types that a user may be able to select include: a box filter, a tent filter, a cylindrical filter, a cone filter, a truncated Gaussian filter, a Catmull-Rom filter (or more generally, a Mitchell-Netravali filter), a windowed Sinc filter and a cubic spline.

Additionally, one or more of the controls may be configured to control movement of the current filter along (or within) a one, two or N-parameter family of filters. For example, having selected the Mitchell-Netravali family as the filter type, the user 700 may manipulate one or more of controls 704 to slide along the B and C parameter directions of the Mitchell-Netravali parameter space, or one of controls 704 to slide along the curve 2C+B=1 in the Mitchell-Netravali parameter space. In one embodiment, an image of a parameter space (e.g. the Mitchell-Netravali parameter square as suggested by FIG. 23D) may be displayed on the screen in a configuration mode, and the user may drag a superimposed selection cursor (or cross-hairs) to a desired location in the parameter space. The location of the selection point determines the parameters of the filter to be used by the sample-to-pixel calculation units. The graphics system may implement the filter adjustments in response to displacements of the selection point in real-time. Thus, the user may immediately observe the effects of his/her parameter displacements on the output video quality.

In some embodiments, the user 700 may define an arbitrary N-parameter family by selecting filter functions which realize the extremes of the family in each parameter direction and/or by supplying one or more functional expressions defining the family.

Some of the controls may enable a user to control the geometry and extent of the filter support, i.e., the shape and size of the support area about the filter center. The filter support defines the samples which are included in the filtering process. In one embodiment, one control may be used to select the shape of the support area. Examples of support area shapes a user may be able to select are: a triangle, a rectangle, a hexagon, a circle, etc. Another control (or controls) may be used to control the extent of the filter support. A radial support control may be used for adjusting the radius of the filter support. A horizontal support control may be used for adjusting the extent of the filter support in the horizontal direction, and a vertical support control may be used for adjusting the extent of the filter support in the vertical direction. In the cases, for example, where the selected filter has a circular support, the horizontal control may be used to expand or contract the filter support in the horizontal direction, and the vertical control may be used to expand or contract the filter support in the vertical direction, thus enabling the user to change the filter support from a circle to an ellipse which is more elongated in the vertical or horizontal directions. Similarly, a user may be able to expand or contract a rectangular support in the vertical or horizontal directions.

Other controls may be used to translate the filter function up or down, and/or, to expand or contract the filter function in the radial, horizontal and/or vertical directions of screen space. It is noted that the filter function may be represented in filter memory 185 as a table of function values evaluated at a set of radii spanning the interval from zero to some upper limit. The sample-to-pixel calculation units may determine the filter function for arbitrary radii based on interpolation of the tabulated values. One method to achieve a scaling (i.e. expansion or contraction) of the filter function in the radial direction is to multiply the sample radius by a constant before accessing the filter function table. In another embodiment, the function table may be populated with function values at X-Y positions surrounding the filter center. In this case, a sample-to-pixel calculation unit may compute the X and Y displacement of a sample with respect to the filter center and use these displacements to the access the function table. Thus, scaling of the filter function in the X and/or Y direction may be achieved by multiplying the X displacement and/or Y displacement by respectively constants before accessing the function table. The constants are controlled by the user inputs.

In another embodiment, the user may be able to change the filter (e.g. filter type, filter function, filter support geometry and filter support extent) on a per region basis. For example, a background scene may be more appropriately displayed using a softer filter than the foreground of the scene. Filter-control interface 702 may allow the user to first specify a region on the display and then make filter adjustments specific to that region.

Different users may have different preferences as to the quality of an image. Certain users may prefer, for example, an image that is sharper, whereas other users may prefer an image that is softer (i.e. more smoothed). Thus, one of the controls 704 may be a sharpness/smoothness control whereby the user 700 may adjust the amount of smoothing to applied in the sample filtering. In other words, the sharpness/smoothness control may induce the morphing of the sample-to-pixel filter in the direction of increased smoothing or increased acuity within a parameterized family of filters.

Furthermore, different displays may have different responses to the same pixel values. For example, a CRT typically has a Gaussian intensity distribution about each pixel, while an LCD typically has a square intensity distribution with a sharp cut-off in intensity about each pixel. Such differences may be especially apparent when different types of displays (or projectors) are used in a multi-display system. In some embodiments, graphics system 112 may use a different filter for each display, and filter control interface 702 may be configured to allow filter control adjustments per display (and/or per projector). By manipulating controls 704, the user 700 may be able to reconcile the appearance between multiple display devices. For example, user 700 may specify more smoothing for an LCD display, and less smoothing for a CRT display, so that the displayed video on each display may look more consistent. Alternatively, graphics system 112 may automatically apply the multi-display image reconciliation by selecting appropriate filters for each display based on knowledge of the characteristics of each display. The user (or system configuration personnel) may enter characterizing information for each display such as display type, manufacturer and/or model number.

Furthermore, the user 700 may not be satisfied with the nominal appearance of the video output from a given display, and thus, may be interested in compensating the undesirable display-related effects on the video output from the given display, or in making the video output of the given display emulate (or more closely resemble) the typical appearance of another display (or display type). Thus, filter control interface 702 may include one or more controls to perform display compensation and/or display emulation.

In some embodiments, the host CPU 102 may support a graphical user interface (GUI) through which the user may open, close and manipulate display windows on one or more screens. Graphics processor 90 may receive independent streams of graphics data for each window, and may render samples for each window into sample buffer 162. Each sample written into sample buffer 162 may be tagged with a window ID of the window to which it belongs. Sample-to-pixel calculation units 170 may operate on each window's samples using a different filter. Thus, filter memory 185 may have sufficient storage to support multiple filter data records, one record for each active window. Each filter data record specifies the filter values and/or filter parameter which define the filter to be used on the corresponding window. Thus, in addition to control inputs which specify a filter or filter adjustment, filter control unit 187 may receive a window indicator (e.g. a window ID) defining the window to which the control inputs pertain. The filter control interface 702 may be part of the graphical user interface (GUI).

Figure 28:
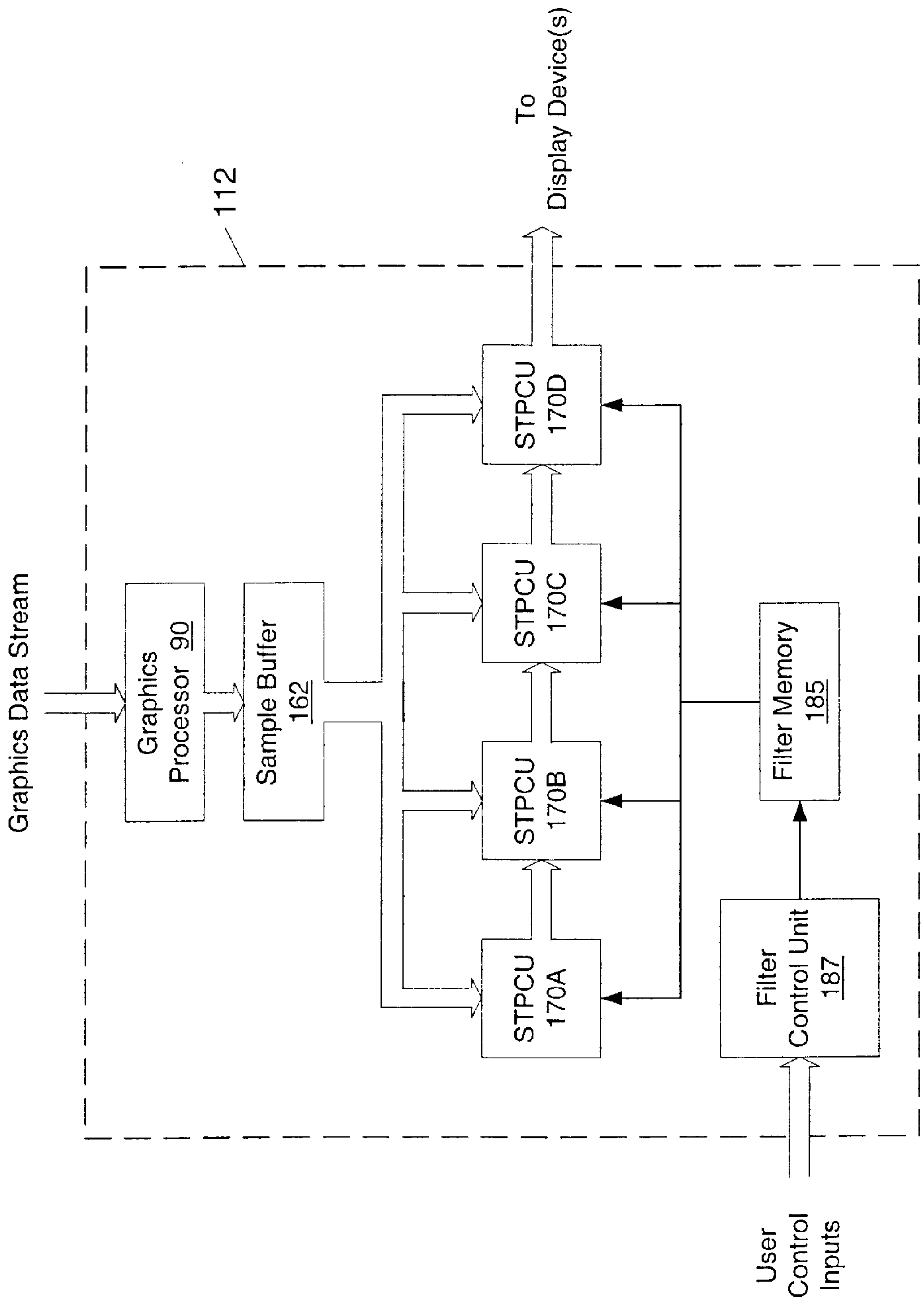
FIG. 28 shows one embodiment of a graphics system enabling a user to dynamically control the filter type, filter function and/of filter support.

FIG. 28 illustrates one embodiment of graphics system 112 which is configured to implement dynamic filter adjustments in response to control inputs provided by the user through the filter control interface 702. Graphics system 112 includes graphics processor 90, sample buffer 162, one or more sample-to-pixel calculation units 170, filter control unit 187 and filter memory 185. Graphics processor 90 may render samples in response to a stream of received graphics data. The rendered samples may be stored in sample buffer 162. Each of the sample-to-pixel calculation units 170 may read samples from sample buffer 162, and filter the received samples to generate output pixels. The output pixels generated by each sample-to-pixel calculation unit may be integrated into an output pixel stream and passed to a display device for presentation to a user. Filter control unit 187 receives user control inputs from filter control interface 702. In the case where filter control interface 702 is a graphical interface, filter control unit 187 may receive user control inputs from the operating system (executing on host computer 102) via system bus 104.

Filter control unit 187 may implement filter adjustments consistent with the user control inputs. Filter control unit 187 may perform any necessary computations to determine an adjusted set of filter values and/or filter parameters in response to the user control inputs, and may store the adjusted set of filter values and/or filter parameters in filter memory 185. The set of filter values and/or filter parameters stored in filter memory 185 determine the filter (i.e. the filter function and/or filter support) used by the sample-to-pixel calculation units. In other words, the sample-to-pixel calculation units may read the filter values and/or filter parameters from filter memory 185 to determine the geometry and extent of the filter support and to compute the filter weight for each sample falling in the filter support. For example, filter memory 185 may store values of the filter function evaluated at a set of radii spanning the interval from zero up to the maximum filter radius. In one embodiment, each of the sample-to-pixel calculation units has a dedicated filter memory. Thus, filter control unit 187 may update some or all of the dedicated filter memories in response to the user control inputs.

Figure 29:
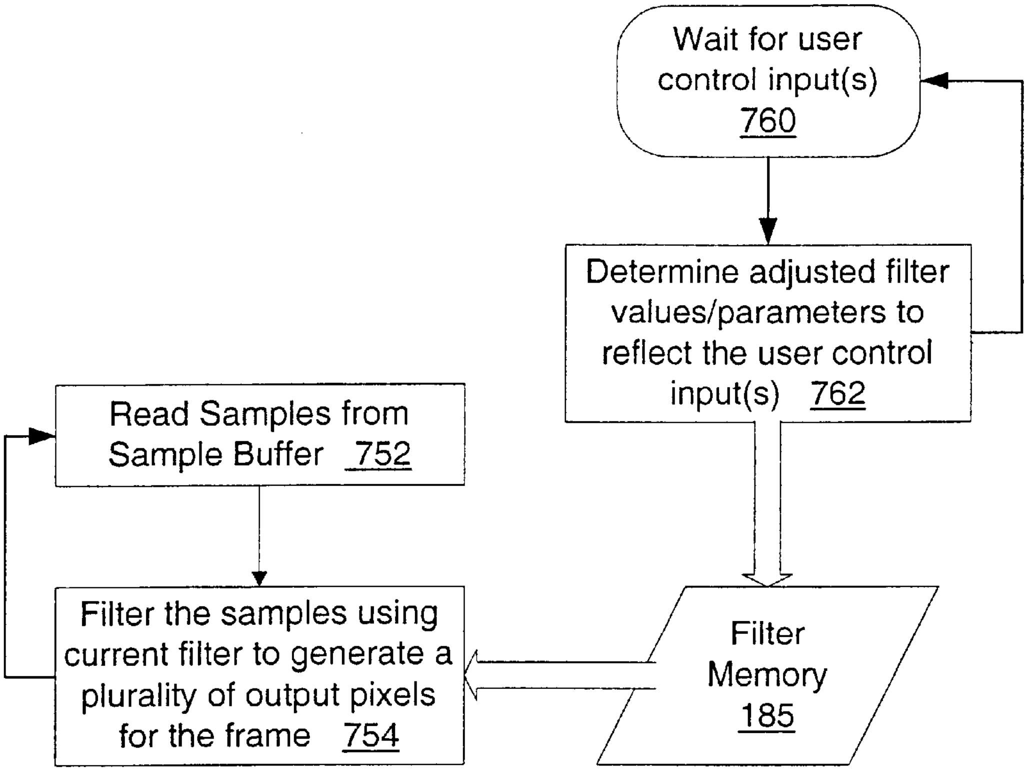
FIG. 29 shows a flowchart describing one embodiment of a method for adjusting the filter type, the filter function and/or the filter support in response to receiving user input.

FIG. 29 shows a flowchart describing one embodiment of a method for adjusting the filter in response to user control input(s). In step 752, the one or more sample-to-pixel calculation units 170 may read samples from sample buffer 162. Each sample-to-pixel calculation unit may receive a corresponding stream of samples from sample buffer 162, and may filter the samples of the corresponding stream to generate output pixels as indicated in step 754. The filter used by the sample-to-pixel calculation units may be defined by the filter values and/or filter parameters stored in filter memory 185. Filter values and/or filter parameters for a default filter may be initially stored in filter memory 185. The output pixels generated by each sample-to-pixel calculation unit may be integrated into an output pixel stream as suggested by FIG. 28. The output pixel stream is transmitted to one or more display devices. In some embodiments, the operations of (a) reading samples from sample buffer 162 and (b) filtering the samples to generate output pixels are performed concurrently. Graphics processor 90 may continuously update sample buffer 162 with rendered samples in response to a received stream of graphics data (e.g. triangle data). Similarly, sample-to-pixel calculation units 170 may continuously read bins of sample data according to a raster scan pattern (or a distorted raster scan pattern) from sample buffer 162, and may filter the sample data to generate output pixels, for one frame after another.

In step 760, the filter control unit 187 may wait for control inputs asserted by the user 700 through filter control interface 702. In response to receiving user control input(s), filter control unit 187 may perform step 762. In step 762, filter control unit 187 may compute filter values and/or filter parameters for an adjusted filter consistent with the user control inputs, and store these values/parameters in filter memory 185. After the filter memory 185 is updated, filter control unit 762 may return to wait state 760, and the sample-to-pixel calculation units 170 may filter pixels in succeeding frames with the adjusted filter.

In some embodiments, the filter-control interface 702 may be configured for a multi-user environment. Thus, filter control interface 702 or host CPU 102 may store the filter configuration data that each user develops in a graphics session, and may restore the filter configuration data when the user returns for a future graphics session. For example, in one embodiment, in a sign-on procedure, the user may enter information identifying himself/herself to the system, e.g. a username, password and/or ID number. In another embodiment, the user may simply select his/her ID number using an ID selection control of the filter control interface 702. Host CPU 102 or graphics system 112 may then restore the user's filter configuration data from memory.

In one set of embodiments, the graphics system is configured to use a separate filter for each color. In other words, a red filter may be used to filter the red components of samples, a green filter may be used to filter the green components of samples, and a blue filter may be used to filter the blue components of samples. Thus, the filter control interface 702 and graphics system 112 may allow the user to independently change/adjust each of the per-color filters. For example, the user may select a color, adjust parameters of the filter function and/or filter support for the corresponding color filter, select another color, and so on.

Figure 30:
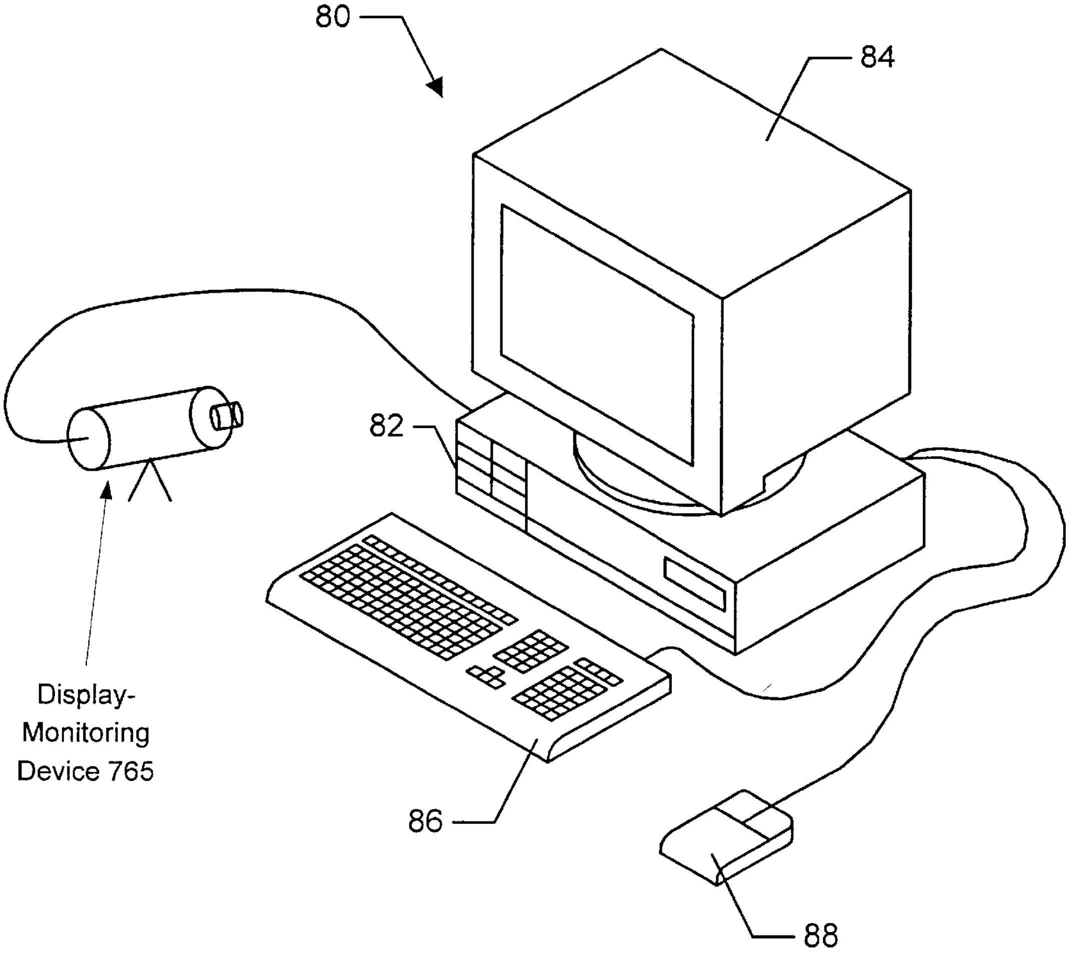
FIG. 30 shows one embodiment of a display monitoring system for capturing displayed images, and adjusting filter properties in response to the captured images.

In another embodiment, the graphics system may be operable to dynamically adjust the sample-to-pixel filter (e.g. the filter function and/or filter support) in response to measurements obtained by a display-monitoring system that is connected to the graphics system. An example of a display-monitoring system is camera 765 shown in FIG. 30. Camera 765 is focused on display 84 (or some portion thereof) in order to capture the sequence of image frames that are presented on display 84. In one embodiment, camera 765 may be a digital camera able to capture and output the displayed image frames in digital format to the graphics system. For example, the camera may be configured to output a plurality of captured pixels. In an embodiment where camera 765 is an analog camera, an analog-to-digital converter (ADC) may be used to convert the camera output signal to digital format in order to obtain the captured pixels. In another embodiment, the graphics system may perform the conversion of the camera output signal from analog to digital. Camera 765 preferably captures images at a resolution that is equal to or higher than the resolution of display 84. Furthermore, camera 765 may capture images at a frames/second rate that is equal to the refresh rate of display 84. In another embodiment, the refresh rate of display 84 may be an integer multiple of the frames/second rate at which camera 765 may be able to capture images. In another embodiment, camera 765 may capture images at a frames/second rate that is an integer multiple of the refresh rate of display 84. In one embodiment, camera 765 receives synchronization information from the graphics system in order to remain synchronized with the images displayed on display 84.

The image captured by camera 765 contains information on how the sample-to-pixel filter has affected the displayed image. In addition, the captured image contains information on how display 84 has affected the color intensity distribution of the displayed output pixels. As mentioned before, an LCD displays each pixel with a relatively square distribution in color intensity, whereas a CRT displays each pixel with a Gaussian distribution. Therefore, such a display monitoring system may be used to dynamically adjust the sample-to-pixel filter (e.g. the filter function and/or filter support) such that an image may appear the same or close to the same on different types of displays.

The graphics system may receive a succession of captured image frames in the form of captured pixels from the display monitoring device 765. The graphics system may compute a sharpness value for each of the captured frames. The graphics system may also compute a sharpness value for every other frame, every two frames, etc. in cases where the computational power is limited. The sample-to-pixel calculation unit may compute the sharpness value internally or the computation of the sharpness value may be computed by a sharpness-computation unit or by the host CPU.

In one embodiment, the graphics system may be configured to output a test image (or a series of test images) to display 84. The test image may have, for example, a pre-determined sharpness value to assist in the "tuning" of the sample-to-pixel filter for a given display. The graphics system may perform a comparison of the parameters of the captured image to the parameters of the displayed test image and then accordingly adjust parameters of the sample-to-pixel filter.

The test image may have a neighborhood in which all display pixels are turned off except for a single central pixel which is turned on. The camera may capture the neighborhood at high resolution. Thus, the captured pixels may characterize the display's intensity distribution for the single pixel. A sharpness value may be computed from an analysis of the captured pixels.

In another embodiment, the graphics system may compute the sharpness value of each frame by examining the spatial frequency spectrum (e.g. an FFT or DCT) of the captured image. The amount of energy in the frequency spectrum at high spatial frequencies is an indicator of the sharpness of a displayed image.

The graphics system is further configured to compare the sharpness value to a desired sharpness value. In response to the sharpness value being above or below the desired value, the graphics system may dynamically adjust the sample-to-pixel filter (e.g. the filter function and/or the filter support) in order to maintain the sharpness value within a certain percentage of the desired value. For example, the graphics system may adjust the filter by (a) choosing a different type of filter, (b) adjusting parameters of the filter within a parameterized family of filters (such as the Mitchell-Netravali family), (c) expanding or contracting the width of the filter function along the radial direction, the x direction and/or the y direction, or (d) raising or lowering the coefficients of the filter function. In addition, the graphics system may change the filter support, e.g. by extending or contracting the filter support in the x direction, the y direction and/or the radial direction. The desired sharpness value may be a user-adjustable parameter.

In another embodiment, the graphics system may be configured to compute a similarity value by comparing the set of captured pixels provided by the display-monitoring device to the output pixels generated by the sample-to-pixel calculation units. The similarity value may be computed by the sample-to-pixel calculation units or by a similarity computation unit. The similarity value may range, for example, from 0 to 1, wherein the similarity value is 0 for two completely dissimilar images and 1 for two identical images. Existing image-comparison algorithms may be used to compare the two images and compute the similarity value.

The graphics system may be further configured to compare the similarity value to a minimum similarity value. In response to the similarity value being below the minimum similarity value, the graphics system may dynamically change or adjust the sample-to-pixel filter (e.g. parameters of the filter function and/or the filter support) in order to maintain the similarity value above the minimum value. For example, the graphics system may adjust the filter parameters within a parameterized filter family in a direction known to induce increased similarity or reconstruction accuracy. In addition, the graphics system may expand or contract the filter function and/or the filter support in the radial, horizontal, and/or vertical screen space directions. In one embodiment, the graphics system may replace the current filter with a different type of filter which is known to induce increased similarity. The minimum similarity value may be adjustable by the user/viewer.

Figure 31:
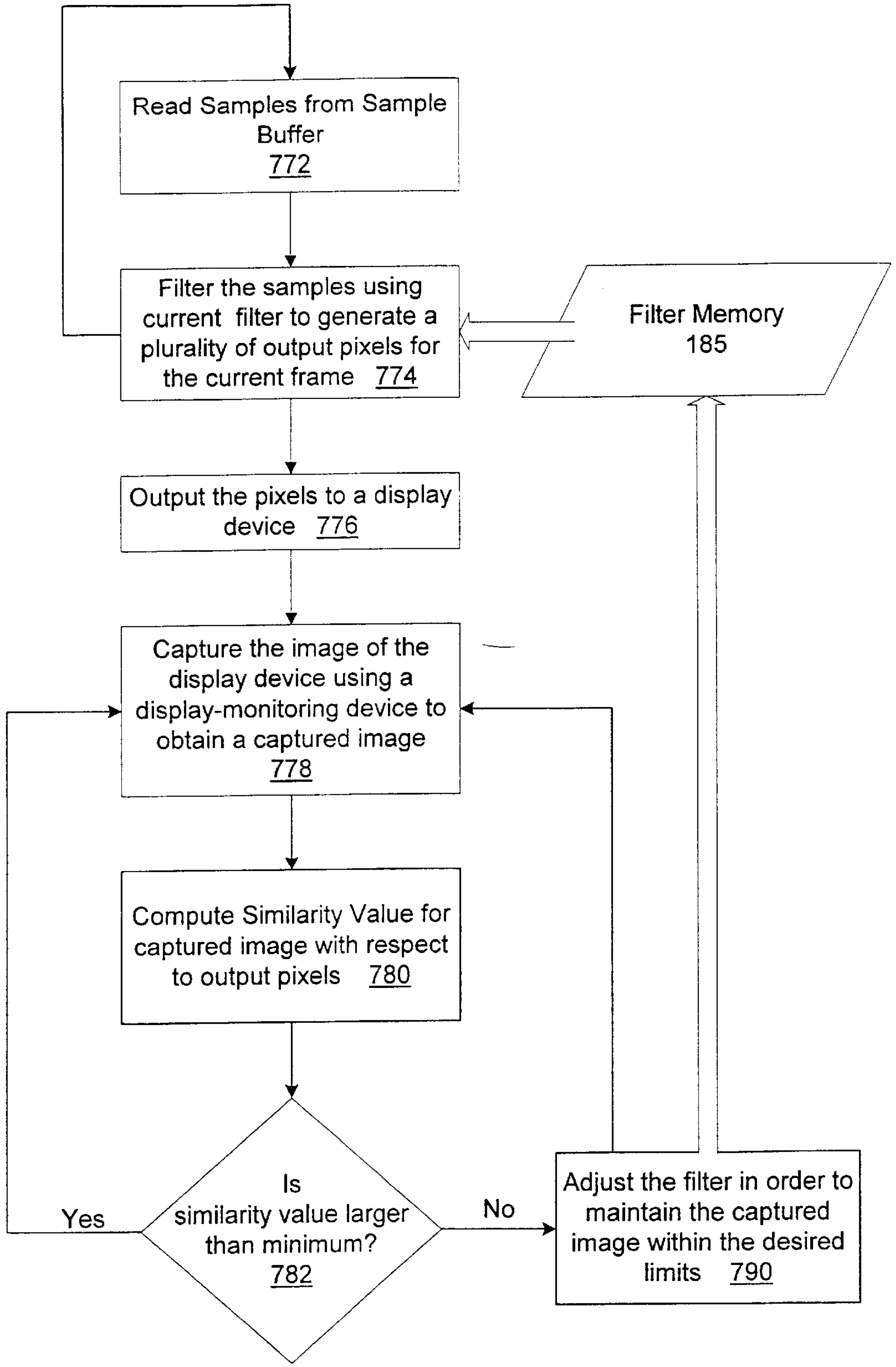
FIG. 31 shows a flowchart describing one embodiment of a method for adjusting the filter type, filter function and/or the filter support in response to a display-monitoring device capturing displayed images.

FIG. 31 shows a flowchart describing a method for adjusting the filter according to one embodiment. In step 772, the one or more sample-to-pixel calculation units 170 may read samples for a current frame from the sample buffer 162. In step 774, the sample-to-pixel calculation units may operate on the samples with the filter determined by filter memory 185 to generate a plurality of output pixels for the current frame. Steps 772 and 774 may operate concurrently in a pipelined fashion, i.e. the sample-to-pixel calculation units may continuously read and filter samples for one frame after another. In step 776, a display device receives and displays the output pixels. In step 778, a display-monitoring device captures the image displayed by the display device.

In step 780, the similarity computation unit within the graphics system may compute a similarity value for the captured image with respect to the output pixels of the current frame. In step 782, the graphics system determines if the similarity value is larger than a minimum similarity value. If the similarity value is greater than the minimum similarity value, the filter remains unchanged for the filtering of subsequent frames. If the similarity value is less than the minimum similarity value, in step 790, the graphics system adjusts the sample-to-pixel filter (e.g. the filter function and/or the filter support) in order to increase the similarity of a subsequent captured image with respect to the corresponding frame of output pixels. After adjusting the sample-to-pixel filter (or perhaps, while adjusting the sample-to-pixel filter), step 778 may be initiated for the next displayed frame.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note that the headings used herein are for organizational purposes only and are not meant to limit the description provided herein or the claims attached hereto.

What is claimed is:

1. A method for generating pixels for a display device, the method comprising:

receiving graphics data;

rendering a first plurality of samples in response to the graphics data;

filtering said first plurality of samples using a first filter to generate a first set of output pixels;

transferring said first set of output pixels to the display device; and adjusting said first filter in response to user input.

2. The method of claim 1, further comprising:

rendering a second plurality of samples in response to additional graphics data;

filtering said second plurality of samples using the adjusted filter to generate a second set of output pixels; and transferring the second set of output pixels to the display device.

3. The method of claim 1, wherein said dynamically adjusting said first filter comprises adjusting one or more support parameters in response to the user input, wherein the support parameters determine a support region of the adjusted first filter.

4. The method of claim 3, wherein said one or more support parameters determine an extent of the support region of the adjusted first filter.

5. The method of claim 3, wherein said one or more support parameters determine a geometry for the support region of the adjusted first filter.

6. The method of claim 1, wherein said dynamically adjusting said first filter comprises changing one or more filter parameters of the first filter in a parameter space in response to the user input, wherein the parameter space corresponds to a parameterized family of filters.

7. The method of claim 1, wherein said dynamically adjusting said first filter comprises:

receiving said user input indicating a user's choice of a different filter type; and changing the first filter to the different filter type.

8. The method of claim 1, wherein said dynamically adjusting said first filter comprises scaling the first filter along a radial dimension in response to the user input.

9. The method of claim 1, wherein said dynamically adjusting said first filter comprises scaling the first filter along a screen-space axis in response to the user input, wherein the screen space axis is selected from the group comprising the horizontal screen-space axis and the vertical screen-space axis.

10. The method of claim 1 further comprising receiving said user input from a filter control interface, wherein said filter control interface comprises one or more user-adjustable controls.

11. The method of claim 10, wherein the filter control interface is implemented as a graphical user interface.

12. The method of claim 10, wherein a first one of said adjustable controls selects a filter type for said first filter, a second one of adjustable controls selects a value of a filter parameter for said first filter, and a third one of said adjustable controls selects a width of said first filter.

13. The method of claim 1, wherein said filtering comprises (a) filtering a first attribute of said first plurality of samples with the first filter to generate a first component of the output pixels of the first set, and (b) filtering a second attribute of said first plurality of samples with a second filter to generate a second component of the output pixels of the first set;

the method further comprising dynamically adjusting said second filter in response to user input.

14. The method of claim 13, wherein the first attribute and the second attribute are selected from the group consisting of red, green, blue and alpha.

15. The method of claim 1, wherein said dynamically adjusting said filter further comprises dynamically adjusting said filter on a per display region basis.

16. A method for generating pixels for a display device, the method comprising:

receiving graphics data;

rendering a plurality of samples into a sample buffer for a frame based on the graphics data;

filtering said plurality of samples using a filter to generate a plurality of output pixels for said frame;

transferring said plurality of output pixels to the display device, wherein the display device forms a display image for said frame in response to said plurality of output pixels;

capturing an image of said display image using a display-monitoring device, wherein the captured image comprises a plurality of captured pixels; and dynamically adjusting said filter in response to said plurality of captured pixels.

17. The method of claim 16, wherein said display-monitoring device comprises a video camera.

18. The method of claim 16, wherein said display image is a predetermined test image.

19. The method of claim 16, further comprising:

computing a similarity value by comparing said plurality of captured pixels with said plurality of output pixels; and dynamically adjusting said filter in order to maintain said similarity value above a threshold similarity.

20. The method of claim 16, further comprising computing a sharpness value for said plurality of captured pixels; and dynamically adjusting said filter in order to maintain said sharpness value with a neighborhood of a desired sharpness value.

21. A computer program embodied on a computer-readable memory medium, wherein the computer program is executable to:

receive graphics data;

render a first plurality of samples in response to the graphics data;

filter said first plurality of samples using a first filter to generate a first set of output pixels;

transfer said first set of output pixels to the display device; and dynamically adjust said first filter in response to user input.

22. The computer program of claim 21, wherein the computer program is further executable to:

render a second plurality of samples in response to additional graphics data;

filter said second plurality of samples using the adjusted filter to generate a second set of output pixels; and transfer the second set of output pixels to the display device.

23. The computer program of claim 21, wherein said dynamically adjusting said first filter comprises adjusting one or more support parameters in response to the user input, wherein the support parameters determine a support region of an adjusted first filter.

24. The computer program of claim 23, wherein said one or more support parameters determine an extent of the support region of the adjusted first filter.

25. The computer program of claim 23, wherein said one or more support parameters determine a geometry for the support region of the adjusted first filter.

26. The computer program of claim 21, wherein said dynamically adjusting said first filter comprises changing one or more filter parameters of the first filter in a parameter space in response to the user input, wherein the parameter space corresponds to a parameterized family of filters.

27. The computer program of claim 21, wherein said dynamically adjusting said first filter comprises:

receiving said user input indicating a user's choice of a different filter type; and changing the first filter to the different filter type.

28. The computer program of claim 21, wherein said dynamically adjusting said first filter comprises scaling the first filter along a radial dimension in response to the user input.

29. The computer program of claim 21, wherein said dynamically adjusting said first filter comprises scaling the first filter along a screen-space axis in response to the user input, wherein the screen space axis is selected from the group comprising the horizontal screen-space axis and the vertical screen-space axis.

30. The computer program of claim 21, wherein the computer program is further executable to receive said user input from a filter control interface, wherein said filter control interface comprises one or more user-adjustable controls.

31. The computer program of claim 30, wherein the filter control interface is implemented as a graphical user interface.

32. The computer program of claim 30, wherein a first one of said adjustable controls selects a filter type for said first filter, a second one of adjustable controls selects a value of a filter parameter for said first filter, and a third one of said adjustable controls selects a width of said first filter.

33. The computer program of claim 21, wherein said filtering comprises (a) filtering a first attribute of said first plurality of samples with the first filter to generate a first component of the output pixels of the first set, and (b) filtering a second attribute of said first plurality of samples with a second filter to generate a second component of the output pixels of the first set;

wherein the computer program is further executable to dynamically adjust said second filter in response to user input.

34. The computer program of claim 33, wherein the first attribute and the second attribute are selected from the group consisting of red, green, blue and alpha.

35. The computer program of claim 21, wherein said dynamically adjusting said filter further comprises dynamically adjusting said filter on a per display region basis.

36. A graphics system comprising:

a rendering unit operable to receive graphics data and render a first plurality of samples in response to said graphics data;

a sample buffer coupled to said rendering unit and configured to store said first plurality of samples;

a sample-to-pixel calculation unit coupled to said sample buffer, wherein said sample-to-pixel calculation unit is operable to filter said first plurality of samples using a first filter to generate a first set of output pixels, and transmit said first set of output pixels to a display device;

a filter-control unit configured to adjust said first filter in response to user input.

37. The graphics system of claim 36, wherein the rendering unit is further operable to render a second plurality of samples in response to additional graphics data, wherein the sample-to-pixel calculation unit is further operable to filter said second plurality of samples using the adjusted first filter to generate a second set of output pixels, and to transmit the second set of output pixels to the display device.

38. The graphics system of claim 36, further comprising a filter memory, wherein the sample-to-pixel calculation unit is configured to read values from the filter memory and determine filter weights for filtering said first plurality of samples from said values, wherein the filter-control unit is configured to update said values in the filter memory in response to the user input.

39. The graphics system of claim 36, wherein said filter-control unit is configured to dynamically adjust one or more support parameters in response to the user input, wherein the support parameters determine a support region of the adjusted first filter.

40. The graphics system of claim 39, wherein said one or more support parameters determine an extent of the support region of the adjusted first filter.

41. The graphics system of claim 39, wherein said one or more support parameters determine a geometry for the support region of the adjusted first filter.

42. The graphics system of claim 36, wherein said filter-control unit is configured to dynamically adjust one or more filter parameters of the first filter in a parameter space in response to the user input, wherein the parameter space corresponds to a parameterized family of filters.

43. The graphics system of claim 36, wherein said filter-control unit is configured to dynamically adjust said first filter by:

receiving said user input indicating a user's choice of a different filter type; and changing the first filter to the different filter type.

44. The graphics system of claim 36, wherein said filter-control unit is configured to dynamically scale the first filter along a radial dimension in response to the user input.

45. The graphics system of claim 36, wherein said filter-control unit is configured to dynamically scale the first filter along a screen-space axis in response to the user input, wherein the screen space axis is selected from the group comprising the horizontal screen-space axis and the vertical screen-space axis.

46. The graphics system of claim 36 further comprising a filter control interface having one or more user-adjustable controls which allow user to provide said user inputs, wherein the filter control interface is configured to transfer said user inputs to the filter control unit.

47. The graphics system of claim 46, wherein the filter control interface is implemented as a graphical user interface on a host computer.

48. The graphics system of claim 46, wherein a first one of said adjustable controls selects a filter type for said first filter, a second one of adjustable controls selects a value of a filter parameter for said first filter, and a third one of said adjustable controls selects a width of said first filter.

49. The graphics system of claim 36, wherein said sample-to-pixel calculation unit is configured to (a) filter a first attribute of said first plurality of samples with the first filter to generate a first component of the output pixels of the first set, and (b) filter a second attribute of said first plurality of samples with a second filter to generate a second component of the output pixels of the first set;

wherein the filter-control unit is further configured to dynamically adjust said second filter in response to additional user input.

50. The graphics system of claim 49, wherein the first attribute and the second attribute are selected from the group consisting of red, green, blue and alpha.

51. The graphics system of claim 36, wherein said filter-control unit is configured to dynamically adjust said first filter on a per display-region basis.

52. A graphics system comprising:

a rendering unit operable to receive graphics data and render a plurality of samples in response to said graphics data;

a sample buffer coupled to said rendering unit, wherein said sample buffer is operable to store said plurality of samples;

a sample-to-pixel calculation unit coupled to said sample buffer, wherein said sample-to-pixel calculation unit is operable to (a) filter said plurality of samples using a filter to generate a plurality of output pixels for a frame and (b) transmit the plurality of output pixels to a display device, wherein the display device is configured generate a display image from the plurality of output pixels; and a display-monitoring device configured to capture said display image as a plurality of captured pixels;

a filter adjustment unit configured to receive the plurality of captured pixels and to adjust said filter in response to said plurality of captured pixels.

* * * * *